(12) United States Patent
Yoshimura et al.

(10) Patent No.: US 6,952,712 B2
(45) Date of Patent: Oct. 4, 2005

(54) METHOD AND APPARATUS FOR DISTRIBUTING CONTENT DATA OVER A NETWORK

(75) Inventors: Takeshi Yoshimura, Yokohama (JP); Yoshifumi Yonemoto, Yokohama (JP); Minoru Etoh, Yokohama (JP); Tomoyuki Ohya, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 158 days.

(21) Appl. No.: 10/305,987

(22) Filed: Nov. 29, 2002

(65) Prior Publication Data

US 2003/0105925 A1 Jun. 5, 2003

(30) Foreign Application Priority Data

Nov. 30, 2001 (JP) .................................. 2001-367351
Oct. 30, 2002 (JP) .................................. 2002-316501

(51) Int. Cl.[7] .......................... G06F 13/00; G06F 15/16
(52) U.S. Cl. ...................... 709/201; 709/203; 709/213; 709/214; 711/118; 711/202
(58) Field of Search ................................. 709/200, 201, 709/202, 203, 212, 213, 214, 216, 217, 219, 225; 711/100, 113, 114, 118, 124, 147, 148, 202, 203

(56) References Cited

U.S. PATENT DOCUMENTS

| 6,112,279 | A | * | 8/2000 | Wang | 711/119 |
| 6,331,984 | B1 | * | 12/2001 | Luciani | 370/401 |
| 2002/0046252 | A1 | * | 4/2002 | Ono et al. | 709/213 |

FOREIGN PATENT DOCUMENTS

| EP | 1 107 533 | 6/2001 |
| EP | 1 125 219 | 8/2001 |
| WO | WO 98/18076 | 4/1998 |
| WO | WO 00/42519 | 7/2000 |
| WO | WO 01/93530 | 12/2001 |
| WO | WO 02/071242 | 9/2002 |

OTHER PUBLICATIONS

C.D. Cranor et al., "Enhanced Streaming Services in a Content Distribution Network", IEEE Internet Computing, IEEE Service Center, Piscataway, NJ, Jul. 2001, pp. 66–75, XP002950377.

I. Lazar et al., "Exploring Content Display Networking", IT Professional, IEEE, Piscataway, NJ, Jul. 2001, pp. 47–49, XP002950379.

* cited by examiner

*Primary Examiner*—B. James Peikari
(74) *Attorney, Agent, or Firm*—Oblon, Spivak, McClelland, Maier & Neustadt, P.C.

(57) ABSTRACT

A content distribution system includes plurality of cache server apparatus configured to obtain content from a distribution apparatus, and to store the content temporarily; a location information data storage unit configured to store location information data, which indicates location information of each cache server apparatus; a description data storage unit configured to store at least one item of description data, which includes the location information of a distribution apparatus; a converter configured to convert the location information of a distribution apparatus storing a requested content, which is included in description data, into location information of a specified cache server apparatus, by referring to the location information data; and a reception terminal apparatus configured to obtain the description data converted by the converter, and to receive the requested content from the specified cache server apparatus.

58 Claims, 35 Drawing Sheets

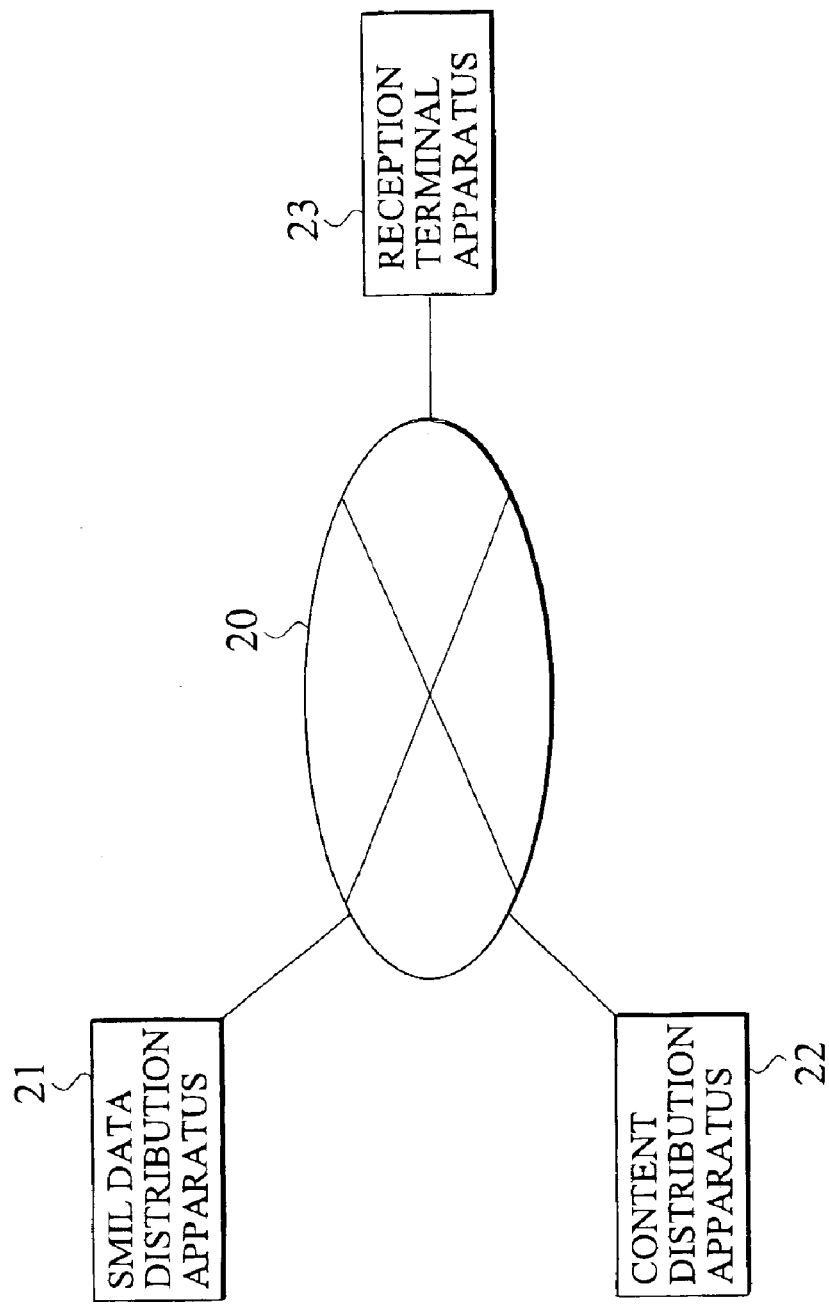

FIG. 2

```
<!DOCTYPE smil PUBLIC"-//W3C//DTD SMIL 2.0//EN"
    "http://www.w3.org/2001/SMIL20/SMIL20.dtd">
<smil xmlns = "http://www.w3.org/2001/SMIL20/Language">
<head>
    <layout>
        <region id="a" top="5" left="5" width="180" height="180"/>
    </layout>
</head>
<body>
    <seq>
        <par dur="10s">
            <audio src = "rtsp://haishin-souchi-22/content-A-1.mp4"/>
            <video src = "rtsp://haishin-souchi-22/content-V-1.mp4" region="a"/>
        </par>
        <par dur="10s">
            <audio src = "rtsp://haishin-souchi-22/content-A-2.mp4"/>
            <video src = "rtsp://haishin-souchi-22/content-V-2.mp4" region="a"/>
        </par>
        <par dur="10s">
            <audio src = "rtsp://haishin-souchi-22/content-A-3.mp4"/>
            <video src = "rtsp://haishin-souchi-22/content-V-3.mp4" region="a"/>
        </par>
    </seq>
</body>
</smil>
```

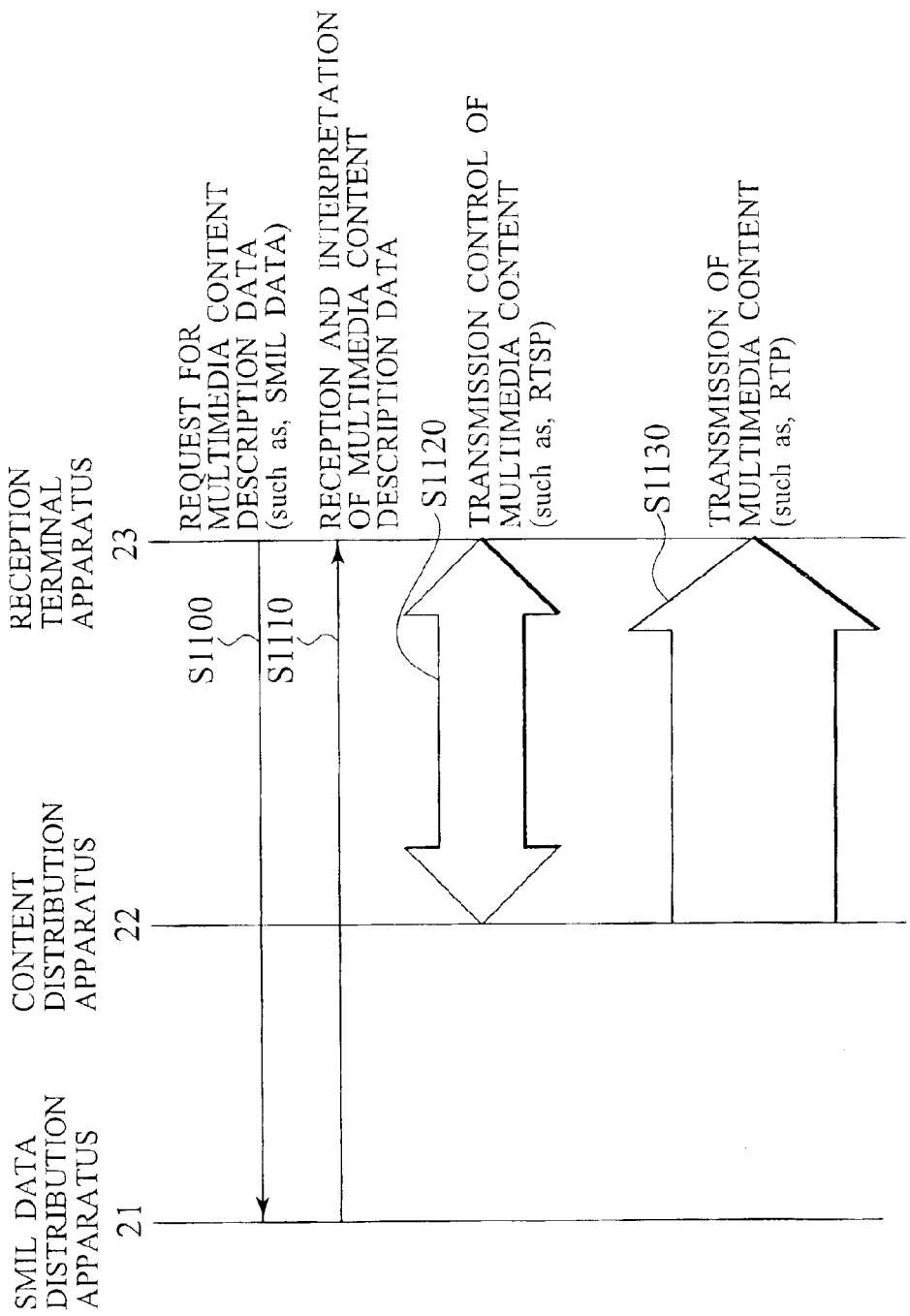

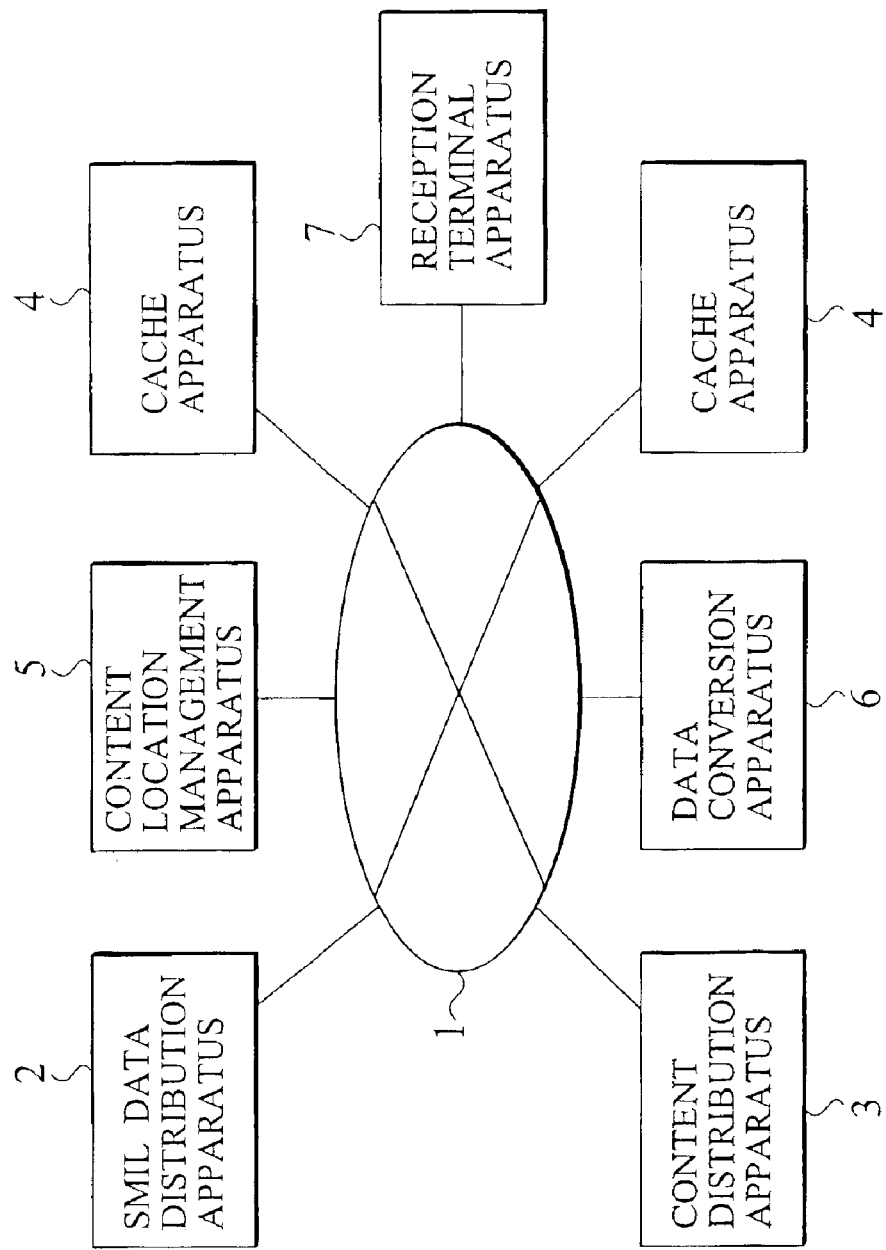

FIG. 8

| ADDRESS RANGE OF TRANSMISSION TERMINAL APPARATUS | PROXIMITY ORDER | CACHE APPARATUS CANDIDATES |
|---|---|---|
| 0.0.0.0~127.255.255.255 | 1. | CACHE APPARATUS A |
| | 2. | CACHE APPARATUS B |
| | 3. | CACHE APPARATUS C |
| 128.0.0.0~191.255.255.255 | 1. | CACHE APPARATUS D |
| | 2. | CACHE APPARATUS E |
| | 3. | CACHE APPARATUS F |
| 192.0.0.0~223.255.255.255 | 1. | CACHE APPARATUS G |
| | 2. | CACHE APPARATUS H |
| | 3. | CACHE APPARATUS I |

FIG. 24

```
<!DOCTYPE smil PUBLIC"-//W3C//DTD SMIL 2.0//EN"
    "http : //www.w3.org/2001/SMIL20/SMIL20.dtd"/>
<smil xmlns = "http : //www.w3.org/2001/SMIL20/Language"/>
<head>
    <layout>
        <region id="a" top="5" left="5" width="180" height="180"/>
    </layout>
</head>
<body>
    <par dur="60min">
        <audio src = "rtsp : //haishin-souchi-3/content-A.mp4"/>
        <video src = "rtsp : //haishin-souchi-3/content-V.mp4" region="a"/>
    </par>
</body>
</smil>
```

FIG. 29

| DIVIDED CONTENT IDENTIFIER | DISTRIBUTION COMMENCEMENT TIME | PRE-FETCH TIME | CACHE APPARATUS |
|---|---|---|---|
| haishin-souchi-3/content-A-1.mp4 | 0 | -5 | CACHE APPARATUS 4X |
| haishin-souchi-3/content-V-1.mp4 | 0 | -5 | CACHE APPARATUS 4X |
| haishin-souchi-3/content-A-2.mp4 | 10 | 5 | CACHE APPARATUS 4X |
| haishin-souchi-3/content-V-2.mp4 | 10 | 5 | CACHE APPARATUS 4X |
| haishin-souchi-3/content-A-3.mp4 | 20 | 15 | CACHE APPARATUS 4Y |
| haishin-souchi-3/content-V-3.mp4 | 20 | 15 | CACHE APPARATUS 4Y |

FIG. 38

```
<SOAP-ENV : Envelope
xmlns : SOAP-ENV-"http : //schenias.xmlsoap.org/soap/envelope"
SOAP-ENV : encodingStyle-
"http : //schemas.xmlsoap.org/soap/cucoding/">
<SOAP-ENV : Body>
<m : update xmlns : m-"http : //docomo.nc.jp/dynamicSMIL">
<oldSrc>rtsp : //cache-souchi-407/content.A-2.mp4</oldSrc>
<newSrc>rtsp : //cache-souchi-408/content-A.2.mp4</newSrc>
<oldSrc>rtsp : //cache-souchi-407/contont-V.2.mp4</oldSrc>
<newSrc>rtsp : //cache-souchi-408/content-V.2.mp4</newSrc>
</m : update>
</SOAP-ENV : Body>
</SOAP-ENV : Envelope>
```

FIG. 41

Date : Thu, 29 Aug 2002 11 : 45 : 47 +0900
From : ○○
To : Everyone
Subject : test content
Message-Id : <abc@△△◇◇>
MIME-Version : 1.0
Content-Type : text/plain : charset—"US-ASCII"
Content-Transfer-Encoding : 7bit Here is a test content

| http : //haishin-souchi/content.mp4 | ~ URL1 regards,

FIG. 42

Date : Thu, 29 Aug 2002 11 : 45 : 47 +0900
From : ○○
To : Everyone
Subject : test content
Message-Id : <abc@△△◇◇>
MIME-Version : 1.0
Content-Type : text/plain : charset—"US-ASCII"
Content-Transfer-Encoding : 7bit

CONVERT

Here is a test content

| http : //cache-souchi/content.mp4 | ~ URL2 regards,

METHOD AND APPARATUS FOR DISTRIBUTING CONTENT DATA OVER A NETWORK

CROSS REFERENCE TO RELATED APPLICATIONS

This application is based upon and claims the benefit of priority from the prior Japanese Patent Applications No. P2001-367351, filed on Nov. 30, 2001 and the prior Japanese Patent Applications No. P2002-316501, filed on Oct. 30, 2002; the entire contents of which are incorporated herein by reference.

BACKGROUND OF THE INVENTION

1. Field of the Invention

The present invention relates to a content distribution system, a description data distribution apparatus, a content location management apparatus, a data conversion apparatus, a reception terminal apparatus and a content distribution method, which distribute multimedia contents (such as, audio data and video data).

2. Description of the Related Art

In recent years, the Internet has become popularized. As a result, various contents have been transmitted/received between communication terminal apparatus over the Internet. Particularly, broadband access links has become possible through the birth of ADSL, FTTH, and IMT-2000. Accordingly, distribution of high capacity multimedia contents (such as, audio data, and video data) has been realized.

FIG. 1 is a diagram illustrating the configuration of a conventional multimedia content distribution system. The distribution system includes a first distribution apparatus 21 (SMIL data distribution apparatus) storing multimedia content description data. The first distribution apparatus 21 transmits the data to a reception terminal apparatus 23. The distribution system includes a second distribution apparatus (content distribution apparatus) 22 that distributes multimedia contents to a reception terminal apparatus 23; the reception terminal apparatus 23 that receives and replays the multimedia contents; and a network 20 that links each of the apparatus.

For example, the multimedia content description data is data that includes, in a predetermined language, the location information (such as, an IP address or an URL) of apparatus in which multimedia contents exist, layout information, and time information (such as time information concerning synchronization timing of audio and video data and display timing of audio and video data). An example of this a predetermined language may include Synchronized Multimedia Integration Language (SMIL).

FIG. 2 is a diagram showing an exemplary description of SMIL (an example of multimedia content description data). In FIG. 2, the portion (such as, the portion [<region id="a"top="5"left="5"width="180"height="5"/>]) surrounded by [<layout>] and [</layout>] indicates that the content is displayed upon a display screen of the reception terminal apparatus 23 as described below. In other words, on the display screen, the multimedia content specified by [region id="a"] is displayed at a position of 5 pixels from the top and 5 pixels from the left, and with a width of 180 pixels and height of 180 pixels.

In FIG. 2, the portion surrounded by the first pair of [<par dur="10 s">] and [</par>] represents such apparatus that distributes the above content during the first ten seconds of content distribution.

"<audio src=rstp://haisen-souchi-103/content-A-1.mp4/>" indicates the following in FIG. 2. Namely, an apparatus that has a Uniform Resource Locator (URL) referred to as [rstp://haisen-souchi-103/content-A-1.mp4] distributes audio data. The URL indicates that a content distribution apparatus referred to as [haisen-souchi-103] distributes the content referred to as [content-A-1.mp4] using a session control protocol called Real Time Streaming Protocol (RTSP).

"<video src="rtsp://haisen-souchi-103/content-V-1.mp4" region ="a"/>" shown in FIG. 2 indicates that the content distribution apparatus referred to as [haisen-souchi-103] distributes the content referred to as [content-A-1.mp4] using RTSP. On the other hand, in FIG. 2, the portion surrounded by the second pair of [<par dur="10 s">] and [</par>] represents such apparatus that distributes the above content between the tenth second from starting content distribution and the twentieth second from starting content distribution. In FIG. 2, the portion surrounded by the third pair of [<par dur="10 s">] and [</par>] represents such apparatus that distributes the above content between the twentieth second from starting content distribution and the thirtieth second from starting content distribution.

The description of the operations of a conventional distribution system is provided as follows. FIG. 3 is a sequence diagram showing the operations of the conventional distribution system.

In step S1100, the reception terminal apparatus 23 transmits a request for multimedia content description data concerning a predetermined multimedia contents (such as, musical contents) to a distribution apparatus.

In step S1110, the first distribution apparatus 21 transmits the multimedia content description data (such as, SMIL data) corresponding to the predetermined multimedia contents to the reception terminal apparatus 23. For example, the a predetermined multimedia contents are assumed to be stored in the second distribution apparatus 22.

In step S1120, transmission control processing for the multimedia contents is executed according to RTSP between the reception terminal apparatus 23 and the second distribution apparatus 22. For example, the exchange of data concerning the data transmission method between the reception terminal apparatus 23 and the second distribution apparatus 22 is executed according to RTSP. Then, a connection between the reception terminal apparatus 23 and the second distribution apparatus 22 is established, and the data transmission method is determined.

In step S1130, the second distribution apparatus 22 transmits the predetermined multimedia contents to the reception terminal apparatus 23 according to the determined transmission method. Transmission of the multimedia contents is processed with Real-time Transport Protocol (RTP).

In this manner, when the reception terminal apparatus 23 transmits a request for a predetermined multimedia contents to the SMIL data distribution apparatus 21, the predetermined distribution apparatus 22 then transmits the above multimedia contents to the reception terminal apparatus 23.

However, the conventional technology has the following problems. In the case where the reception terminal apparatus 23 obtains contents from a distribution apparatus located at a distance over the network, a large amount of network resources are consumed in content distribution. In such case, for example, at least one of network congestion, decrease in transmission bit rate, or bit error occurs. As a result, there is the problem of content distribution quality decreasing.

Conventionally, there is the technology of locating a cache apparatus on the network. In this conventional technology, a cache apparatus located near the reception terminal apparatus 23 temporarily stores contents. Then, the reception terminal apparatus 23 is able to obtain the contents from the cache apparatus.

By this means, the reception terminal apparatus 23 can access the cache apparatus located near by rather than the distribution apparatus located at a distance over the network. As a result, the response time for the request of the reception terminal apparatus may be reduced. Furthermore, consumption of network resources may be reduced. Furthermore, occurrence of network congestion as well as the decrease in data quality due to bit error may be controlled.

The distribution system that utilizes such cache apparatus includes for example, the conventional technology as described below.

"A cache apparatus that determines whether or not storage of data is performed according to priority of data" is disclosed in the prior art of Japanese Patent Application Laid-Open No. 2000-209258. The following technology is disclosed in the prior art of Japanese Patent Application Laid-Open No. 2000-250803. A cache apparatus pre-fetches a Web page with a high jump probability among Web pages linked to a WWW page. The cache apparatus then quickly transmits a response for the Web page request to the reception terminal apparatus.

In the prior art of Japanese Patent Application Laid-Open No. 2000-276425, in the case where the reception terminal apparatus moves, the cache apparatus that is close to the reception terminal apparatus pre-fetches contents before the content request is transmitted from the reception terminal apparatus.

The following technology is disclosed in the prior art of Japanese Patent Application Laid-Open No. 2000-293424. When the cache apparatus stores data and transmits data to the reception terminal apparatus, the cache apparatus performs operations for storing data independent from the operations of transmitting data to the reception terminal apparatus 7. Accordingly, the operations of storing data in the cache apparatus may be stably performed.

In the prior art of Japanese Patent Application Laid-Open No. 2001-202330, several cache apparatus store the same data. Thus, even if one cache apparatus can not perform data distribution, another cache apparatus may perform data distribution.

However, the conventional technology had the following problems. Conventionally, the reception terminal apparatus was only able to access cache apparatus that were already registered in the reception terminal apparatus. Thus, cache apparatus that were inaccessible to the reception terminal apparatus existed among the cache apparatus linked to the network. As a result, since cache apparatus exist that the reception terminal apparatus could not access utilized, network resources were not fully utilized.

Furthermore, even if a cache apparatus that the reception terminal apparatus could quickly access was linked to the network, in the case where such cache apparatus had not been registered in the reception terminal apparatus, there were problems such as described below. Since the cache apparatus was inaccessible to the reception terminal apparatus, reducing the access time of the reception terminal apparatus was not possible. As a result, network congestion occurred, as well as improvements in content distribution quality being insufficient.

BRIEF SUMMARY OF THE INVENTION

The aim of the present invention is to provide a content distribution system, a content distribution method, a description data distribution apparatus, a content location management apparatus, a data conversion apparatus, and a reception terminal apparatus, which sufficiently allow for the effective usage of network resources and improvement of content distribution quality.

To achieve the object, according to a first aspect of the present invention, a content distribution system, comprises at least one distribution apparatus configured to store a content; a plurality of cache server apparatus configured to obtain content from the distribution apparatus, and to store the content temporarily; a location information data storage unit configured to store location information data, which indicates the location information of each cache server apparatus; a description data storage unit configured to store at least one description data, which includes the location information of the distribution apparatus; a converter configured to convert the location information of distribution apparatus storing requested content requested by a user, which is included in a description data, into the location information of a specified cache server apparatus, by referring to the location information data; and a reception terminal apparatus configured to obtain converted description data, which is description data converted by the converter, and to receive the requested content from the specified cache server apparatus based on the converted description data.

BRIEF DESCRIPTION OF THE SEVERAL VIEWS OF THE DRAWINGS

FIG. 1 is a diagram illustrating the configuration of a conventional content distribution system.

FIG. 2 is a diagram showing conventional SMIL data.

FIG. 3 is a sequence diagram illustrating content distribution processing by a conventional content distribution system.

FIG. 4 is a diagram illustrating the configuration of a content distribution system according to a first embodiment.

FIG. 8 is a diagram showing the configuration of a proximity table according to the first embodiment.

FIG. 24 is a diagram showing SMIL data before content is divided.

FIG. 29 is a diagram illustrating an example of a pre-fetch timing table according to the fourth embodiment.

FIG. 38 is a diagram showing an update list of SMIL data using SOAP messages.

FIG. 41 is a diagram showing an example of electronic mail data before being converted by a conversion unit.

FIG. 42 is a diagram showing an example of electronic mail data converted by a conversion unit.

DETAILED DESCRIPTION OF THE INVENTION

Figure 5:
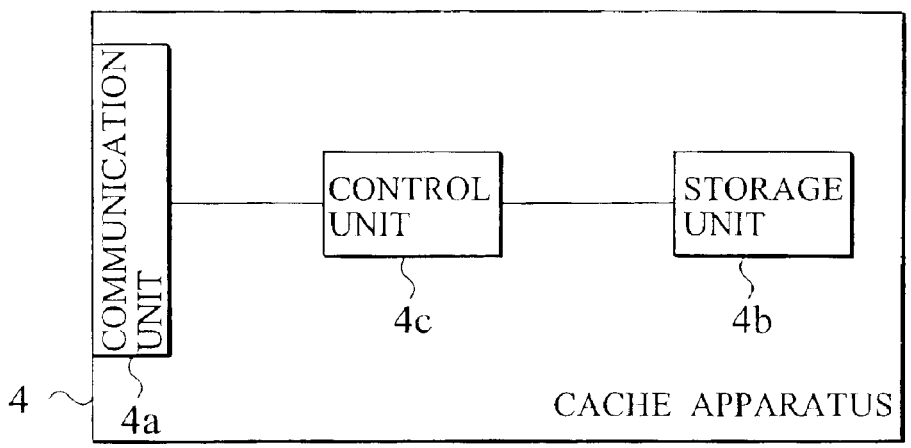
FIG. 5 is a diagram illustrating the configuration of a cache apparatus 4 according to the first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as is conventional in the representation of devices, it will be appreciated that the various drawings are not drawn to scale from one figure to another, nor within a given figure.

In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail.

First Embodiment (Configuration of Content Distribution System)

FIG. 4 is a diagram illustrating the configuration of a content distribution system according to the first embodiment. The content distribution system has a network 1; an SMIL data distribution apparatus 2, which is linked via this network 1; a plurality of content distribution apparatus 3; a plurality of cache server apparatus (hereafter referred to as cache apparatus); a content location management apparatus 5; a data conversion apparatus 6; and a plurality of reception terminal apparatus 7. The network 1 is a public network 1 such as the Internet, for example. The cache apparatus may be directly connected to the network. Furthermore, the cache apparatus may be connected to a local network and linked to the network 1 via this local network.

Here, the content distribution system may include one item of content distribution apparatus 3 storing a plurality of contents. Furthermore, the content distribution system may include a plurality of SMIL data distribution apparatus 2. When the content distribution system includes one SMIL data distribution apparatus 2, the SMIL data distribution apparatus 2 manages a plurality of SMIL data. When the content distribution system includes a plurality of SMIL data distribution apparatus 2, each set of SMIL data distribution apparatus 2 manages each set of SMIL data.

It should be noted that the data conversion apparatus 6 and the content location management apparatus 5 may be separate apparatus or may be together as one apparatus.

Furthermore, the SMIL data distribution apparatus 2, content location management apparatus 5, and data conversion apparatus 6 are respectively separate apparatus in this embodiment, however, they are not particularly limited to this configuration. For example, the content distribution system may include one item of content distribution server apparatus that comprises the functions of the SMIL data distribution apparatus 2, the content location management apparatus 5, and the data conversion apparatus 6. Furthermore, a program in which the functions of the data conversion apparatus 6 and the content location management apparatus 5 are described, may be stored in the SMIL data distribution apparatus 2 or the content distribution apparatus 3. The SMIL data distribution apparatus 2 or the content distribution apparatus 3 may then execute the functions of the data conversion apparatus 6 and the content location management apparatus 5.

Generally, the reception terminal apparatus 7 are close to the cache apparatus 4 rather than the content distribution apparatus 3 in the network 1. Here, a second apparatus close to a first apparatus in the network 1 means an apparatus that the first apparatus can quickly access via the network 1.

In this case, proximity in the network 1, for example, is determined based on one or more pieces of information among path length (path length between the first apparatus and second apparatus), hop count, the roundtrip delay, and transmission rate of local network lines (such as, coaxial cable lines, optical fiber lines and wireless lines) connected to the first apparatus and/or the second apparatus.

The content distribution apparatus 3, in the case where requests for the predetermined contents are sent from the reception terminal apparatus 7, transmit the predetermined contents to the reception terminal apparatus 7. Each of the content distribution apparatus 3 includes a content storage unit (not shown) that stores each of the contents; a communication unit (a transmitter and a receiver are not shown), which communicates with the reception terminal apparatus 7; and a control unit (not shown) that performs the control of each of the units.

It should be noted that in this embodiment, as described above, one or a plurality of content distribution apparatus 3 stores contents. In addition, each cache apparatus 4 obtains at least one item of content from the content distribution apparatus 3 and stores the content temporarily. In such case, the reception terminal apparatus 7 receives the content from the cache apparatus 4 rather than from the content distribution apparatus 3. Furthermore, the content distribution apparatus 3 normally stores a plurality of contents. In addition, in the case where, for example, the content W and the content Z are stored in a given content distribution apparatus 3, the "distribution source location information" included in the SMIL data corresponding to the content W (/content Z) is the "distribution source location information" indicating the location information of the given content distribution apparatus 3.

FIG. 5 is a diagram illustrating the configuration of cache apparatus. The cache apparatus 4 obtains at least one item of content from one or a plurality of content distribution apparatus 3 and temporarily stores the content.

Each cache apparatus includes a storage unit 4b in which one or a plurality of contents are stored; a communication unit (a transmitter and receiver) 4a, which performs operations such as transmitting content to the reception terminal apparatus 7 or receiving content from the content distribution apparatus 3; and a control unit 4c, which controls each of the units. The control unit 4c rewrites a portion of the data stored in the storage unit 4b into the content that are transmitted from the content distribution apparatus 3.

Furthermore, in the case where the reception terminal apparatus 7 sends a request for content distribution to the control unit 4c of the cache apparatus 4 based on the distribution commencement time, information indicating synchronization time (hereinafter "information indicating synchronization time" is referred to as "synchronization time information") and information indicating content time (hereinafter "information indicating content time" is referred to as "content time information"), the control unit 4c performs the following operations. The control unit 4c reads the content from the storage unit 4b. The control unit 4c then transmits the content to the reception terminal apparatus 7 based on the distribution commencement time, information indicating synchronization time and information indicating content time.

Figure 6:
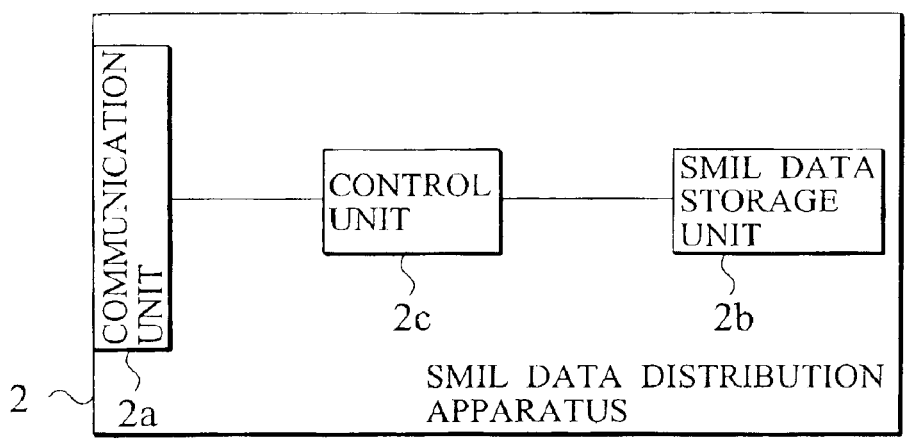
FIG. 6 is a diagram illustrating the configuration of an SMIL data distribution apparatus according to the first embodiment.

FIG. 6 is a diagram illustrating the configuration of the SMIL data distribution apparatus 2. The SMIL data distribution apparatus 2 performs the following processing when a request for a predetermined SMIL data (description data) is transmitted from the reception terminal apparatus 7. The SMIL data distribution apparatus 2 performs, for example, processing for transmitting reply information, processing for transmitting a request for converting SMIL data to the data conversion apparatus 6, and processing for inquiring of the content location management apparatus 5 about information concerning the content location.

Processing for transmitting a conversion request for SMIL data to the data conversion apparatus 6 is executed for the following reasons. Processing is performed for enabling the reception terminal apparatus 7 to obtain content from the cache apparatus close to the reception terminal apparatus 7.

It should be noted that in the inquiring processing for the content location, for example, a predetermined parameters (such as, information identifying the content, IP addresses of the reception terminal apparatus 7, and terminal identification numbers, described later) are transmitted to the content location management apparatus 5. The content location is a location (such as IP address, URL) of the device which holds the content.

Furthermore, the SMIL data distribution apparatus 2 can inquire at once for one or more locations of contents to the content location management apparatus 5. The SMIL data distribution apparatus 2 can also inquire at once for one or more locations of contents that are to be distributed in sequence to the content location management apparatus 5.

The SMIL data distribution apparatus 2 includes an SMIL data storage unit 2b (description data storage unit), storing each set of SMIL data. Each set of SMIL data includes information indicating the location of the content distribution apparatus 3 (hereinafter, referred to as "distribution source location information"), storing multimedia content (hereinafter, referred to as "content").

For example, this "distribution source location information" is represented by an URL.

Furthermore, the SMIL data distribution apparatus 2 includes a communication unit 2a (a transmitter and receiver), which performs, for example, the processing for transmitting to and receiving from each device (the data conversion apparatus 6 and the reception terminal apparatus 7) SMIL data; and a control unit 2c, which performs the controlling of each of the units.

The SMIL data includes, for example, "content identification information" (such as, an identification number managed over the network) that identifies content, and "distribution source location information" (such as, URL) that indicates the distribution source of the content. Furthermore, the SMIL data includes, for example, "content time information" that is the time between the starting time and finishing time of content distribution (which is also the time between the starting time and finishing time of content replay), "synchronization time information" that is necessary for synchronizing between one content and another content, and "layout information" indicating the arrangement of parts that configure the contents on display. It should be noted that the control unit 2c stores information indicating the location (such as IP address, URL) of each apparatus (such as, the data conversion apparatus 6.

Figure 7:
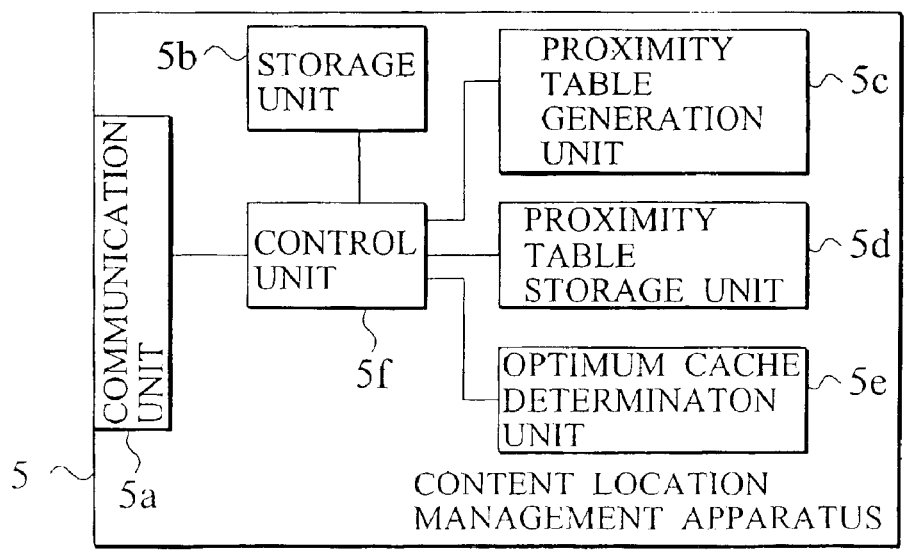
FIG. 7 is a diagram illustrating the configuration of a content location management apparatus according to the first embodiment.

FIG. 7 is a diagram illustrating the configuration of the content location management apparatus 5. The content location management apparatus 5 includes a storage unit 5b that stores a "location information table". The "location information table" includes information indicating the location (such as, an URL, an IP address) of each cache apparatus 4 that temporarily stores at least one item of content. It should be noted that the "location information table" is an example of "location information data". Furthermore, the format of the location information table of this embodiment is not limited in any way.

Furthermore, the content location management apparatus 5 includes a communication unit (transmitter and receiver) 5a, which performs data communication with each device (such as, data conversion apparatus 6); and a control unit 5f, which controls each of the units. The communication processing that the communication unit 5a performs is processing for transmitting information indicating the location of the cache apparatus 4 to the data conversion apparatus 6, for example. It should be noted that when the "distribution source location information" of an apparatus in SMIL data is an URL, if each unit executes each processing by using an IP address, the URL is converted into an IP address through a given device(such as DNS).

Hereafter, "Information indicating the location of device (such as cache apparatus)" maybe referred to as "location information of device".

Furthermore, the content location management apparatus 5 includes a "proximity table generation unit" 5c. The proximity table generation unit 5c calculates the "proximity level between the reception terminal apparatus 7 and each cache apparatus" based on one or more pieces of information from among "path length" (path length between one apparatus and another apparatus), "hop count", "roundtrip delay", and "transmission rate of local network lines" (such as, coaxial cable lines, optical fiber lines, and wireless lines) that are connected to each apparatus, for example.

This "proximity level" indicates the degree of proximity over the network. In other words, the "proximity level" indicates the degree of quick accessibility from one apparatus to another. It should be noted that the proximity level may also be calculated based on other matters. The proximity table generation unit 5c then generates a proximity table indicating each proximity level between the reception terminal apparatus 7 and cache apparatus based on the calculation results described above.

An example of a specific description of generation processing by the proximity table generation unit 5c is as follows. The proximity table generation unit 5c calculates proximity levels between a reception terminal apparatus X and all the cache apparatus located over the network 1. In the same manner, the proximity table generation unit 5c calculates proximity levels between the reception terminal apparatus Y, Z . . . , and all the cache apparatus located over the network 1.

The proximity table generation unit 5c then extracts the candidates for cache apparatus that are associated with high proximity levels for each location information (such as IP address/URL) of reception terminal apparatus 7. Hereafter, "cache apparatus that is associated with high proximity" is merely referred to as "high proximity level cache apparatus".

For example, in the case where the "high proximity level cache apparatus" corresponding to the "location information of the reception terminal apparatus 7X" are X1, X2, X4, X6, . . . , in order of high proximity level, the "proximity table generation unit" 5c extracts the cache apparatus X1, X2, and X4 as candidates for "high proximity level cache apparatus".

Based on these extraction results, the proximity table generation unit 5c then associates the location information of each reception terminal apparatus 7 with the candidates of "high proximity level cache apparatus".

The proximity table generation unit 5c then generates the proximity table in which the "location information of each reception terminal apparatus 7" and the "candidates of high proximity level cache apparatus (hereinafter "candidates of high proximity level cache apparatus" are referred to as "cache apparatus candidates") are associated.

Furthermore, the content location management apparatus includes a "proximity table storage unit" 5d in which the proximity table generated by the proximity table generation unit 5c is stored.

FIG. 8 is a diagram illustrating an example of the proximity table. In the proximity table shown in FIG. 8, the address range of the reception terminal apparatus 7, the order of proximity, and the cache apparatus candidates are associated. For example, if the IP address of a reception terminal apparatus 7 is "150.1.1.1", the address range corresponding to the IP address is "from 128.0.0.0 to 191.255.255.255".

Accordingly, the cache apparatus which is associated with the highest proximity level among the cache apparatus candidates (cache apparatus D, E, F) corresponding to the address range (from 128.0.0.0 to 191.255.255.255) is cache apparatus D. It should be noted that in the proximity table, for example, the "apparatus identification number" of reception terminal apparatus 7 may be used instead of the IP address thereof.

Furthermore, the content location management apparatus 5 includes an "optimum cache determination unit" 5e. The optimum cache determination unit 5e determines an "optimum cache apparatus", which is a cache apparatus that is optimum for the reception terminal apparatus 7 to access. There are various methods for reaching that determination.

In this embodiment, the optimum cache determination unit 5e determines "optimum cache apparatus" below. For example, the optimum cache determination unit 5e determines the cache apparatus which is associated with the highest proximity level among each cache apparatus 4 that temporarily stores a predetermined content, as the "optimum cache apparatus".

A predetermined content is requested content, which is content requested by a user, for example. It should be noted that "cache apparatus close to the reception terminal apparatus 7" means "cache apparatus which is associated with high proximity level (high proximity level indicates that proximity level between the reception terminal apparatus 7 and the cache apparatus is high)".

The location information of the reception terminal apparatus 7 and the information identifying the predetermined contents are transmitted from the data conversion apparatus 6 to the optimum cache determination unit 5e. The optimum cache determination unit 5e reads the proximity table from the proximity table storage unit 5d. The optimum cache determination unit 5e then refers to the proximity table, and determines the cache apparatus 4 close to the reception terminal apparatus 7.

The optimum cache determination unit 5e then reads the location information table via the control unit 5f. The optimum cache determination unit 5e then determines the cache apparatus closest to the reception terminal apparatus 7, as the optimum cache apparatus. Referencing the location information table, the optimum cache determination unit 5e then determines the location information of the "optimum cache apparatus".

A specific description utilizing FIG. 5 is as follows. The optimum cache determination unit 5e reads the proximity table from the proximity table storage unit 5d. If the transmitted IP address of the "reception terminal apparatus 7" is "150.1.1.1", the optimum cache determination unit 5e then determines that the location information of the reception terminal apparatus 7 is included in the address range "128.0.0.0 to 191.255.255.255" based on the proximity table.

The optimum cache determination unit 5e refers to the proximity table, and then determines the candidates for cache apparatus (cache apparatus D, E, and F) included in the address range. The optimum cache determination unit 5e determines the cache apparatus closest to the reception terminal apparatus 7 from among the above cache apparatus candidates, as the "optimum cache apparatus" (such as apparatus D).

The optimum cache determination unit 5e then reads the location information table from the storage unit 5b via the control unit 5f. The optimum cache determination unit 5e then determines the location information of the optimum cache apparatus by referring to the location information table.

Figure 9:
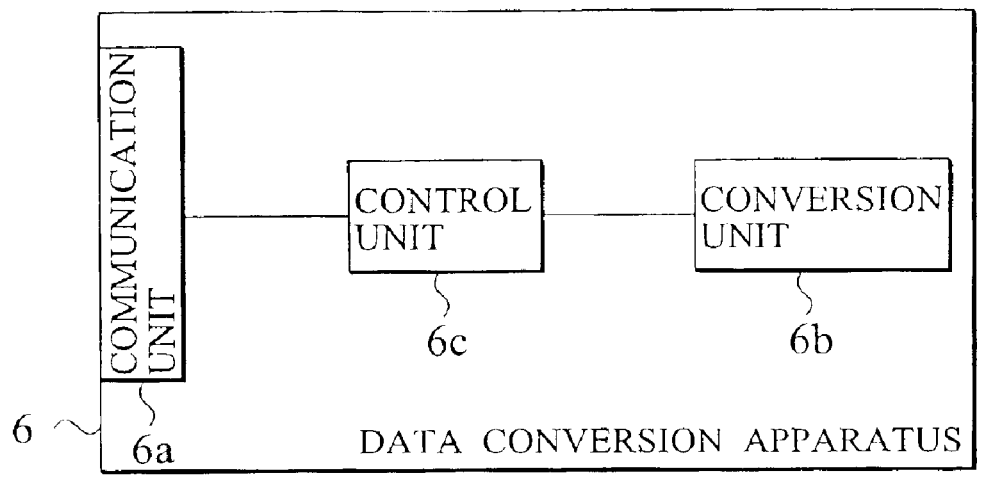
FIG. 9 is a diagram illustrating the configuration of a data conversion apparatus according to the first embodiment.

FIG. 9 is a diagram illustrating the configuration of a data conversion apparatus 6. The data conversion apparatus 6 includes a conversion unit 6b that performs the conversion of SMIL data; a communication unit 6a, which communicates information concerning conversion of the SMIL data with the content location management apparatus 5 and transmits the converted SMIL data to the SMIL data distribution apparatus 2; and a control unit 6c, which controls each of the units.

The conversion unit 6b performs the conversion processing for the SMIL data that includes the "distribution source location information" of the content distribution apparatus 3. The content distribution apparatus 3 store contents requested by a user.

The conversion unit 6b converts the "distribution source location information" of the content distribution apparatus 3, which is included in the SMIL data, into the "distribution source location information" of specified cache apparatus 4.

For example, in the case where the "distribution source location information of the optimum cache apparatus" determined by the "optimum cache determination unit" 5e has been transmitted, the conversion unit 6b converts the "distribution source location information of the content distribution apparatus 3", which is included in the SMIL data, into the "distribution source location information of the optimum cache apparatus".

Figure 10:
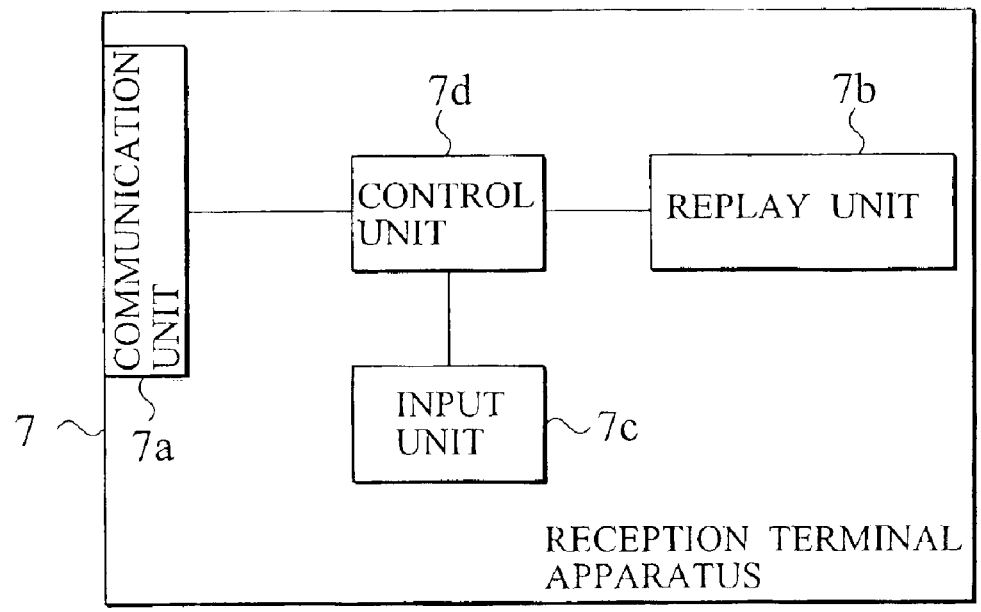
FIG. 10 is a diagram showing the configuration of a reception terminal apparatus according to the first embodiment.

FIG. 10 is a diagram illustrating the configuration of a reception terminal apparatus 7. The reception terminal apparatus 7 obtains SMIL data (description data) that is converted by the conversion unit 6b. Furthermore, based on the converted SMIL data, the reception terminal apparatus 7 receives the contents from the cache apparatus 4.

The reception terminal apparatus 7 includes a storage unit (not shown) that stores various types of data, and a communication unit (a transmitter and a receiver) 7a that, for example, transmits requests for SMIL data and receives SMIL data or contents.

For example, the storage unit is stored with location information of the "SMIL data distribution apparatus 2", SMIL data that has been transmitted, and contents. Furthermore, the reception terminal apparatus 7 includes a replay unit 7b, which replays content that is received by the communication unit 7a according to the "content time information" included in the SMIL data; an input unit 7c, which is for a user of the reception terminal apparatus 7 to enter a given information; and a control unit 7d, which controls each of the units.

Here, the control unit 7d includes a counter (not shown). The control unit 7d then transmits a request for content distribution to the cache apparatus 4 via the communication unit 7a. In the case where content has been transmitted from the cache apparatus 4, the control unit 7d instructs the communication unit 7a to receive the content according to the "synchronization time information" and "content time information". Furthermore, the control unit 7d instructs the replay unit 7b to replay the content according to the "content time information".

It should be noted that there is a network management apparatus (not shown) linked to the network 1. The network management apparatus manages, for example, path length, hop count, the roundtrip delay, and transmission rate of local network lines (such as, coaxial lines, optical fiber lines, wireless lines). Furthermore, the network management apparatus manages, for example, the IP address of an apparatus linked to the network 1. Furthermore, there are various types of apparatus (such as, various server apparatus or router apparatus) linked to the network 1.

(Proximity Table Generation Processing and Proximity Table Storage Processing)

Figure 11:
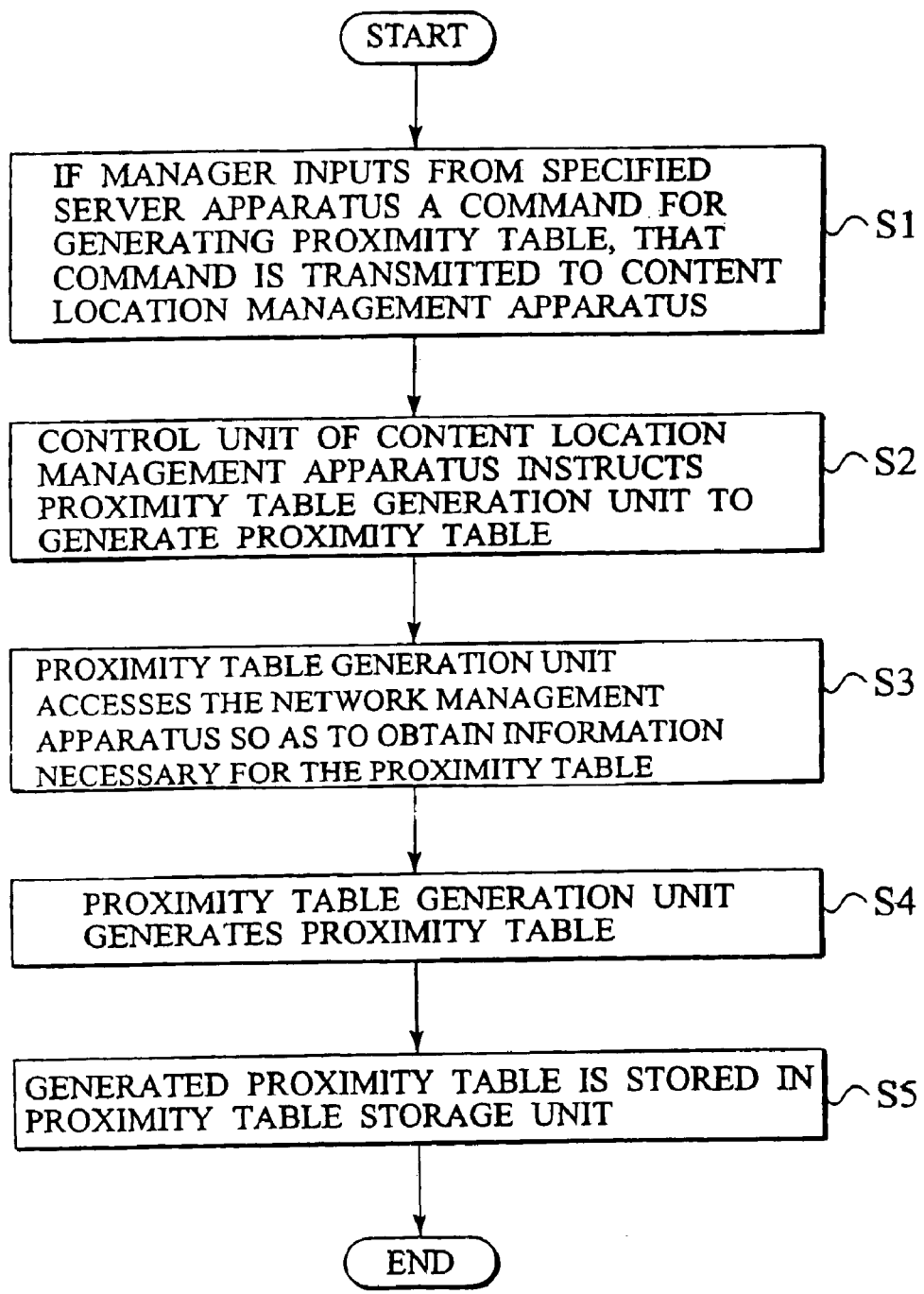
FIG. 11 is a flowchart showing a proximity table of generation processing and storage processing according to the first embodiment.

FIG. 11 is a flowchart for describing generation processing and storage processing for a proximity table. In step S1, a manager of the network 1, for example, inputs an instruction to generate a proximity table to the input unit of a predetermined server apparatus, so that the instruction is transmitted to the content location management apparatus 5.

In step S2, the control unit 5f of the content location management apparatus 5 instructs the proximity table generation unit 5c to generate the proximity table. In step S3, the proximity table generation unit 5c accesses the network management apparatus through the communication unit 5a, and obtains information(such as hop count) necessary for the proximity table. In step S4, the proximity table generation unit 5c generates the proximity table.

Specific processing of step S4 is as described below. Information necessary for the proximity table is transmitted to the proximity table generation unit 5c from the network management apparatus via the communication unit 5a and control unit 5f. The proximity table generation unit 5c calculates the proximity level between each reception terminal apparatus 7 and each cache apparatus 4. The proximity table generation unit 5c then extracts the candidates for cache apparatus that are associated with high proximity levels, for each location information (such as IP address/URL) of reception terminal apparatus 7. The proximity table generation unit 5c then generates the proximity table by associating the location information of each reception terminal apparatus 7 with the candidates of "high proximity level cache apparatus".

In step S5, the proximity table generated by the proximity table generation unit 5c is stored in the proximity table storage unit 5d.

(Content Distribution Method using the Content Distribution System)

One or a plurality of contents are stored in the content distribution apparatus 3. Each cache apparatus 4 obtains at least one item of content from the content distribution apparatus 3 and temporarily stores the content. Furthermore, the storage unit 5b stores a location information table that shows the location information of each cache apparatus. Furthermore, the SMIL data distribution apparatus 2 stores a plurality of SMIL data. Each set of SMIL data stored in the "SMIL data distribution apparatus 2" includes the location information of each content distribution apparatus 3.

Figure 12:
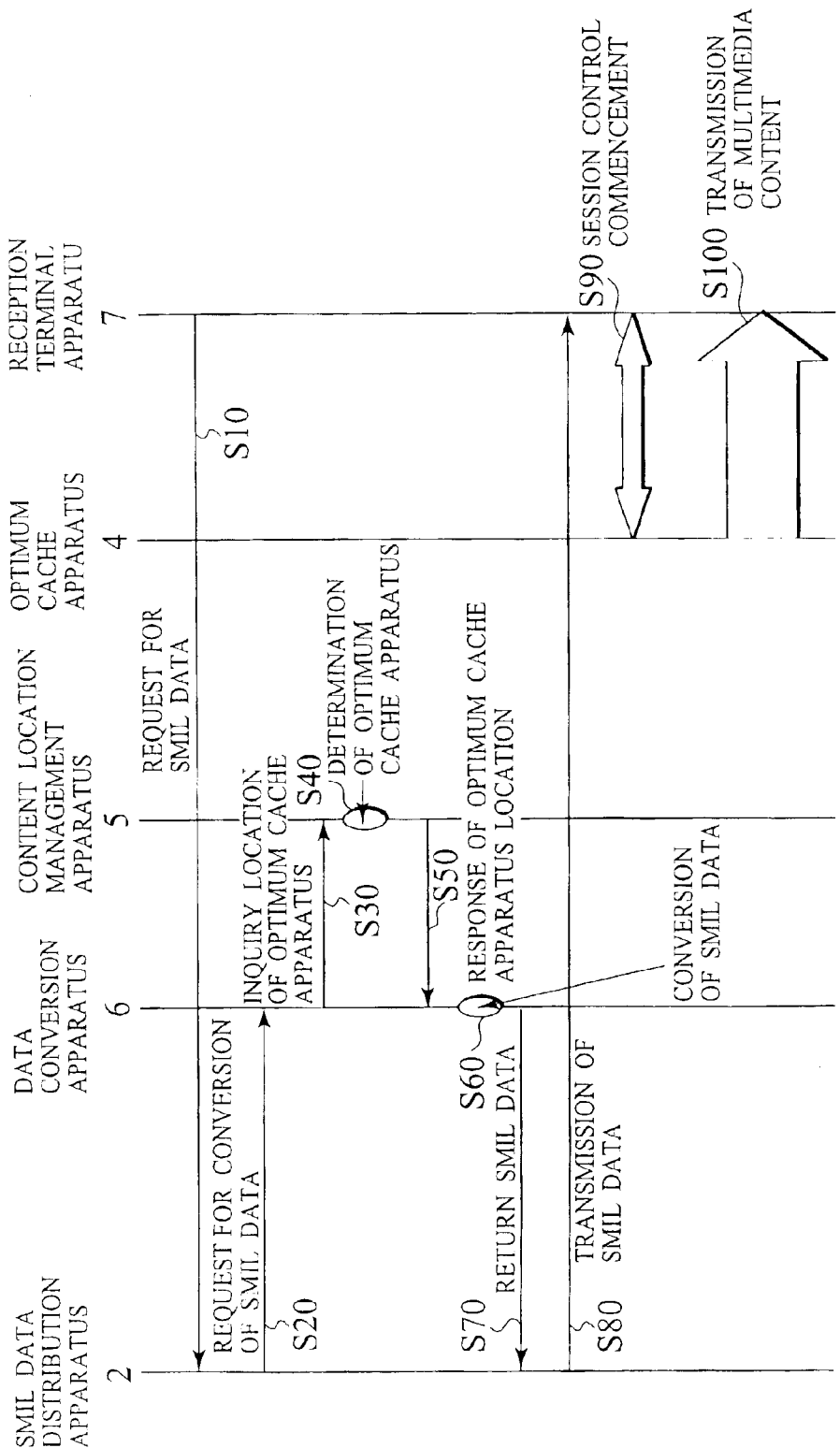
FIG. 12 is a sequence diagram illustrating content distribution processing according to the first embodiment.

FIG. 12 is a sequence diagram showing a content distribution method that uses the content distribution system having the configuration described above. In step S10, the reception terminal apparatus 7 transmits a request for SMIL data that indicates information concerning the predetermined content (content requested by a user) to the SMIL data distribution apparatus 2.

A specific description of this processing is made as follows. The user inputs a request for the SMIL data to the input unit 7c, and the request is transmitted to the control unit 7d. The control unit 7d reads the location information of the "SMIL data distribution apparatus 2" from the storage unit. The user may input the location information to the input unit 7c. The control unit 7d then obtains the request for the SMIL data and the location information of the "SMIL data distribution apparatus 2".

Based on the "location information of the SMIL data distribution apparatus 2", the control unit 7d transmits information identifying the predetermined content and the request for the SMIL data to the "SMIL data distribution apparatus 2" via the communication unit 7a. In this case, the "location information of the reception terminal apparatus 7" is transmitted to the "SMIL data distribution apparatus 2". Also, the "apparatus identification number" of the reception terminal apparatus 7 is transmitted to the "SMIL data distribution apparatus 2" if necessary.

In step S20, the SMIL data distribution apparatus 2 transmits request for converting the SMIL data to the data conversion apparatus 6. A specific description of this processing is provided as follows.

The reception terminal apparatus 7, for example, transmits the request for the SMIL data, and the information identifying the predetermined content to the control unit 2c of the SMIL data distribution apparatus 2. The control unit 2c reads SMIL data corresponding to the predetermined content from the SMIL data storage unit 2b. In this case, the control unit 2c holds the "location information of the reception terminal apparatus 7". The "location information of the reception terminal apparatus 7" is associated with the read SMIL data.

The control unit 2c then transmits the SMIL data and the location information of the reception terminal apparatus 7 to the "data conversion apparatus 6" via the communication unit 2a. In this case, the control unit 2c also transmits a request for converting the SMIL data to the data conversion apparatus 6.

In step S30, the data conversion apparatus 6 requests the "content location management apparatus 5" to provide the location information (such as, IP address) of the optimum cache apparatus. However, for example, the data conversion apparatus 6 may request for the "distribution source location information" (such as, URL) of the optimum cache apparatus to the "content location management apparatus 5".

Details are as described below. The conversion request is transmitted to the control unit 6c via the communication unit 6a. The control unit 6c transmits a request for the "location information of the optimum cache apparatus 4" to the "content location management apparatus 5" via the communication unit 6a. In this case, the information identifying the predetermined content and the location information of the reception terminal apparatus 7 are transmitted to the content location management apparatus 5. It should be noted that the "apparatus identification number" of the "reception terminal apparatus 7" may be transmitted to the content location management apparatus 5.

It should be noted that in the case where the data conversion apparatus 6 inquires to the content location management apparatus 5 about a plurality of "distribution source location information", the data conversion apparatus 6 inquires each "distribution source location information" based on the order of requested content. In this case, the data conversion apparatus 6 may also transmit the expected access time to the content location management apparatus.

In step S40, the content location management apparatus 5 determines the optimum cache apparatus. A specific description of this processing is as follows. For example, a request for the location information of the optimum cache apparatus, the location information of the reception terminal apparatus 7, and information identifying the predetermined content are transmitted to the "optimum cache determination unit" 5e via the communication unit 5a and control unit 5f.

The optimum cache determination unit 5e reads the proximity table from the proximity table storage unit 5d. Referencing the proximity table, the "optimum cache determination unit" 5e then determines the cache apparatus 4 close to the reception terminal apparatus 7.

The optimum cache determination unit 5e then determines the cache apparatus 4 closest to the reception terminal apparatus 7 as the "optimum cache apparatus". Furthermore, the control unit 5f references the location information table, and obtains the location information (such as, an IP address/URL) of the optimum cache apparatus.

In step S50, the information identifying the optimum cache apparatus determined by the optimum cache determination unit 5e, and the location information of the optimum cache apparatus are transmitted to the data conversion apparatus 6 via the control unit 5f and communication unit 5a. In this case, the information identifying the optimum cache apparatus is associated with the location information of the reception terminal apparatus 7 and the information identifying the predetermined content. Then, the information identifying the "optimum cache apparatus" is transmitted to the data conversion apparatus 6. Furthermore, the location information of the optimum cache apparatus is associated with the location information of the reception terminal apparatus 7 and the information identifying the predetermined content. Then, the location information of the "optimum cache apparatus" is transmitted to the data conversion apparatus 6.

In step S60, the conversion unit 6b of the data conversion apparatus 6 performs SMIL data conversion. A specific description of this processing is as follows. For example, the location information of the optimum cache apparatus is transmitted to the conversion unit 6b via the control unit 6c.

The control unit 6b searches for an identifier (such as, <audio src=, <video src=) indicating the distribution source, from among information included in the SMIL data that corresponds to the above predetermined content. If the identifier is searched, the conversion unit 6b then obtains the distribution source location information of the content distribution apparatus 3. The "distribution source location information" is "rtsp://haisen-souchi-3/content-V-1.mp4", for example.

The conversion unit 6b then converts the "obtained distribution source location information" into the "distribution source location information of the optimum cache apparatus 4". In the case where the location information of the transmitted optimum cache apparatus 4 is an IP address, and the distribution source location information described in the SMIL data is an URL, the IP address is converted into an URL by a predetermined apparatus.

Furthermore, after the IP address of the "optimum cache apparatus" is converted into the URL of the "optimum cache apparatus", the URL (distribution source location information) of the "optimum cache apparatus" may be transmitted to the conversion unit 6b.

Figure 13:
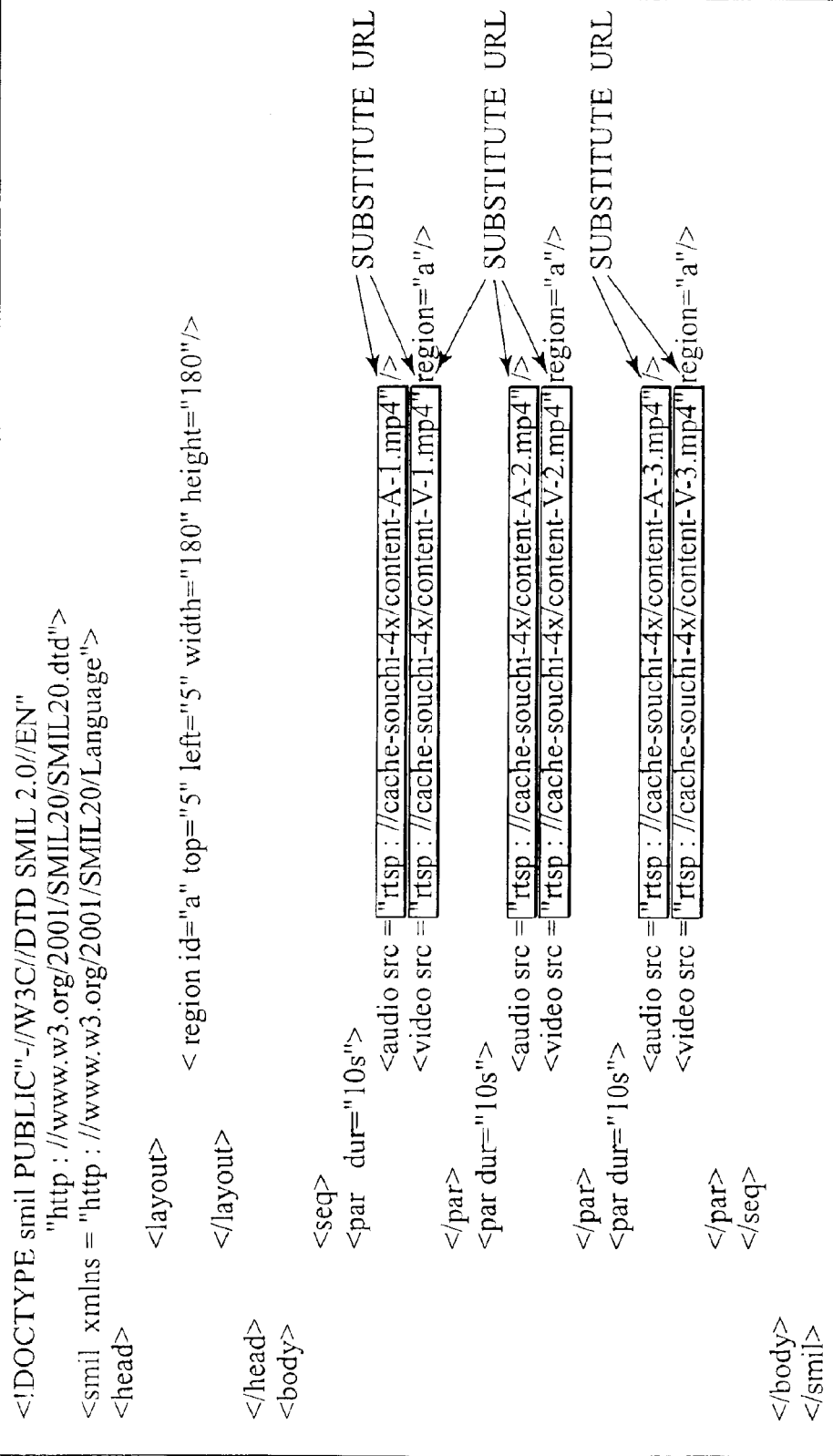
FIG. 13 is a diagram showing converted SMIL data.

Also, in the case where each data belonging to the content is dispersed among a plurality of files, the conversion unit 6b performs the conversion, processing for each of the data. FIG. 13 is a diagram showing an example of SMIL data converted by the conversion unit 6b.

The "distribution source location information" (rtsp://haisen-souchi-103/content-V-1.mp4) of the content distribution apparatus 3 has been converted into the "distribution source location information" (rtsp://cache-souchi-4x/content-V-1.mp4) of the cache apparatus 4, in the converted SMIL data.

It should be noted that in step S50, instead of the location information of the optimum cache apparatus 4, the location information table may be transmitted to the data conversion apparatus 6. In step S60, referencing the location information table, the conversion unit 6b of the data conversion apparatus 6 may then convert the "distribution source location information" of the content distribution apparatus 3, which is included in the SMIL data, into "the distribution source location information" of the optimum cache apparatus.

In step S70, the converted SMIL data is transmitted to the SMIL data distribution apparatus 2 via the control unit 6c and the communication unit 6a. Communication between the SMIL data distribution apparatus 2 and data conversion apparatus 6 is performed by using "ICAP" or "SOAP", for example.

In step S80, the converted SMIL data is transmitted to the control unit 2c via the communication unit 2a. Based on the retained "location information of the reception terminal apparatus 7", the control unit 2c transmits the "converted SMIL data" to the control unit 7a of the reception terminal apparatus 7 via the communication unit 2a. Here, "converted SMIL data" is SMIL data converted by the conversion unit 6b.

In step S90, the control unit 7a of the reception terminal apparatus 7 transmits "request for session control commencement" to the control unit 4c of the optimum cache apparatus based on the "distribution source location information" of the optimum cache apparatus, which is included in the converted SMIL data. The protocol for this session control may be RTSP, for example.

At the same time, the control unit 7d of the reception terminal apparatus 7 controls the counter based on the "synchronization time information". More specifically, the control unit 7d controls clock of a counter in the optimum cache apparatus to be synchronized with clock of a counter in the reception terminal apparatus 7. In other words, the control unit 7d controls to perform synchronized data communication between the optimum cache apparatus and the reception terminal apparatus 7.

The control unit 4c of the optimum cache apparatus transmits a command for initiating session control to the reception terminal apparatus 7 based on the command for session control commencement. As a result, a connection between the reception terminal apparatus 7 and the optimum cache apparatus 4 is established.

Also, the control unit 4c of the optimum cache apparatus controls to perform "synchronized data communication" with the reception terminal apparatus 7 based on the synchronization time information. After the connection is established, the control unit 4c of the optimum cache apparatus transmits the predetermined contents to the reception terminal apparatus 7 during the time indicated by the "content time information" based on the "distribution commencement time information" (S100). In this case, after the session is established by protocol for session control(such as RTSP), the optimum cache apparatus performs multimedia packet transmission using RTP, for example.

It should be noted that when request for session control commencement is transmitted, in the case where the predetermined content is not stored in the optimum cache apparatus, the optimum cache apparatus accesses the content distribution apparatus 3 in which the predetermined content is stored. The optimum cache apparatus then obtains the predetermined content from the content distribution apparatus 3.

The control unit 7d of the reception terminal apparatus 7 obtains the transmitted the predetermined content, and transmits them to the replay unit 7b. The replay unit 7b replays the predetermined content based on the "content time information".

For example, a description of replay processing using FIG. 13 is as follows. File (content-A-1.mp4) is transmitted from the optimum cache apparatus 4 to the reception terminal apparatus 7 for ten seconds (content time information) after starting distribution. The control unit 7d of the reception terminal apparatus 7 instructs the communication unit 7a to receive the above file for ten seconds (content time information) after starting reception. The control unit 7d then instructs the replay unit 7b to replay the file for ten seconds (content time information) after starting replay.

(Operation Results)

According to the present embodiment, the conversion unit 6b performs the conversion processing for the SMIL data which includes the location information of the "content distribution apparatus 3" in which requested content is stored as described below. The conversion unit 6b converts the location information (distribution source location information) of the content distribution apparatus 3, which is included in the SMIL data, into the location information (distribution source location information) of the specified cache apparatus 4. This specified cache apparatus 4 is an optimum cache apparatus determined by the optimum cache determination unit 5e, for example.

In addition, the control unit 7d of the reception terminal apparatus 7 obtains "converted SMIL data", which is SMIL data converted by the conversion unit 6b. The control unit 7d then obtains the above requested content from the cache apparatus 4 based on the converted SMIL data.

Thus, the reception terminal apparatus 7 can access cache apparatus 4 that are not registered in the reception terminal apparatus 7. The reception terminal apparatus 7 may also access cache apparatus 4 that are apparatus other than the distribution apparatus 3 specified by "distribution source location information" included already in the SMIL data. As a result, the reception terminal apparatus 7 can fully utilize the cache apparatus 4 that are linked to the network. Accordingly, the content distribution system of this embodiment is capable of effectively utilizing network resources.

Furthermore, when the cache apparatus 4 that the reception terminal apparatus 7 can access to quickly is linked to the network, and if the cache apparatus 4 is not registered in the reception terminal apparatus 7, the reception terminal apparatus 7 can obtain the "converted SMIL data", which includes the location information of the cache apparatus 4. Accordingly, the access time necessary for the reception terminal apparatus 7 to obtain content is reduced. As a result, the content distribution system of this embodiment allows for network congestion to be prevented, as well as for content distribution quality to substantially improved.

Furthermore, in the present embodiment, for example, the optimum cache determination unit 5e determines the cache apparatus closest to the reception terminal apparatus 7 as the optimum cache apparatus". The conversion unit 6b then converts the "distribution source location information" of the "content distribution apparatus 3", which is included in the SMIL data, into the "distribution source location information" of the "optimum cache apparatus". This converted SMIL data is then transmitted to the reception terminal apparatus 7. Accordingly, the reception terminal apparatus 7 can obtain content from the cache apparatus 4 closest to the reception terminal apparatus 7 based on the converted distribution source location information. As a result, content distribution quality is improved more substantially, since packet loss in the network and data quality deterioration (such as delay) are reduced.

It should be noted that in the present embodiment, SMIL is used as the description language for the content description data. The description language of this content description data is not limited to SMIL as long as the language is able to identify the transmission source of the contents. For example, the content description data may be "helper file data" that includes only the URL that identifies the transmission source of the content. The effects of this embodiment are obtained even in the case of using helper file data.

Although RTSP has been used as the session control protocol for content distribution in this embodiment, the session control protocol is not be limited to RTSP. Furthermore, although RTP has been used as the transmission protocol for contents in this embodiment, the transmission protocol is not limited to RTP.

It should be noted that the conversion unit 6b may also perform conversion processing as described below. The storage unit 5b of the content location management apparatus 5 stores a "content location information table" in which information specifying each content is associated with the location information of cache apparatus 4.

Referencing the "content location information table", the conversion unit 6b performs as described below conversion processing for the SMIL data, which includes the location information of the content distribution apparatus 3 which stores content requested by user.

The conversion unit 6b may also convert the location information of the content distribution apparatus 3, which is included in the SMIL data, into the location information of the cache apparatus 4 that already stores the requested content. Hereinafter, content requested by user is referred to as "requested content".

Second Embodiment

In the content distribution system of the first embodiment, for example, the optimum cache determination unit 5e determined a cache apparatus closest to the reception terminal apparatus 7 as the optimum cache apparatus. In the present embodiment, the optimum cache determination unit 5e can determine the optimum cache apparatus also in consideration of the "load condition" of each cache apparatus 4.

(Configuration)

In the present embodiment, the same reference numerals are given to the configuration identical to that of the first embodiment, whereby description thereof is omitted. In the second embodiment, the configuration of the cache apparatus 4 and the functions of the optimum cache determination unit 5e differ from the first embodiment.

Figure 14:
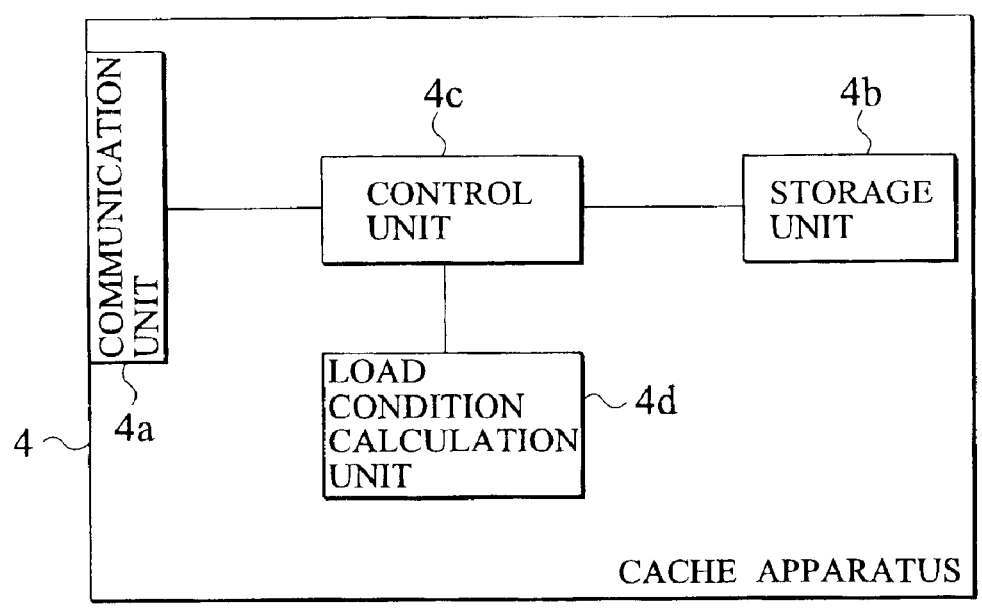
FIG. 14 is a diagram illustrating the configuration of a cache apparatus 4 according to a second embodiment.

FIG. 14 is a diagram illustrating the configuration of a cache apparatus 4 of the second embodiment. Each cache apparatus 4 includes a "load condition calculation unit" 4d. The "load condition calculation unit" 4d calculates the present load conditions of the cache apparatus 4, based on one or more items of information from among the CPU usage rate of cache apparatus 4, the transmission rate, and the number of connected users, for example.

It should be noted that the load condition calculation unit 4d may exist in the content location management apparatus 5, for example. The load condition calculation unit 4d of the content location management apparatus 5, for example, then obtains the CPU usage rate of the cache apparatus 4, the transmission rate and the number of connected users, which have been sent from the cache apparatus 4. Based on each of the obtained information, the load condition calculation unit 4d may then calculate the load condition of each cache apparatus 4.

The optimum cache determination apparatus 5e may determine the optimum cache apparatus in consideration of one or more items of information from among proximity level, load condition, available area of cache apparatus 4, and information indicating whether or not contents are already stored in cache apparatus. For example, the optimum cache determination unit 5e may also determine the cache apparatus 4 corresponding to the lightest load condition as the "optimum cache apparatus".

An example of the determination method by the optimum cache determination unit 5e is as described below. The optimum cache determination unit 5e can determine the optimum cache apparatus in consideration of the proximity level and load condition. Here, when the optimum cache apparatus is determined by the optimum cache determination unit 5e, the "state that the optimum cache apparatus does not store requested content" is forgiven. The optimum cache determination unit 5e may also determine the cache apparatus that stores the content requested by a user as the optimum cache apparatus.

The optimum cache determination unit 5e determines the optimum cache apparatus by a method as described below. The optimum cache determination unit 5e refers to a proximity table, and determines the "first cache apparatus candidates", which are a plurality of cache apparatus close to the reception terminal apparatus 7. The optimum cache determination unit 5e may refer to the content location information table, and may determine the "cache apparatus storing the content the user has requested" from among the first cache apparatus candidates as the "second cache apparatus candidate". In the case where there are a plurality of second cache apparatus candidates, the optimum cache determination unit 5e determines the cache apparatus corresponding to the lightest load condition as the "optimum cache apparatus" based on load condition calculated by each load condition calculation unit 4d of second cache apparatus candidates.

(Processing)

In the content distribution method using the content distribution system of the second embodiment, the description of processing identical to processing for the content distribution method of the first embodiment is omitted. In the content distribution method of the present embodiment, processing of step S40 in FIG. 12 differs from processing for the first embodiment.

Figure 15:
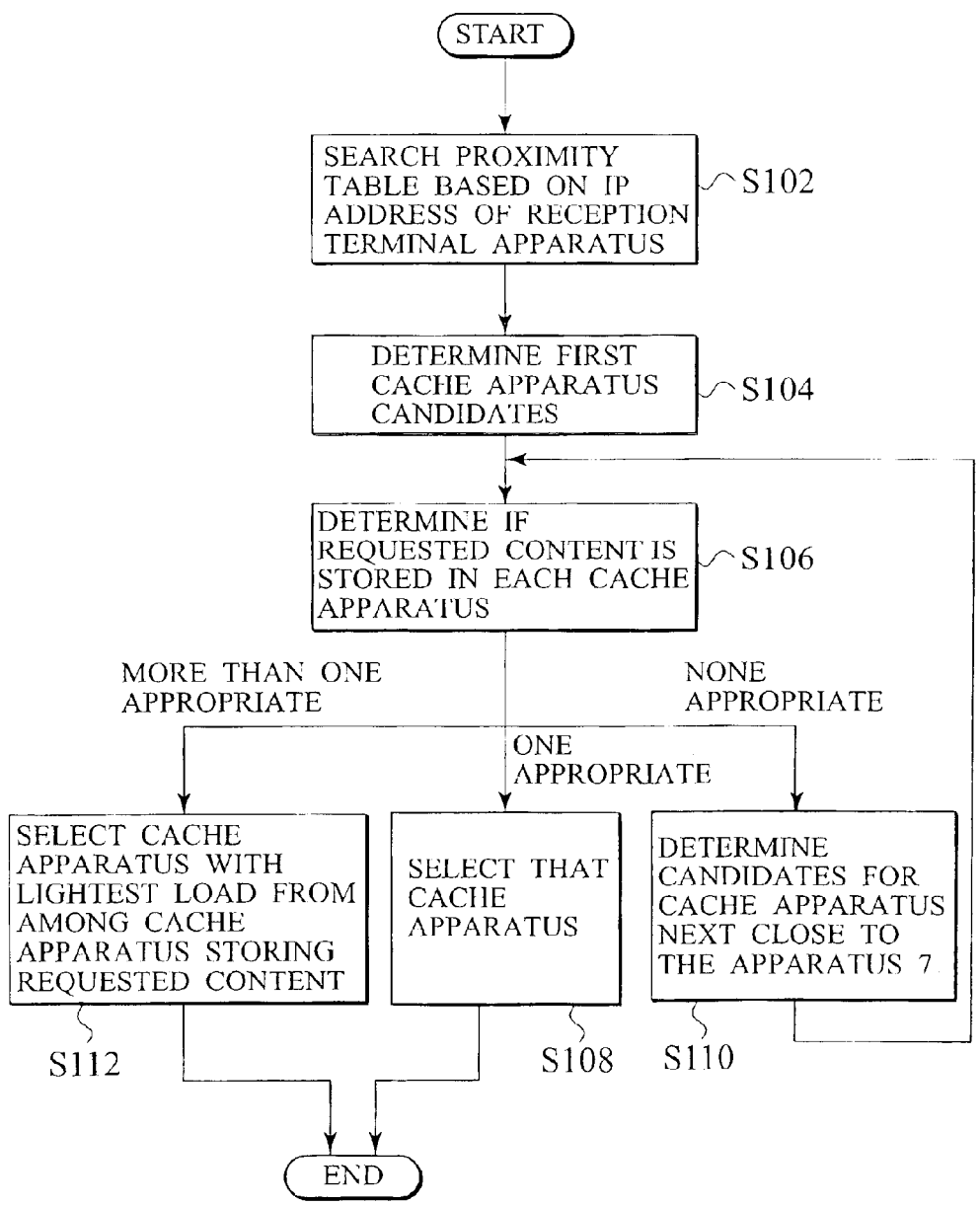
FIG. 15 is a flowchart showing determination processing by an optimum cache determination unit according to the second embodiment.

FIG. 15 is a flowchart for describing an example of determination processing by the optimum cache determination unit 5e of the second embodiment. The following processing is executed after the processing of step S30.

For example, a request for location information (distribution source location information) of the optimum cache apparatus is transmitted to the optimum cache determination unit 5e via the control unit 5f of the content location management apparatus 5. Furthermore, the location information (such as, an IP address) of the reception terminal apparatus 7 and the information identifying the predetermined content are transmitted to the optimum cache determination unit 5e.

The optimum cache determination unit 5e reads the proximity table from the proximity table storage unit 5d. Referencing the proximity table (S102), the optimum cache determination unit 5e determine first cache apparatus candidates, which are the cache apparatus 4 close to the reception terminal apparatus 7 (S104).

In step S106, the optimum cache determination unit 5e reads the "content location information table" from the storage unit 5b. The optimum cache determination unit 5e then determines second cache apparatus candidate storing the predetermined content, from among the first cache apparatus candidates.

The optimum cache determination unit 5e then determines if there are one, none or a plurality of second cache apparatus candidates.

In the case where one second cache apparatus candidate is determined by the optimum cache determination unit 5e, the optimum cache determination unit 5e determines the second cache apparatus candidate as the "optimum cache apparatus" in step S108.

In the case where no second cache apparatus candidate is determined by the optimum cache determination unit 5e, in step S110, referencing the proximity table, the optimum cache determination unit 5e determines the candidates for another cache apparatus close to the reception terminal apparatus 7 as the "first optimum cache apparatus candidates". "The candidates for another cache apparatus" is close to the reception terminal apparatus 7 next to the already determined first cache apparatus candidates. Processing then proceeds to step S106.

In the case where a plurality of second cache apparatus candidates are determined by the optimum cache determination unit 5e, in step S112, the optimum cache determination unit 5e determines the cache apparatus 4 corresponding to the lightest load condition from among the plurality of second cache apparatus candidates as the "optimum cache apparatus". A specific description of this processing is as described below.

The optimum cache determination unit 5e transmits request for the load condition of each cache apparatus (each second cache apparatus candidate) 4 to each cache apparatus 4 via the control unit 5f and communication unit 5a. In that case, the request for the load conditions is transmitted to each load condition calculation unit 4d via the communication unit 4a of each cache unit 4.

Each of the load condition calculation units 4d calculates the load condition. The calculated load conditions are transmitted to the content location management apparatus 5 via the control units 4c and communication units 4a.

Each of the load conditions are transmitted to the optimum cache determination unit 5e of the content location management apparatus 5. The optimum cache determination unit 5e determines the cache apparatus corresponding to the lightest load condition from among the plurality of cache apparatus 4 (the second cache apparatus candidates) as "the optimum cache apparatus" 4.

(Operation Results)

In the present embodiment, the optimum cache determination unit 5e determines the optimum cache apparatus in consideration of the load condition of the cache apparatus 4. Thus, even in the case where the load conditions of each cache apparatus are different, the reception terminal apparatus 7 can access the cache apparatus 4 corresponding to the lightest load condition. Accordingly, the responses from the cache apparatus 4 are quickly transmitted to the reception terminal apparatus 7. As a result, the time period required for the reception terminal apparatus 7 to access the cache apparatus 4 is reduced. Accordingly, content distribution quality is improved. Furthermore, interruption of content distribution during content distribution, and delay of content distribution are prevented. Thus, stable content distribution is possible.

It should be noted that if a content requested by a user is stored in the optimum cache apparatus, the following results are obtained. "Processing for the optimum cache apparatus to transmit content requests to the content distribution apparatus 3" and "processing for the content distribution apparatus 3 to transmit the contents to the optimum cache apparatus" become unnecessary. Thus, network resources are no longer consumed wastefully.

(First Modified Example of the Second Embodiment)

Figure 16:
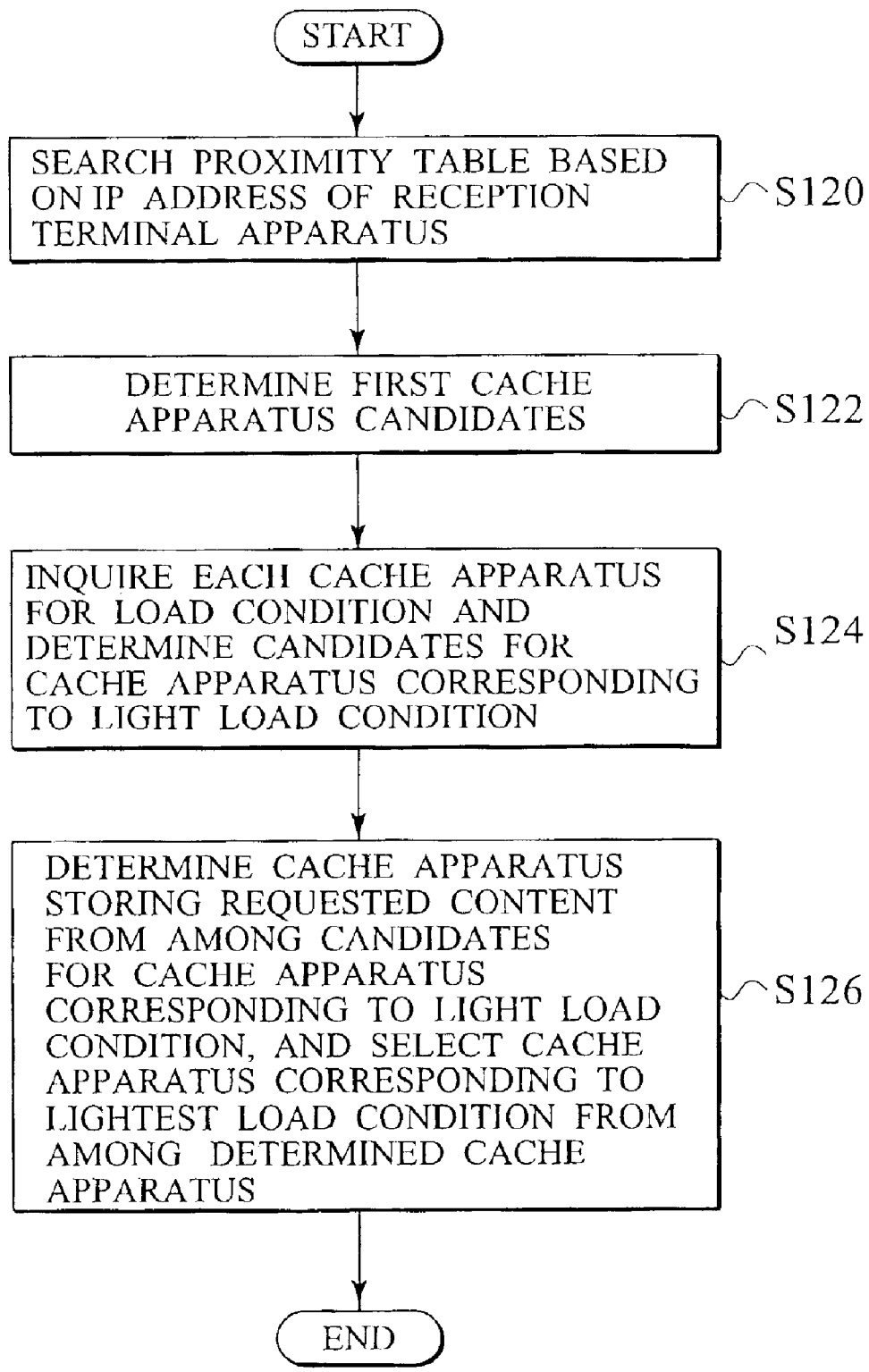
FIG. 16 is a flowchart showing determination processing by the optimum cache determination unit according to the second embodiment.

Also, the determination processing for the optimum cache apparatus may be modified as described below. FIG. 16 is a flowchart showing determination processing by an optimum cache determination unit 5e according to the first modified example. In step S120, processing of step S102 is executed, and in step S122, processing of step S104 is executed.

In step S124, the optimum cache determination unit 5e then transmits an inquiry for load condition to each first cache apparatus candidate. Each load condition is transmitted to the optimum cache determination unit 5e. Based on each load condition, the optimum cache determination unit 5e determines the cache apparatus candidates corresponding to light load condition.

In step S126, referencing the content location information table, the optimum cache determination unit 5e determines cache apparatus 4, storing the content requested by the user, from among the cache apparatus candidates The optimum cache determination unit 5e then determines the cache apparatus 4 corresponding to the lightest load condition from among the determined cache apparatus, as the optimum cache apparatus.

Furthermore, the optimum cache determination unit 5e may be determined as follows. The optimum cache determination unit 5e determines "cache apparatus that stores content" from among cache apparatus (the "first cache apparatus candidates") corresponding to light load condition, as the "second cache apparatus candidates". The optimum cache determination unit 5e may also determine the "cache apparatus 4 closest to the reception terminal apparatus 7" from among "the second cache apparatus candidates", as the "optimum cache apparatus".

Furthermore, the optimum cache determination unit 5e may determine the "cache apparatus 4 corresponding to the lightest load condition" from among "a plurality of cache apparatus 4 that store the content requested by the user" as the "optimum cache apparatus".

(Second Modified Example of the Second Embodiment)

Generally, the earlier the content is distributed, the higher the probability becomes for content to be requested by the reception terminal apparatus 7. Thus, in the case where the reception terminal apparatus 7 obtains the content expected to be distributed early, the optimum cache determination unit 5e determines the cache apparatus close to the reception terminal apparatus 7 (or the cache apparatus 4 corresponding to a light load condition) as the "optimum cache apparatus".

On the other hand, the later the content is distributed, the lower the probability becomes for content to be requested by the reception terminal apparatus 7. Thus, in the case where the reception terminal apparatus 7 obtains the content expected to be distributed later, the optimum cache determination unit 5e determines the cache apparatus far from the reception terminal apparatus 7 (or the cache apparatus 4 corresponding to a high load condition) as the "optimum cache apparatus".

Third Embodiment

In the case where the amount of data of content is extremely large, the content distribution time may reach several tens of minutes or a few hours, for example. Even in the case where, the amount of data of content is extremely large, in the first embodiment, content is stored in each cache apparatus 4.

However, in such case, the memory resources of the storage unit 4b of the cache apparatus 4 are greatly consumed. Thus, data other than the above content can no longer be stored in the storage unit 4b. Furthermore, the hardware structure of the cache apparatus 4 that stores the content increases in amount. Furthermore, even in the case where the reception terminal apparatus 7 suspends content reception midway, the cache apparatus 4 must store entire content and consume its memory resource.

Consequently, in the third embodiment, content with a large amount of data is divided. In addition, each of the sections of divided content are stored in the same cache apparatus 4 or in separate cache apparatus 4. Accordingly, for example, "the state where network resources and memory resources of the cache apparatus 4 are wastefully consumed" is reduced.

(Configuration of Content Distribution System)

Figure 17:
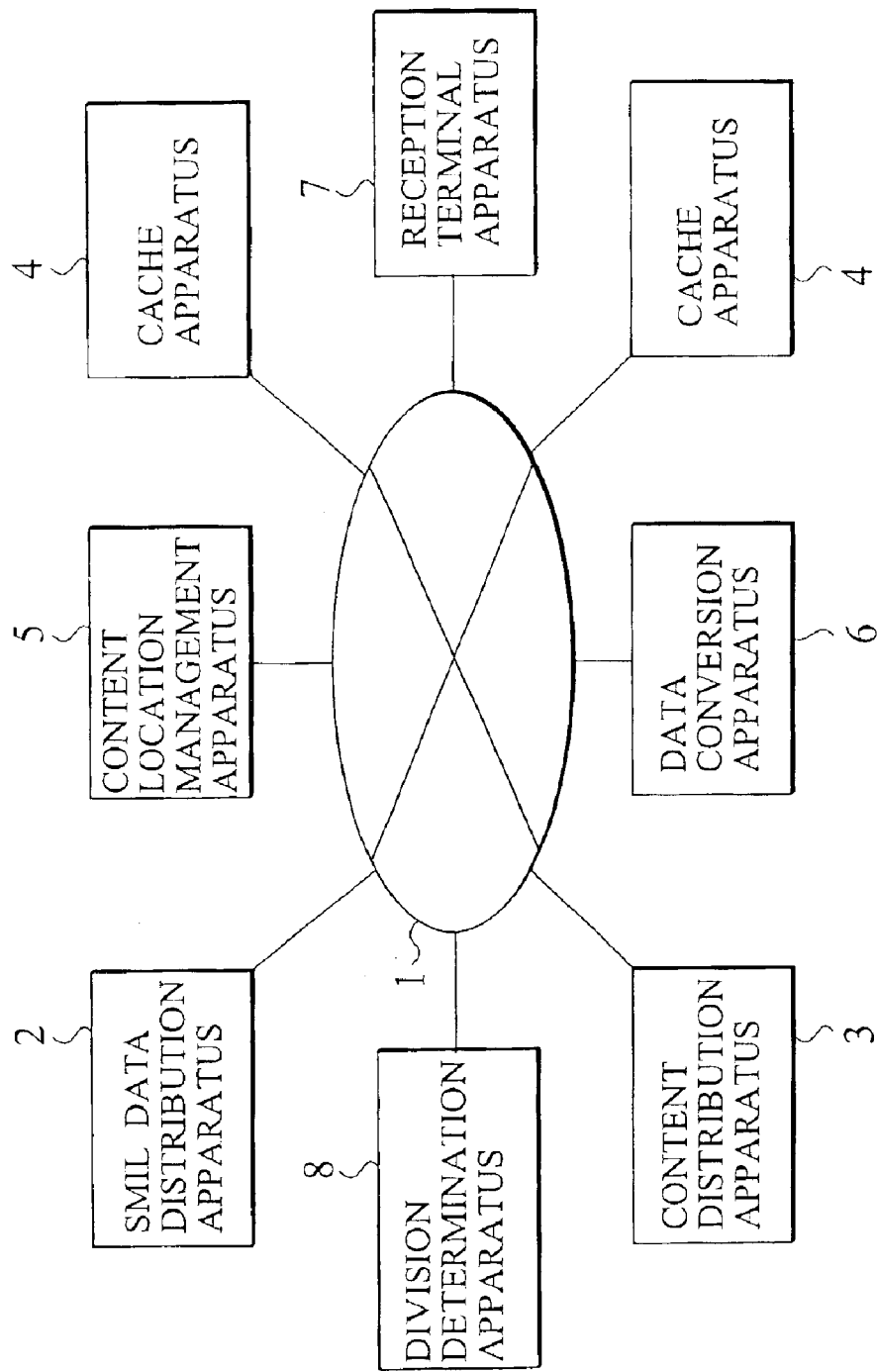
FIG. 17 is a diagram illustrating the configuration of a content distribution system of a third embodiment.

FIG. 17 is a diagram illustrating the configuration of a content distribution system according to the third embodiment. In the configuration of the third embodiment, the matters differing from the configuration of the second embodiment are as described below. It should be noted that in the third embodiment, the same reference numerals are given to the configuration identical to that of the second embodiment, whereby description thereof is omitted.

Here, each content distribution apparatus 3 stores a plurality of sections of divided content. Each cache apparatus 4 obtains one or the plurality of sections of divided content from a content distribution apparatus 3, and stores them temporarily.

(Division Determination Apparatus)

Figure 18:
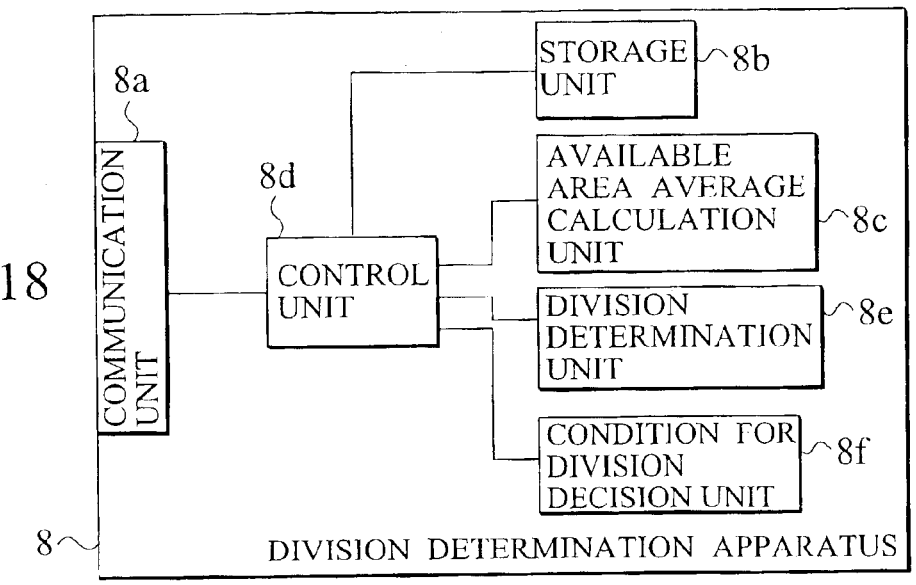
FIG. 18 is a diagram illustrating the configuration of a division determination apparatus according to the third embodiment.

A division determination apparatus 8 is linked to the network 1. FIG. 18 is a diagram illustrating the configuration of the division determination apparatus 8. The division determination apparatus 8 includes a storage unit 8b, storing an "available area table" indicating the amount of available area(hereinafter "amount of available area" is referred to "available area amount") for storing data in each cache apparatus 4; an available area average calculation unit 8c, which calculates the average of the available area amounts of cache apparatus 4; a division determination unit 8e, which determines whether or not to perform the division of content; a condition for division decision unit 8f, which decides the condition for division of the content; a communication unit (a transmitter and a receiver) 8a, which performs data communication with each apparatus; and a control unit 8d, which controls each of the units.

The control unit 8d reads the "available area table" from the storage unit 8b. The control unit 8d refers to the "available area table", and then obtains available area amount for each cache apparatus 4. Furthermore, the control unit 8d rewrites content of the "available area table" if necessary.

In the case where the amount of data of a content exceeds a predetermined amount (such as, one mega byte), the division determination unit 8e determines to perform division of the content. This a predetermined amount can be set to a variety of values. An example of determination processing by the "division determination unit 8e" is as described below. The division determination unit 8e determines to perform division of content in the case where the amount of data of the content exceeds the "average of the available area amounts for cache apparatus 4", which is calculated by the available area average calculation unit 8c. Hereinafter, "the average of the available area amounts of cache apparatus 4" is referred to as "the average amount of available area".

The condition for division decision unit 8f determines the condition for division of dividing the content requested by a user into a plurality of sections of divided content. Hereinafter, the "divided content", is referred to as "divided request content".

(Cache Apparatus)

Figure 19:
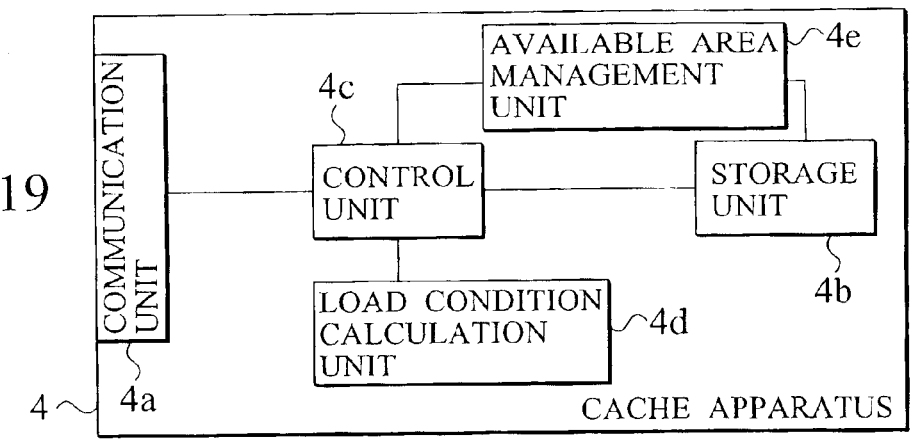
FIG. 19 is a diagram illustrating the configuration of cache apparatus according to the third embodiment.

FIG. 19 is a diagram illustrating the configuration of a cache apparatus 4. In addition to the configuration of the cache apparatus 4 according to the second embodiment, the "cache apparatus 4 according to the third embodiment" includes an available area management unit 4e, which manages the "available area amount" for the storage unit 4b. The available area management unit 4e accesses the storage unit 4b. The available area management unit 4e then obtains the available area amount for the storage unit 4b, and holds the value (available area amount) thereof.

It should be noted that each content distribution apparatus 3 stores a plurality of sections of divided content Each cache apparatus 4 obtains one or a plurality of sections of divided content from any of content distribution apparatus 3, and temporarily stores them.

(Content Location Management Apparatus)

Furthermore, the storage unit 5b of the content location management apparatus 5 stores "apparatus location information data" which shows the location information of apparatus that are linked to the network 1. The apparatus linked to the network 1 are the cache apparatus 4, the content distribution apparatus 3, the SMIL data distribution apparatus 2, and the division determination apparatus 8. It should be noted that the "location information of a content distribution apparatus 3" is associated with the "information identifying a content that is stored in the content distribution apparatus 3" for each content distribution apparatus 3.

Furthermore, the storage unit 5b of the content location management apparatus 5 stores a "division location information table", which indicates the location information of each cache apparatus 4 that temporarily stores one or a plurality of sections of divided content.

In the case where the division determination unit 8e determines to divide "the requested content" into a plurality of sections of "divided request content", the optimum cache determination unit 5e determines one or a plurality of cache apparatus 4 capable of storing the divided request content as the "optimum cache apparatus" based on the available area amount for the storage unit 4b in each cache apparatus 4.

(Data Conversion Apparatus)

Figure 20:
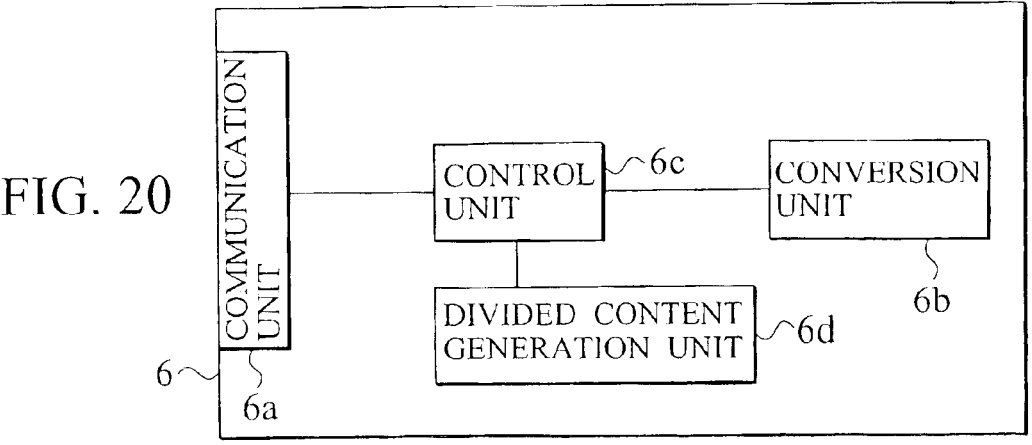
FIG. 20 is a diagram illustrating the configuration of data conversion apparatus according to the third embodiment.

FIG. 20 is a diagram illustrating the configuration of the data conversion apparatus 6. The data conversion apparatus 6 according to the third embodiment includes a "divided content generation unit 6d" in addition to the configuration of the data conversion apparatus 6 of the second embodiment.

In the case where the division determination unit 8e determines to perform division, the divided content generation unit 6d generates a plurality of sections of divided content by executing the division of the content. For example, the divided content generation unit 6d generates a plurality of sections of divided content by executing the division of the content in accordance with the condition for division, which is determined by the condition for division decision unit 8f. Furthermore, the divided content generation unit 6d executes the division of content so that each section of divided content is consecutive. "Each section of divided content is consecutive" means that in the case "end part of first divided content" leads to "start part of second divided content", "the distribution commencement time corresponding to second divided content" is the "distribution completion time corresponding to first divided content".

It should be noted that in the case where the content requested by a user has been divided into a plurality of sections of divided request content, the conversion unit 6b performs the following processing. The conversion unit 6b, for example, refers to the "division location information table", and performs the conversion of the SMIL data, which includes the "distribution source location information" of content distribution apparatus 3, in which the plurality of sections of "divided request content" are stored. More specifically, the conversion unit 6b converts the "distribution source location information" of the content distribution apparatus 3, which is included in the SMIL data, into the "distribution source location information" of at least one predetermined cache apparatus 4.

(Content Distribution Method using the Content Distribution System)

Figure 21:
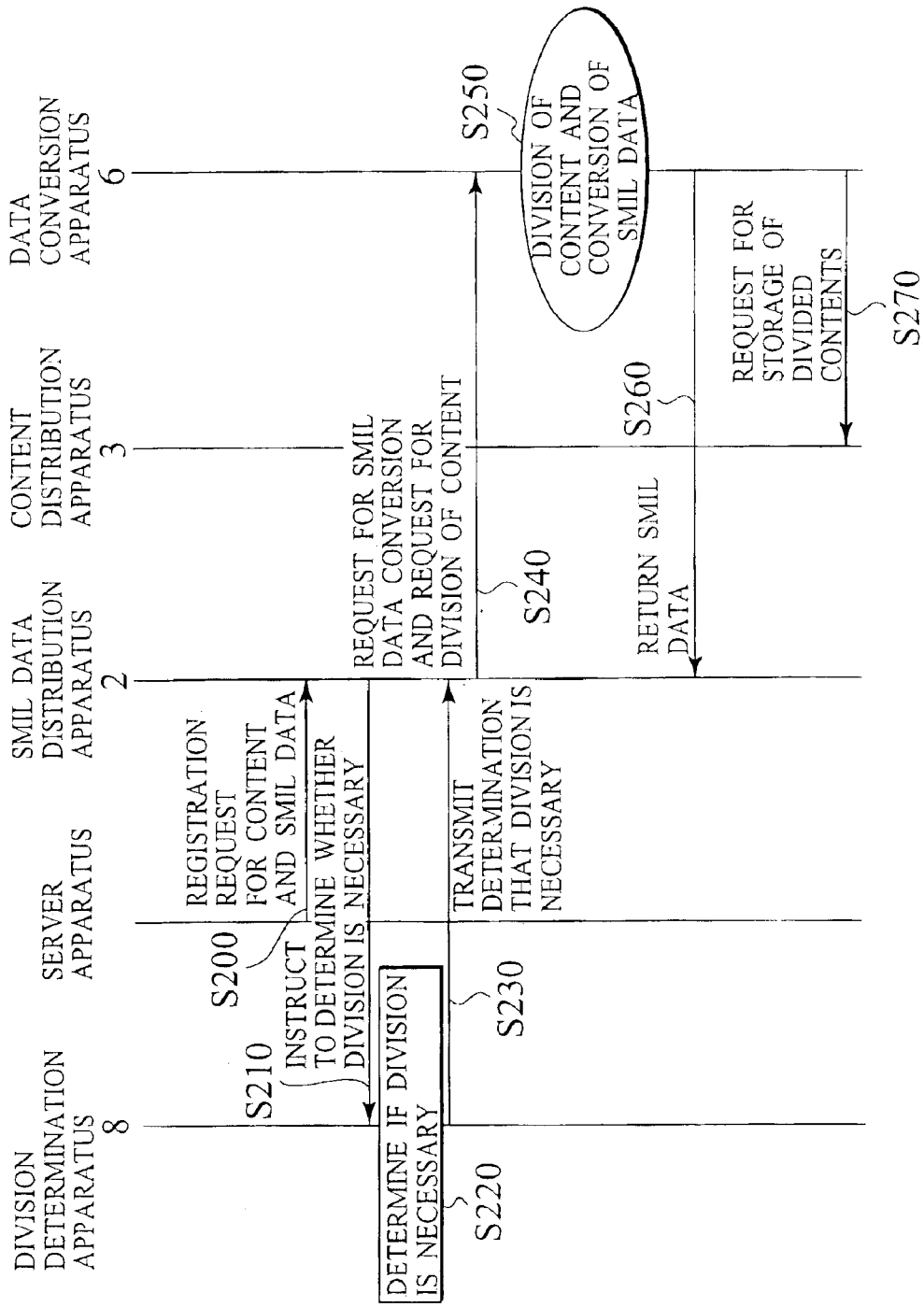
FIG. 21 is a sequence diagram illustrating process of storing divided content in a content distribution apparatus according to the third embodiment.

(1) Division Processing Performed During Content Registration and SMIL Data Registration FIG. 21 is a sequence diagram for describing division processing performed by the content distribution system which includes the configuration described above.

In step S200, a given server apparatus transmits to the SMIL data distribution apparatus 2 a request for registration of the predetermined content and a request for registration of the SMIL data, which corresponds to the predetermined content.

More specifically, a user who holds the predetermined content inputs the request for registration to an input unit of the server apparatus. In such case, that request is transmitted to the control unit of the server apparatus. The control unit reads the predetermined content from the storage unit. The control unit then transmits the request for registration and the predetermined content to the SMIL data distribution apparatus 2 through the communication unit. In this case, the SMIL data created by the user is also transmitted to the SMIL data distribution apparatus 2.

In step S210, the control unit 2c of the SMIL data distribution apparatus 2 holds the transmitted SMIL data. It should be noted that the server apparatus may also transmit information necessary for generating SMIL data to the SMIL data distribution apparatus 2. In addition, the control unit 2c of the SMIL data distribution apparatus 2 may also generate the SMIL data based on the information necessary for generating SMIL data, and may hold the SMIL data.

The control unit 2c of the SMIL data distribution apparatus 2 then transmits to the division determination apparatus 8 via the communication unit 2a, an instruction for "the division determination apparatus 8" to determine whether or not the division of the predetermined content is necessary. In this case, the SMIL data distribution apparatus 2 also transmits the "amount of data" of the predetermined content to the division determination apparatus 8.

In step S220, the control unit 8d of the division determination apparatus 8, which receives the above instruction, transmits the instruction to the division determination unit 8e. The division determination unit 8e determines whether or not to divide the predetermined content based on the above instruction. A specific description of this processing is as follows.

In the case where the amount of data of the content exceeds a predetermined amount (such as, one mega byte), the division determination unit 8e determines to perform division of the content. For example, the division determination unit 8e determines to perform division of content in the case where the amount of data of the content exceeds the "average amount of available area", which is calculated by the "available area average calculation unit" 8c.

A detailed description is as described below. The division determination unit 8e reads the available area table from the storage unit 8b via the control unit 8d. Referencing the available area table, the division determination unit 8e then obtains available area amount for each cache apparatus 4. The division determination unit 8e then transmits each available area amount to the "available area average calculation unit" 8c via the control unit 8d. The available area average calculation unit 8c calculates above "average amount of available area". The calculated "average amount of available area" is transmitted to the division determination unit 8e.

The division determination unit 8e compares the "amount of data of the predetermined content", which is transmitted from the SMIL data distribution apparatus 2, with the calculated "average amount of available area". The division determination unit 8e then determines not to perform division if the "average amount of available area" is larger than the amount of data (amount of data of the predetermined content).

On the other hand, the division determination unit 8e determines to perform division if the "average amount of available area" is smaller than the amount of data. In the case where the division determination unit 8e determines to perform division, subsequent processing to step S230 are executed.

It should be noted that in the case where the division determination unit 8e determines not to perform division, subsequent processing to step S230 are executed. However, "an information indicating that division is not necessary" is transmitted in step S230. In step S240, a request for division of the content is not transmitted. In step S250, the division of the content is not executed. A description of the case where performing division is determined by the division determination unit 8e is as follows.

In step S230, the division determination unit 8e transmits to the "SMIL data distribution apparatus" 2 via the control unit 8d the information indicating that the division determination unit 8e determines to perform division. In step S240, the control unit 2c of the SMIL data distribution apparatus 2 transmits a request for division of the predetermined content and a request for conversion of the SMIL data to the "data conversion apparatus" 6 via the communication unit 2a. In this case, the predetermined content is also transmitted to the data conversion apparatus 6.

In step S250, the data conversion apparatus 6 performs the processing for executing the division of the predetermined content (generation processing for divided content), and processing for converting the SMIL data. A specific description of these processing is as described below.

When the control unit 6c of the data conversion apparatus 6 obtains the request for division of the predetermined content, the control unit 6c transmits predetermined content to the "divided content generation unit" 6d. The divided content generation unit 6d executes the division of the predetermined content based on "predetermined number of division". The divided content generation unit 6d generates a plurality of sections of divided content by executing the division of the predetermined content.

Figure 22:
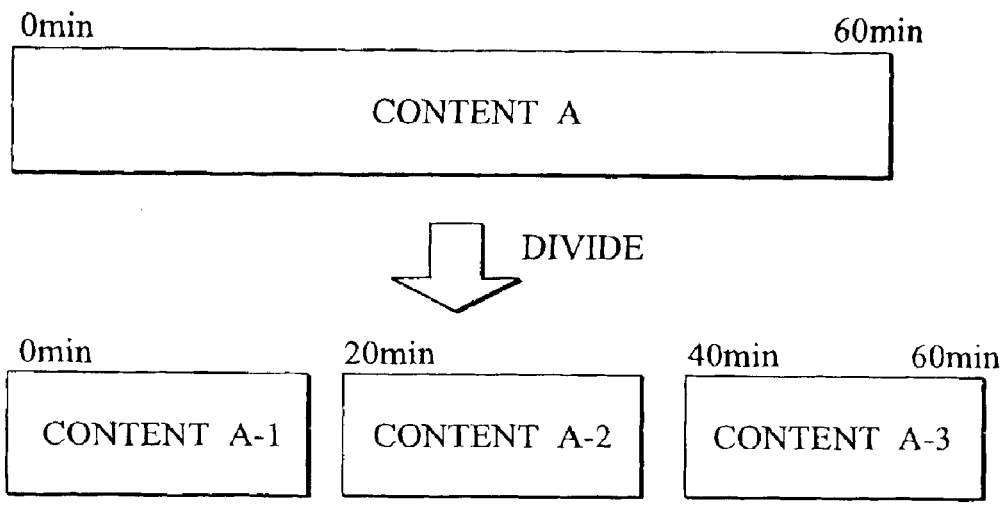
FIG. 22 is a diagram illustrating an example of a dividing method according to the third embodiment.

For example, as shown in FIG. 22, the divided content generation unit 6*d* can divide the predetermined content so that the data amount of each section of divided content is equal, based on the "predetermined number of division".

Furthermore, the "condition for division decision unit" 8*f* may decide the length of each section of divided content generated by the "divided content generation unit" 6*d* based on the order of distributing to the reception terminal apparatus 7. More specifically, based on the "distribution order information" included in each content, the condition for division decision unit 8*f* may decide the length of each section of divided content generated by the divided content generation unit 6*d*.

Figure 23:
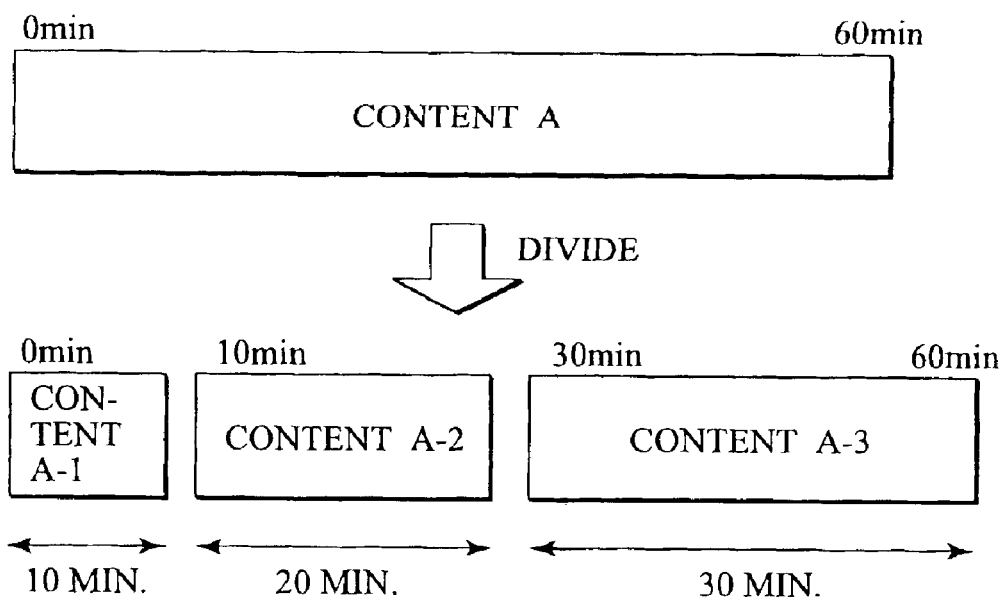
FIG. 23 is a diagram illustrating an example of a dividing method of the third embodiment.

For example, as shown in FIG. 23, the divided content generation unit 6*d* may also divide the content A as described below. The divided content generation unit 6*d* performs the division of the content A so that the amount of data of divided content expected to be distributed early (such as content A-1) is short and so that the amount of data of divided content expected to be distributed late (such as content A-3) is long.

In content distribution, user of the reception terminal apparatus 7 often requests for suspension of content distribution. Thus, the frequency of distributing the content to be distributed late to the reception terminal apparatus 7 decreases. In such case, the "condition for division decision unit" 8*f* decides condition for division indicating that the "divided content generation unit" 6*d* divides the content so that the "amount of data of the divided content to be distributed late" is large. As a result, the data length of divided content corresponding to low distributing frequency becomes long. Accordingly, "number of division" can be reduced. Thus "overhead caused by the division" is controlled.

A specific example of content division processing and SMIL data conversion processing is as described below. For example, the condition for division decision unit 8*f* obtains content time information, and based on the obtained information, decides starting time of distribution and finishing time of distribution for each section of divided content.

For example, as shown in FIG. 22, the condition for division decision unit 8*f* decides the "starting time of distribution" corresponding to the divided content A-1 to be at 0 minutes, and decides the "finishing time of distribution" corresponding to the divided content A-1 to be at 20 minutes. The condition for division decision unit 8*f* decides the "starting time of distribution" corresponding to the divided content A-2 to be at 20 minutes, and decides the finishing time of distribution corresponding to the divided content A-2 to be at 40 minutes. The condition for division decision unit 8*f* determines the "starting time of distribution" corresponding to the divided content A-3 to be at 40 minutes, and determines the "finishing time of distribution" corresponding to the divided content A-3 to be at 60 minutes.

Furthermore, the conversion unit 6*b* converts the SMIL data, which includes the information concerning content, into SMIL data that includes information concerning divided content. More specifically, the conversion unit 6*b* converts the "distribution source location information" concerning content, which is included in the SMIL data, into the "distribution source location information" concerning divided content.

Figure 25:
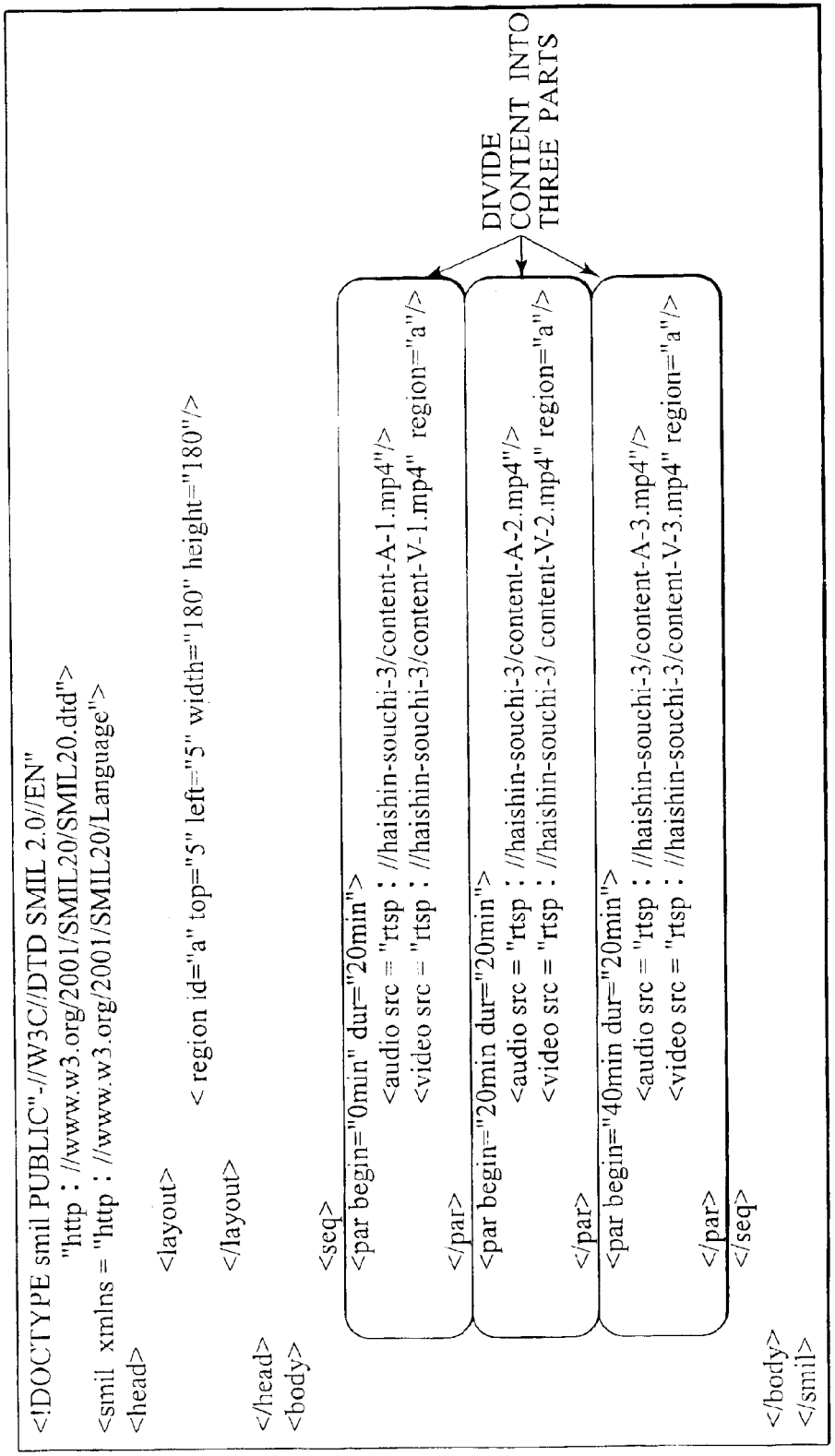
FIG. 25 is a diagram showing SMIL data after content is divided.

A specific description employing FIG. 24 and FIG. 25 is as described below. Here, audio content and video content form a set. FIG. 24 is a diagram showing SMIL data before division processing is executed, and FIG. 25 is a diagram showing the SMIL data after division processing is executed. The SMIL data shown in FIG. 25 is also SMIL data that is converted by the conversion unit 6*b*.

There is one item of content time information (<par dur=60 min>) in FIG. 24. In FIG. 25, content time information is given to each section of divided content respectively. Also, in FIG. 25, "distribution source location information" is given to each section of divided content, respectively. In this case, each section of divided content is consecutive.

In step 260, the converted SMIL data, which is SMIL data converted by the conversion unit 6*b*, is transmitted to the SMIL data distribution apparatus 2. The control unit 2*c* of the SMIL data distribution apparatus 2 stores the converted SMIL data in the SMIL data storage unit 2*b*.

In step S270, each content (divided content) divided by the divided content generation unit 6*d* is then transmitted to the content distribution apparatus 3 (the content distribution apparatus 3 identified by the "distribution source location information" included in the converted SMIL data), and is stored in the content distribution apparatus 3.

It should be noted that the divided content generation unit 6*d* may also execute division of content so that amount of data of divided content is less than the "average amount of available area". For example, it is assumed that the "average amount of available area" is amount of data corresponding to twenty minutes, and amount of data of a predetermined content is amount of data corresponding to sixty minutes. In this case, the divided content generation unit 6*d* generates three sections of divided content so that amount of data of each section of divided content is less than "average amount of available area". After processing for S260 and S270, the following processing is then executed, for example.

(Distribution Processing for Divided content)

The cache apparatus 4 obtains one or a plurality of sections of divided content from content distribution apparatus 3 in which a plurality of sections of divided content are stored, and temporarily stores one or a plurality of sections of divided content.

The storage unit 5*b* then stores a "division location information table", which indicates the location information of each cache apparatus 4 that temporarily stores one or a plurality of sections of divided content. The content distribution apparatus 3 also stores usual content(not divided content).

The control unit 5*f* of the content location management apparatus 5 then reads the division location information table from the storage unit 5*b*. The "division location information table" is transmitted to the conversion unit 6*b* of the data conversion apparatus 6.

In the case where the content requested by a user is divided into a plurality of sections of divided request content, the conversion unit 6*b* then performs processing as described below. The conversion unit 6*b*, for example, refers to the "division location information table", and performs the conversion of SMIL data that includes the "distribution source location information" of the content distribution apparatus 3 in which the plurality of sections of "divided request content" are stored. More specifically, the conversion unit 6*b* converts the "distribution source location information" of the content distribution apparatus 3, which is included in the SMIL data, into the "distribution source location information" of at least one specified cache apparatus 4.

For example, the information identifying the "optimum cache apparatus", which is determined by the optimum cache determination unit 5*e*, is transmitted to the conversion unit 6b. Referencing the "division location information table", the conversion unit 6b converts "distribution source location information" of content distribution apparatus 3, which is included in the SMIL data, into "distribution source location information" of the "optimum cache apparatus".

The reception terminal apparatus 7 obtains the converted SMIL data. Based on the converted SMIL data, the reception terminal apparatus 7 then receives each section of divided request content from one or a plurality of cache apparatus 4. It should be noted that when a command for initiating session control is transmitted, and in the case where sections of divided content are not stored in the optimum cache apparatus, the optimum cache apparatus accesses the content distribution apparatus 3 in which the sections of divided content are stored. The optimum cache apparatus then obtains the sections of divided content from the content distribution apparatus 3.

It should be noted that after the SMIL data that includes the information concerning content is converted into SMIL data, which includes the information concerning divided content, one or a plurality of sections of divided content may be stored in the cache apparatus 4. In this case, the conversion processing for the SMIL data utilizes the distribution source location information of the cache apparatus 4 instead of the division location information table.

(2) Processing for Determining the Optimum Cache Apparatus

The optimum cache determination unit 5e may determine the "optimum cache apparatus" as described below. Generally, the earlier the content is distributed, the higher the probability becomes for content to be distributed to the reception terminal apparatus 7. On the other hand, the later the content is distributed, the lower the probability becomes for content to be distributed to the reception terminal apparatus 7.

Accordingly, in the case where the reception terminal apparatus 7 obtains divided content to be distributed early, the optimum cache determination unit 5e determines cache apparatus close to the reception terminal apparatus 7 (or cache apparatus 4 corresponding to low load condition) as the "first optimum cache apparatus", for example. Thus, the reception terminal apparatus 7 can obtain the "divided content to be distributed early" from the first optimum cache apparatus.

On the other hand, in the case where the reception terminal apparatus 7 obtains divided content to be distributed late, the optimum cache determination unit 5e determines cache apparatus close to the reception terminal apparatus 7 (or cache apparatus 4 corresponding to low load condition) next to the "first optimum cache apparatus" as the "second optimum cache apparatus", for example. Thus the reception terminal apparatus 7 can obtain divided content from the "second optimum cache apparatus".

(3) Processing for Determining the Optimum Cache Apparatus Based on Distributing Order The control unit 2c of the SMIL data distribution apparatus 2 reads from the SMIL data storage unit 2b the SMIL data corresponding to a predetermined content (requested content) The control unit 2c reads a plurality of content time information, and transmits to the content location management apparatus 5 each piece of the content time information and the location information of the reception terminal apparatus 7.

In addition, processing of step S40 shown in FIG. 12, for example, is executed as described below. The optimum cache determination unit 5e is also capable of determining processing as follows. As in the case of the second embodiment, the optimum cache determination unit 5e determines "second cache apparatus candidates". If there are no second cache apparatus candidates, referencing the proximity table, after the optimum cache determination unit 5e determines "first cache apparatus candidates", the optimum cache determination unit 5e determines the "second cache apparatus candidates".

If there are a plurality of second cache apparatus candidates, referencing each piece of content time information, the optimum cache determination unit 5e performs the following determination processing. In the case where divided content to be distributed early is distributed to the reception terminal apparatus 7, the optimum cache determination unit 5e determines cache apparatus corresponding to lightest load condition as the "optimum cache apparatus". This optimum cache apparatus is the cache apparatus 4 that is optimum for the reception terminal apparatus 7, which obtains divided content to be distributed early, to access.

Furthermore, in the case where divided content to be distributed late is distributed to the reception terminal apparatus 7, the optimum cache determination unit 5e may also determine the cache apparatus corresponding to second lightest load condition as the "optimum cache apparatus". This optimum cache apparatus is cache apparatus 4 that is optimum for the reception terminal apparatus 7, which obtains the divided content to be distributed late, to access.

Figure 26:
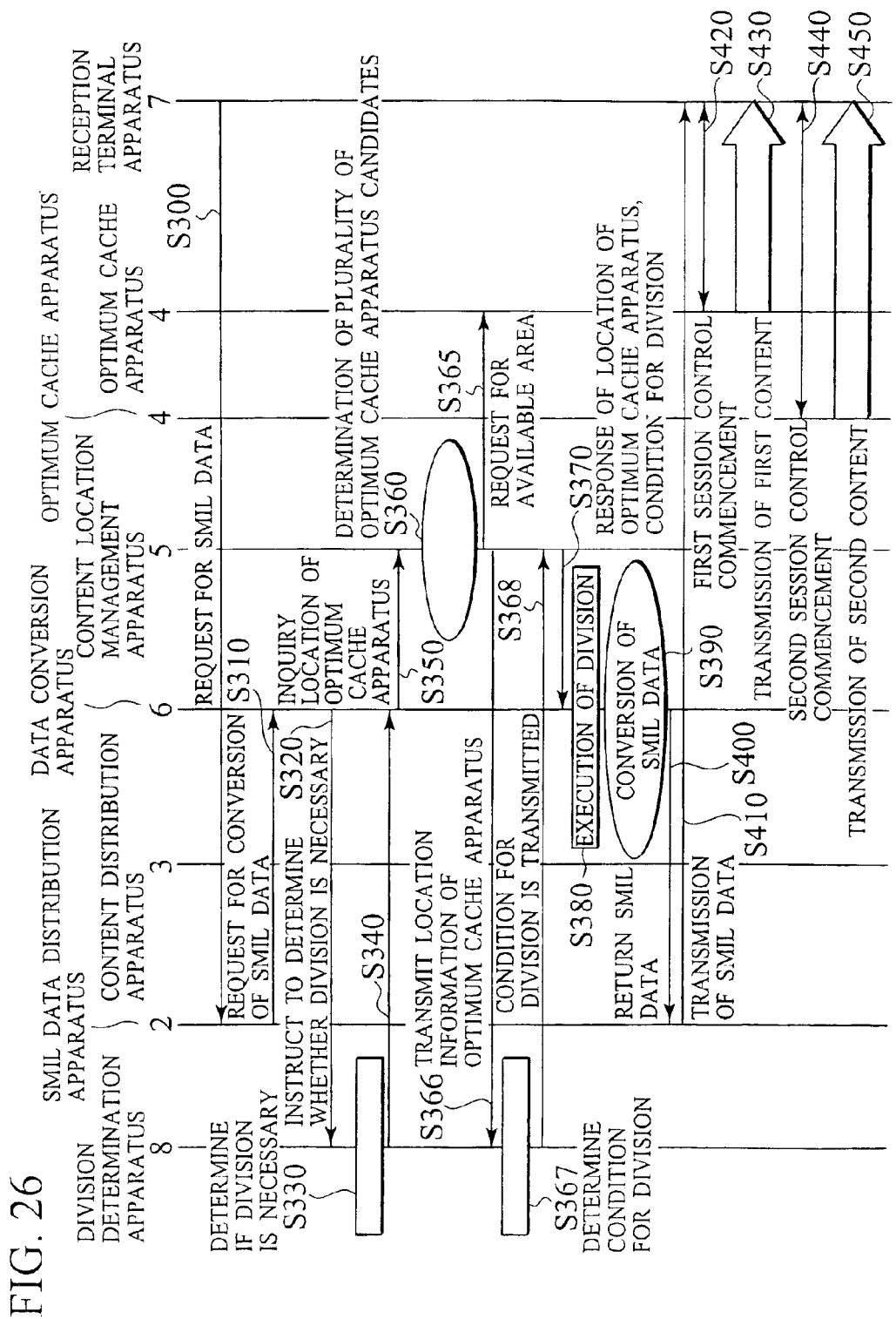
FIG. 26 is a sequence diagram illustrating content distribution processing by the content distribution system according to the third embodiment.

(4) Division Processing and SMIL Data Conversion Processing that are Executed when SMIL Data is Transmitted FIG. 26 is a sequence diagram for describing the above processing. Descriptions of the same processing as in FIG. 12 from each of processing shown in FIG. 26 are simplified.

In step S300, the reception terminal apparatus 7 transmits to the SMIL data distribution apparatus 2 a request for the SMIL data, which includes information concerning predetermined content. In step S310, the SMIL data distribution apparatus 2 transmits a request for conversion of the SMIL data to the data conversion apparatus 6. In this case, the control unit 6c of the data conversion apparatus 6 obtains the predetermined content, which is transmitted from the content distribution apparatus 3, and stores the predetermined content.

In step S320, the control unit 6c of the data conversion apparatus 6 transmits to the division determination apparatus 8 via the communication unit 6a the "amount of data of the predetermined content" and an "instruction for apparatus 8 to determine whether or not division of the predetermined content is necessary".

In step S330, the division determination unit 8e of the division determination apparatus 8 determines whether or not to perform division of the predetermined content. This processing is executed in the same way as in step S220. It should be noted that the amount of data of the predetermined content is transmitted to the condition for division decision unit 8f.

In the case where the division determination unit 8e determines not to perform division, processing subsequent to S30 of FIG. 12 is executed. On the other hand, in the case where the division determination unit 8e determines to perform division, in step S340, the division determination unit 8e transmits to the data conversion apparatus 6 via the control unit 8d information indicating that the division determination unit 8e determines to perform division. In step S350, the same processing is executed as in step S30.

In step S360, the optimum cache determination unit 5e then determines candidates for the optimum cache apparatus. Hereinafter, "candidates for the optimum cache apparatus" are referred to as "optimum cache apparatus candidates". A specific description of this processing is as described below.

The optimum cache determination unit 5e determines one or a plurality of "optimum cache apparatus candidates" with reference to one or more pieces of information from among information indicating the degree of closeness to the reception terminal apparatus 7; information indicating load condition of cache apparatus 4; information indicating available area amount for cache apparatus 4; and information indicating whether or not content has already been stored in the cache apparatus 4.

One or plurality of optimum cache apparatus candidates may be, for example, the first cache apparatus candidates described in step S104, or may be the second cache apparatus candidates described in step S106 of the second embodiment. Also, the optimum cache determination unit 5e may determine one or a plurality of optimum cache apparatus candidates based on the order of closeness to the reception terminal apparatus 7. Furthermore, the optimum cache determination unit 5e may determine one or a plurality of optimum cache apparatus candidates based on the order of low load condition of cache apparatus 4.

In step S365, based on the location information of optimum cache apparatus candidates, the optimum cache determination unit 5e then transmits a request for "available area amount" to apparatus corresponding to each "optimum cache apparatus candidate".

Each request for available area amount is transmitted to the available area management units 4e of the apparatus corresponding to each "optimum cache apparatus candidate"

The "available area management unit" 4e obtains available area amount for each storage unit 4b and transmits each "available area amount" to the optimum cache determination unit 5e via the control unit 4c.

In the case where the optimum cache determination unit 5e determines that there is no available area in the storage unit 4b of all the apparatus that are "optimum cache apparatus candidates", instep S360, the optimum cache determination unit 5e executes processing as described below, for example. The optimum cache determination unit 5e determines the plurality of cache apparatus that are close to the reception terminal apparatus 7 next to the already determined "optimum cache apparatus candidates", as "optimum cache apparatus candidates".

Processing of step S365 is then executed. It should be noted that the optimum cache determination unit 5e may determine plurality of cache apparatus corresponding to low load condition next to the already determined "optimum cache apparatus candidates", as "optimum cache apparatus candidates". Processing of step S365 may then be executed.

Even in subsequent processing, the optimum cache determination unit 5e may determine the optimum cache apparatus based on proximity level, or may determine the optimum cache apparatus based on degree of load condition.

In the case where the optimum cache determination unit 5e determines that there is available area in the storage unit 4b of either one or a plurality of cache apparatus from among all optimum cache apparatus candidates, the optimum cache determination unit 5e determines the one or a plurality of cache apparatus 4 as optimum cache apparatus.

In step S366, the information identifying one or a plurality of cache apparatus 4, which are determined by the optimum cache determination unit 5e, and the location information of one or a plurality of cache apparatus 4 are then transmitted to the condition for division decision unit 8f via the control unit 5f. The condition for division decision unit 8f divides the amount of data of the predetermined content by the number of optimum cache apparatus (cache apparatus determined to have available area), and holds the data value obtained by the dividing calculation. The condition for division decision unit 8f then compares the data value and the "available area amount for the storage unit 4b of each optimum cache apparatus".

In the case where the available area amount for the storage unit 4b of each optimum cache apparatus is determined as small, the information is transmitted to the optimum cache determination unit 5e of the content location management apparatus 5. The above information is information indicating that "available area amount for the storage unit 4b of each optimum cache apparatus" is smaller than the data value.

The optimum cache determination unit 5e, for example, determines one or plurality of cache apparatus that are close to the reception terminal apparatus 7 next to the already determined optimum cache apparatus candidates Processing of step S365 is then executed.

In the case where the available area amount for the storage unit 4b of each optimum cache apparatus is determined as large, the information is transmitted to the division determination unit 8e. The above information is information indicating that "available area amount for the storage unit 4b of each optimum cache apparatus" is larger than the data value.

The division determination unit 8e determines to perform division based on the above information. The "information indicating that performing division is determined" is transmitted to the condition for division decision unit 8f.

The condition for division decision unit 8f decides condition for division (S367). For example, if the content is configured from a plurality of pieces of unit data, the condition for division decision unit 8f generates (decides) a condition for division that includes information specifying two pieces of unit data concerning division.

Furthermore, the condition for division includes information that identifies optimum cache apparatus in which each section of divided content is stored, respectively. However, if the data length of each section of divided content is equal, each section of divided content may be stored in any of the optimum cache apparatus. Furthermore, the condition for division also includes "content time information" (information indicating division at the end of the first twenty minutes after distribution commencement, information indicating division at the end of the first forty minutes after distribution commencement)

It should be noted that in the case where "optimum cache apparatus that includes the storage unit 4b which has small available area" and "optimum cache apparatus that includes the storage unit 4b which has large available areas" exist, the condition for division decision unit 8f executes processing as described below.

In other words, the condition for division decision unit 8f decides on a condition for division so that the amount of data of "divided content that is to be stored in the optimum cache apparatus with large available area" is made larger. The "content time information" corresponding to the divided content is then set to distribute the divided content late. Also, the condition for division decision unit 8f decides on a condition for division so that the amount of data of "divided content that is to be stored in the optimum cache apparatus with small available area" is made smaller. The "content time information" corresponding to the divided content is then set to distribute the divided content early.

In step S368, the conditions for division determined by the condition for division decision unit 8f are transmitted to the control unit 5f of the content location management apparatus 5. In step S370, the control unit 5f of the content location management apparatus 5 transmits to the data conversion apparatus 6 each condition for division, information identifying optimum cache apparatus corresponding to each section of divided content, and the location information of the above optimum cache apparatus.

It should be noted that based on the available area amount for each cache apparatus 4, the optimum cache determination unit 5e determines one or a plurality of cache apparatus capable of storing divided content as "optimum cache apparatus". Furthermore, the division determination apparatus 8 may not have function of the condition for division decision unit 8f, but the content location management apparatus 5, for example, may have the function of the condition for division decision unit 8f instead.

In step S380, the divided content generation unit 6d generates a plurality of sections of divided content by executing the division of the predetermined content in accordance with the condition for division. A specific description of this processing is as described below. Information such as condition for division is transmitted to the data conversion apparatus 6. The control unit 6c of the data conversion apparatus 6 transmits the condition for division and the predetermined content to the divided content generation unit 6d.

The divided content generation unit 6d generates a plurality of sections of divided content by executing the division of the predetermined content in accordance with the condition for division.

The divided content generation unit 6d of the data conversion apparatus 6 then transmits each generated divided content to one or a plurality of optimum cache apparatus 4 via the control unit 6c, based on the location information of the optimum cache apparatus. A description of the case where "the divided content generation unit 6d transmits divided content to the plurality of optimum cache apparatus" is provided below as an example.

The control unit 4c of each optimum cache apparatus 4 to which divided content is transmitted stores the divided content in the storage unit 4b. In this case, the control unit 4c instructs the available area management unit 4e to rewrite the "available area information (such as information included in available area table)".

Furthermore, the rewritten "available area information" is transmitted to the division determination apparatus 8 via the control unit 4c. The control unit 8d of the division determination apparatus 8 reads the available area table from the storage unit 8b. Based on the transmitted available area information, the control unit 8d then rewrites "available area amount" of each optimum cache apparatus included in the available area table.

In step S390, the conversion unit 6b of the data conversion apparatus 6 performs the conversion of SMIL data. A specific description of this processing is as described below. The control unit 5f of the content location management apparatus 5 reads the "division location information table" from the storage unit 5b. The control unit 5f then obtains location information of each optimum cache apparatus. The control unit 5f then transmits location information of each optimum cache apparatus to the conversion unit 6b of the data conversion apparatus 6 via the communication unit 5a. The conversion unit 6b obtains "distribution source location information" for each optimum cache apparatus. In this case, for example, in the case where the "transmitted location information of optimum cache apparatus 4" is described by using IP address, and "distribution source location information included in the SMIL data" is described using an URL, IP address is converted into an URL by a predetermined apparatus.

Furthermore, the control unit 5f may transmit the "division location information table" to the conversion unit 6b. The conversion unit 6b may then refer to the division location information table, and determine the location information of each optimum cache apparatus.

Furthermore, the condition for division, which is determined by the condition for division decision unit 8f, is transmitted to the conversion unit 6b. The conversion unit 6b then converts the "content time information" corresponding to the predetermined content, which is included in the SMIL data, into the "content time information" corresponding to each section of divided content.

Referencing the "distribution source location information" of each optimum cache apparatus, the conversion unit 6b performs, as described below, the conversion processing for the SMIL data, which includes the "distribution source location information" of the content distribution apparatus 3 in which the predetermined content is stored.

The conversion unit 6b converts the "distribution source location information" of the content distribution apparatus 3, which is included in the SMIL data, into the "distribution source location information" of at least one optimum cache apparatus. It should be noted that if the "division location information table" is transmitted to the conversion unit 6b, the conversion unit 6b performs the conversion processing by referring to the division location information table.

For example, "the content time information" (from zero to sixty minutes) and "distribution source location information" (distribution source location information of the content distribution apparatus 3) are included in the SMIL data, which is transmitted from the SMIL data distribution apparatus 2. In addition, the condition for division includes the following information. Namely, the condition for division includes information indicating that "content time information" of divided content 1 is information showing "from zero to twenty minutes"; information indicating that the "content time information" of divided content 2 is information showing "from twenty to forty minutes"; information indicating that "content time information" of divided content 3 is information showing "from forty to sixty minutes"; and information indicating that each section of divided content 1~3 is stored in cache apparatus Y1~Y3 respectively.

Based on the condition for division, the conversion unit 6b converts "content time information" (from zero to sixty minutes), which is included in the SMIL data, into each "content time information" of divided content 1~3 (from zero to twenty minutes, from twenty to forty minutes, and from forty to sixty minutes). Above "content time information" (from zero to twenty minutes) is referred to as "first content time information", and above "content time information" (from twenty to forty minutes) is referred to as "second content time information"

Based on the condition for division, the conversion unit 6b, also converts "distribution source location information" concerning content (location information of content distribution apparatus 3), which is included in the SMIL data, into "distribution source location information" concerning each section of divided content 1~3 (location information of each cache apparatus Y1~Y3).

In step S400, the converted SMIL data is transmitted from the data conversion apparatus 6 to the SMIL data distribution apparatus 2. Instep S410, the SMIL data distribution apparatus 2 transmits the converted SMIL data to the reception terminal apparatus 7.

Session control commencement processing for the divided content corresponding to "first content time information" and transmission processing for the above divided content are then executed (S420, S430). Session control commencement processing for the divided content corresponding to "second content time information" and transmission processing for the divided content are then executed (S440, S450).

It should be noted that in the case when a command for initiating session control is transmitted and a plurality of sections of divided content are not stored in one or a plurality of optimum cache apparatus, the optimum cache apparatus accesses the content distribution apparatus 3 in which the plurality of sections of divided content are stored, for example. The optimum cache apparatus then obtains one or a plurality of sections of divided content from the content distribution apparatus 3.

Furthermore, the reception terminal apparatus 7 obtains the converted SMIL data. Furthermore, based on the converted SMIL data, the reception terminal apparatus 7 receives each section of divided content from one or a plurality of cache apparatus 4. It should be noted that the present embodiment can also similarly apply to the case where a plurality of sections of divided content are stored in one optimum cache apparatus.

It should be noted that in this embodiment, the description of the case "where the content distribution system includes the division determination apparatus 8, the SMIL data distribution apparatus 2, the content location management apparatus 5, and the data conversion apparatus 6" was given. However, this configuration is not particularly limited thereto, and the content distribution system may be configured not to include the division determination apparatus 8, the SMIL data distribution apparatus 2, the content location management apparatus 5, and the data conversion apparatus 6. In addition, the content distribution system may be configured to have one item of content distribution server apparatus, which includes the function of the SMIL data distribution apparatus 2, the function of the content location management apparatus 5, the function of the data conversion apparatus 6, and the function of the division determination apparatus 8.

(Operation Results)

According to the present embodiment, the division determination unit 8e determines to perform the division of content if the amount of data of a content exceeds a predetermined amount. This causes the storage unit 4b of the cache apparatus to no longer store contents with large amount of data. As a result, since a large amount of memory resources of the storage unit 4b in the cache apparatus 4 are no longer consumed, more effective usage of the memory resources of storage unit 4b is possible.

The optimum cache determination unit 5e determines one or a plurality of optimum cache apparatus with reference to one or more pieces of information among information indicating the degree of closeness to the reception terminal apparatus 7, information indicating load conditions of cache apparatus 4, information indicating available area amount for cache apparatus 4, and information indicating whether or not content has already been stored in the cache apparatus 4.

The condition for division decision unit 8f then decides a condition for division so that each section of divided content may be stored in the above one or plurality of optimum cache apparatus. Thus, in addition to the results of the first and second embodiments, the memory resources of the storage unit 4b in the cache apparatus 4 are utilized more effectively.

Furthermore, in the present embodiment, the condition for division decision unit 8f can determine a condition for division as follows based on the information indicating the distribution order, which is included in each content. The condition for division decision unit 8f can determine a condition for division so that "data length of divided content" corresponding to early distribution order is made shorter, as well as determine a condition for division so that "data length of divided content" corresponding to late distribution order is made longer. For this reason, it is possible to reduce any overhead caused by division of content. It should be noted that data length is the same as amount of data.

It should be noted that the conversion unit 6b may also perform the following conversion processing. The storage unit 5b of the content location management apparatus 5 stores a "divided content location information table" in which information specifying each section of divided content is associated with the location information of cache apparatus.

Referencing the "divided content location information table", the conversion unit 6b then performs as described below conversion processing for the SMIL data, which includes location information of the content distribution apparatus 3. Above the content distribution apparatus 3 stores "requested content", or a plurality of sections of divided content. The conversion unit 6b may also convert the location information of the content distribution apparatus 3, which is included in the SMIL data, into the location information of one or a plurality of cache apparatus 4 in which divided content has been already stored.

In the case where the divided content is stored in one or a plurality of cache apparatus 4, the control unit 5f may rewrite the "divided content location information table" based on the information identifying the divided content and the location information of one or a plurality of cache apparatus 4.

Fourth Embodiment

As indicated in the second embodiment, the following results are obtained in the case where the optimum cache determination unit 5e determines an optimum cache apparatus from among each cache apparatus in which requested content has already been stored. "Processing for the optimum cache apparatus transmitting content a request to the content distribution apparatus 3" and "processing for the content distribution apparatus 3 transmitting content to the optimum cache apparatus" are unnecessary.

However, "cache apparatus 4 close to the reception terminal apparatus 7 and/or cache apparatus 4 with low load condition" also exist among each cache apparatus 4 in which the content is not stored. In such case, if the optimum cache determination unit 5e can determine the above-mentioned cache apparatus 4 as the optimum cache apparatus, then content distribution quality is improved.

Consequently, in this embodiment, before a request for content distribution is transmitted from the reception terminal apparatus 7 to the cache apparatus 4, the cache apparatus 4 obtains the above-mentioned content.

Specifically, in this embodiment, for example, "timing of distribution request from the reception terminal apparatus 7" and "timing of content request from the cache apparatus 4" can be controlled. This means that when the reception terminal apparatus 7 transmits to the above-mentioned cache apparatus 4 a request for content distribution, the cache apparatus 4 should have already obtained the above-mentioned content. The above-mentioned cache apparatus 4 may then transmit the above-mentioned content to the reception terminal apparatus 7 with certainty.

(Configuration of Content Distribution System)

In the content distribution system of the fourth embodiment, the matters differing from the content distribution system of the third embodiment are as described below. It should be noted that in the configuration of the fourth embodiment, the same reference numerals are given for the configuration identical to that of the third embodiment, whereby description thereof is omitted.

Figure 27:
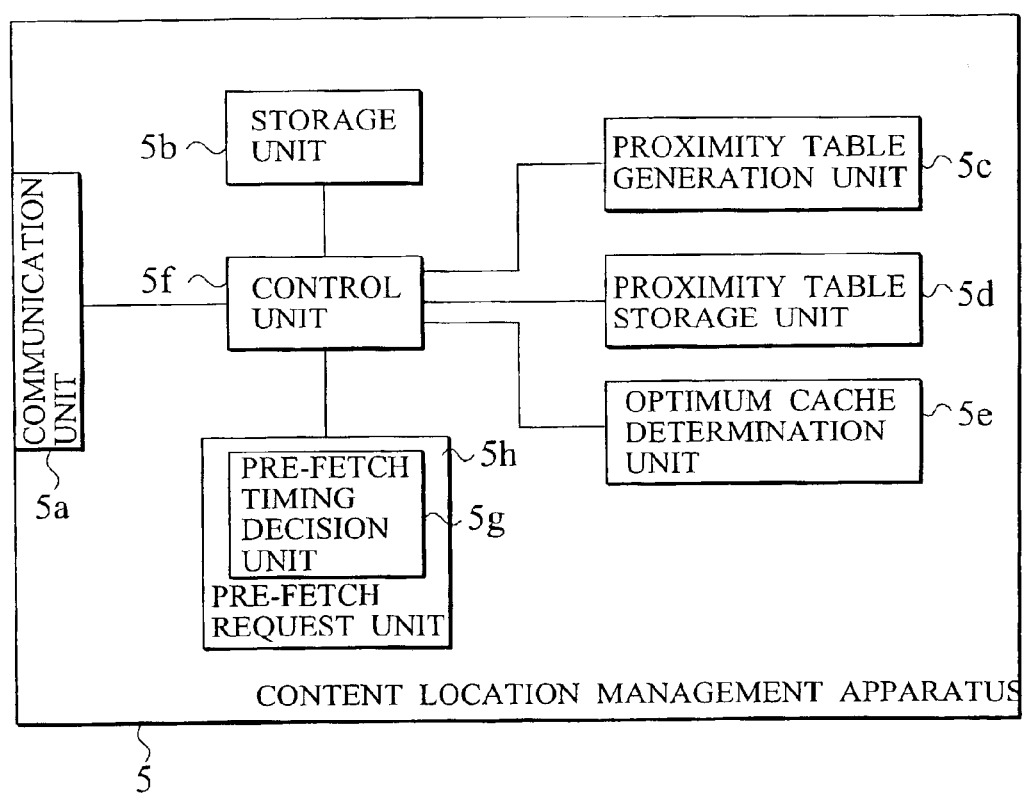
FIG. 27 is a diagram illustrating the configuration of a content location management apparatus according to a fourth embodiment.

FIG. 27 is a diagram illustrating the configuration of a content location management apparatus 5 according to the fourth embodiment. The content location management apparatus 5 includes a pre-fetch request unit 5h. In the case where requested content is not stored in specified cache apparatus 4, the pre-fetch request unit 5h transmits to the above-mentioned specified cache apparatus 4 a pre-fetch request, which indicates "a command for obtaining requested content from content distribution apparatus 3 storing the above-mentioned requested content".

As an example, this embodiment gives a description of the case where "a specified cache apparatus 4" is an "optimum cache apparatus determined by the optimum cache determination unit 5e". However, the specified cache apparatus 4 is not limited to the optimum cache apparatus.

The pre-fetch request unit 5h includes a pre-fetch timing decision unit 5g. The pre-fetch timing decision unit 5g determines the "pre-fetch request time" (pre-fetch request timing).

The pre-fetch request time is determined" so that when the reception terminal apparatus 7 transmit "content distribution request" to an optimum cache apparatus, this optimum cache apparatus has already obtained the above-mentioned requested content".

Based on the determined pre-fetch request time, the content location management apparatus 5 transmits to the optimum cache apparatus 4 a pre-fetch request, which is "a command to obtain requested content from the content distribution apparatus 3, storing the requested content".

This means that when the reception terminal apparatus 7 transmits to the optimum cache apparatus a distribution request for the requested content, the optimum cache apparatus has already stored the requested content. It should be noted that a apparatus (such as, the data conversion apparatus 6) other than the content location management apparatus 5 may have the pre-fetch request unit 5h.

It should be noted that, for example, before a reception terminal apparatus 7 requests to a specified cache apparatus 4 for distribution of requested content, the pre-fetch request unit 5h transmits a "pre-fetch request" to the specified cache unit 4. Furthermore, the pre-fetch request unit 5h may also transmit a "pre-fetch request" to a specified cache apparatus 4 just before "distribution of requested content" to a "reception terminal apparatus 7" begins.

(Processing)

Figure 28:
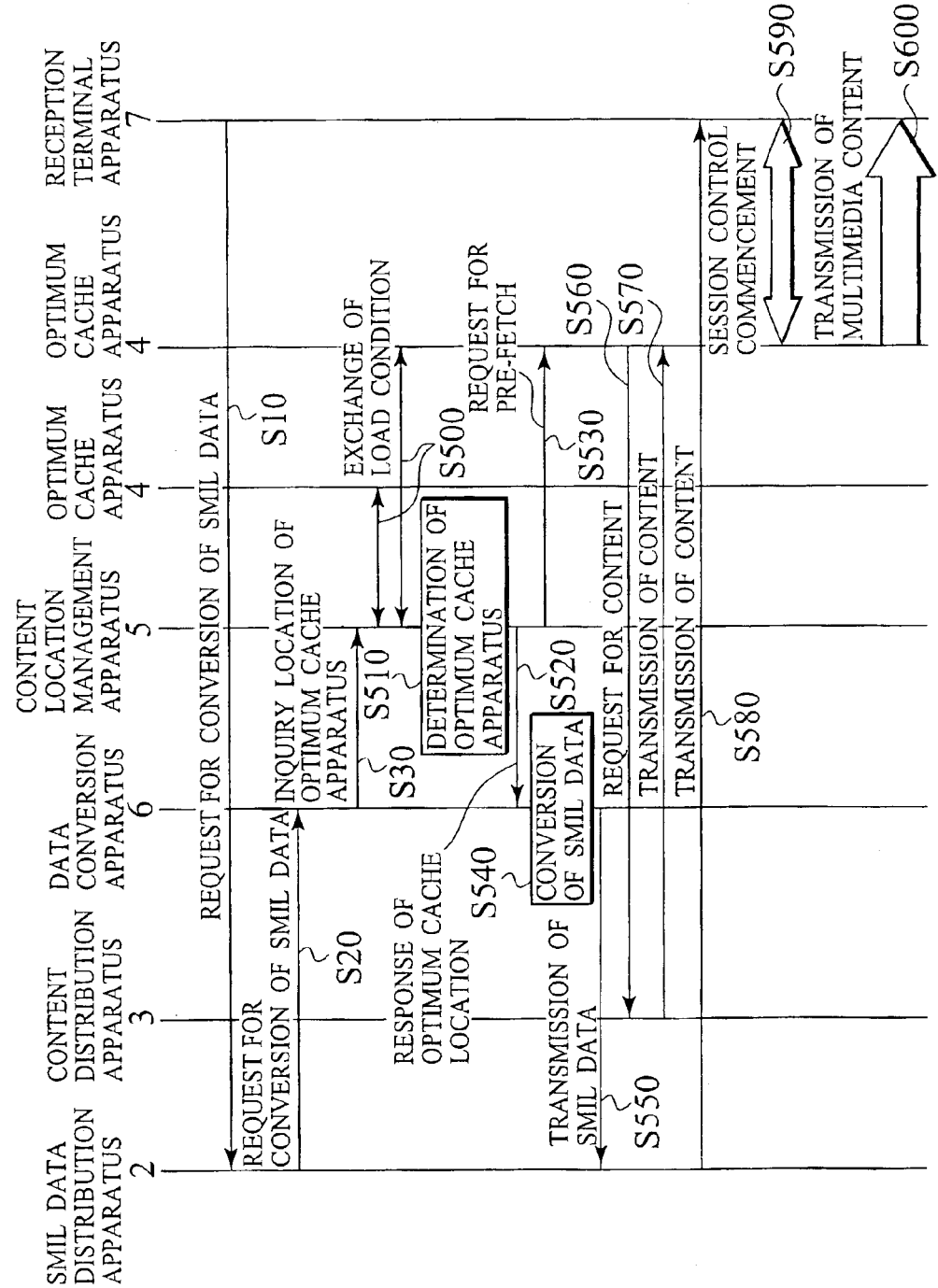
FIG. 28 is a sequence diagram illustrating content distribution processing by a content distribution system according to the fourth embodiment.

FIG. 28 is a sequence diagram describing a content distribution method, which is implemented by the content distribution system having the configuration described above. In processing shown in FIG. 28, the same reference numerals are given for processing identical to that shown in FIG. 12, whereby description thereof is omitted.

The same processing as in the first embodiment are executed in steps S10 through S30. In step S500, the optimum cache determination unit 5e then transmits to each cache apparatus 4 (first cache apparatus candidate) close to a specific reception terminal apparatus 7 a request for transmitting load condition of cache apparatus 4. After the "processing of steps S120 through S122 of FIG. 16" are executed, processing for S500 is executed.

In step S510, the optimum cache determination unit 5e, for example, determines the apparatus with the lowest load condition among each apparatus of "first cache apparatus candidates", as an optimum cache apparatus.

In this case, referencing the content location information table, the optimum cache determination unit 5e determines whether or not content requested by the reception terminal apparatus 7 is stored in the above-mentioned optimum cache apparatus. If it is determined that the requested content is stored in the optimum cache apparatus, the processing subsequent to step S520 are executed. In this case, the "pre-fetch request processing for S530" is not executed. If it is determined that the requested content is not stored in the optimum cache apparatus, the "processing subsequent to step S520" are executed.

In step S520, the content location management apparatus 5 transmits to the data conversion apparatus 6 information identifying the optimum cache apparatus and location information of the optimum cache apparatus via the control unit 5f. Furthermore, if it is determined that the requested content is not stored in the optimum cache apparatus, a message indicating result of this determination is transmitted to the pre-fetch timing decision unit 5g. The pre-fetch timing decision unit 5g determines a "pre-fetch request time" for content location management apparatus 5 to transmit a "pre-fetch request" to the optimum cache apparatus 4.

In step S530, the pre-fetch request unit 5h transmits a pre-fetch request to the optimum cache apparatus via the control unit 5f based on the pre-fetch request time. In this case, referencing the apparatus location information data, the control unit 5f transmits to the optimum cache apparatus 4 the location information of a content distribution apparatus 3 storing the requested content.

On the other hand, in step S540, in the same manner as in the case of the first embodiment, the conversion unit 6b of the data conversion apparatus 6 converts "distribution source location information" of the content distribution apparatus 3, which is included in the SMIL data, into "distribution source location information" of the above-mentioned optimum cache apparatus. The conversion unit 6b transmits the converted SMIL data to the SMIL data distribution apparatus 2 via the control unit 6c (S550).

In step S560, the control unit 4c of the optimum cache apparatus obtains the "pre-fetch request". The control unit 4c then performs the following processing based on the pre-fetch request. Based on the transmitted location information of the content distribution apparatus 3, the control unit 4c transmits a request for content distribution to the above-mentioned content distribution apparatus 3 via the communication unit 4a.

In step S570, the request for content distribution, and the location information of the optimum cache apparatus are transmitted to the control unit of the content distribution apparatus 3. The control unit reads the above-mentioned content from the storage unit based on the request for content. The control unit transmits the content to the optimum cache apparatus via the communication unit. The above-mentioned content is stored in the storage unit 4b of the optimum cache apparatus. It should be noted that conversion processing for the SMIL data in step S540 may be executed after processing of step S570.

In step S580, the control unit 2c of the SMIL data distribution apparatus 2 obtains the converted SMIL data. Based on the location information of the reception terminal apparatus 7, the control unit 2c transmits the converted SMIL data to the reception terminal apparatus 7 via the communication unit 2a.

It should be noted that in processing of step S10, the SMIL data distribution apparatus 2 holds the location information of the reception terminal apparatus 7. In this case, the location information is associated with information specifying specified content and SMIL data.

Processing of step S90 is performed as processing of step S590. Processing of step S100 is performed as processing of step S600.

It should be noted that the conversion unit 6b may refer to the "content location information table", and may perform conversion processing of SMIL data. In this case, the control unit 5f (rewrite unit) of the content location management apparatus 5 reads the "content location information table" from the storage unit 5b. The control unit 5f then rewrites the "content location information table" based on the information that the above-mentioned content has been stored in the above-mentioned optimum cache apparatus. The rewritten content location information table is then transmitted to the conversion unit 6b of the data conversion apparatus 6. The conversion unit 6b may perform conversion processing by referring to the rewritten content location information table.

(Operation Results)

In this embodiment, even in the case where content (requested content) requested by user is not stored in a specified cache apparatus 4 (such as, the cache apparatus 4 most quickly accessible to the reception terminal apparatus 7), the pre-fetch request unit 5h may transmit the above pre-fetch request to the specified cache apparatus 4. Based on the pre-fetch request, the specified cache apparatus 4 then obtains the requested content from content distribution apparatus 3, before a "request for distributing the requested content" is transmitted from the reception terminal apparatus 7. Thus, the reception terminal apparatus 7 may quickly obtain the requested content from the specified cache apparatus 4. As a result, content distribution quality is improved.

Furthermore, the pre-fetch timing decision unit 5g is capable of determining a "pre-fetch request time" that indicates timing for the "cache apparatus 4" to transmit a distribution request (a distribution request for requested content to the distribution apparatus 3), for example. Due to this "pre-fetch request time" being appropriately decided, when the reception terminal apparatus 7 transmits a distribution request to the cache apparatus, the cache apparatus has already obtained the requested content. As a result, the cache apparatus 4 can transmit the requested content to the reception terminal apparatus 7 with certainty.

It is preferable that at the time when the optimum cache determination unit 5e determines optimum cache apparatus, "pre-fetch request" is transmitted to the optimum cache apparatus. In this case, "probability that the optimum cache apparatus can obtain the requested content" increases. As a result, "probability that the content transmitted from optimum cache apparatus is distributed to the reception terminal apparatus 7" increases. Accordingly, "situation where processing for transmitting pre-fetch request goes to waste" is prevented.

(First Modified Example of the Fourth Embodiment)

In the first modified example, there is information "indicating the starting time ("distribution commencement time") when each content file is distributed to the reception terminal apparatus 7 (hereafter referred to as "distribution commencement time information")" included in an SMIL data. Description of the case where "distribution commencement time information" of "each section of divided content file" is included in an SMIL data is given in this modified example. The content location management apparatus 5 transmits a pre-fetch request to cache apparatus 4 just before distribution commencement time.

The pre-fetch timing decision unit 5g of the first modified example stores a "pre-fetch timing table". In the pre-fetch timing table, divided content identifier (such as an URL, content ID), distribution commencement time, pre-fetch time, and information specifying cache apparatus in which one or a plurality of sections of divided content are to be stored (such as optimum cache apparatus) are associated with one another.

An example of a generation method of the "pre-fetch timing table" is as described below. The pre-fetch timing decision unit 5g obtains divided content identifiers and distribution commencement times from the data conversion apparatus 6 and/or the SMIL data distribution apparatus 2, for example. The pre-fetch timing decision unit 5g then determines the "time just before a distribution commencement time" (such as time five seconds prior to the distribution commencement time) as the "pre-fetch time" for each "distribution commencement time".

Furthermore, the pre-fetch timing decision unit 5g obtains information identifying an optimum cache apparatus determined by the optimum cache determination unit. The pre-fetch timing decision unit 5g then generates the "pre-fetch timing table" based on the obtained information and each determined pre-fetch time. FIG. 29 is a diagram illustrating an example of the pre-fetch timing table.

Figure 30:
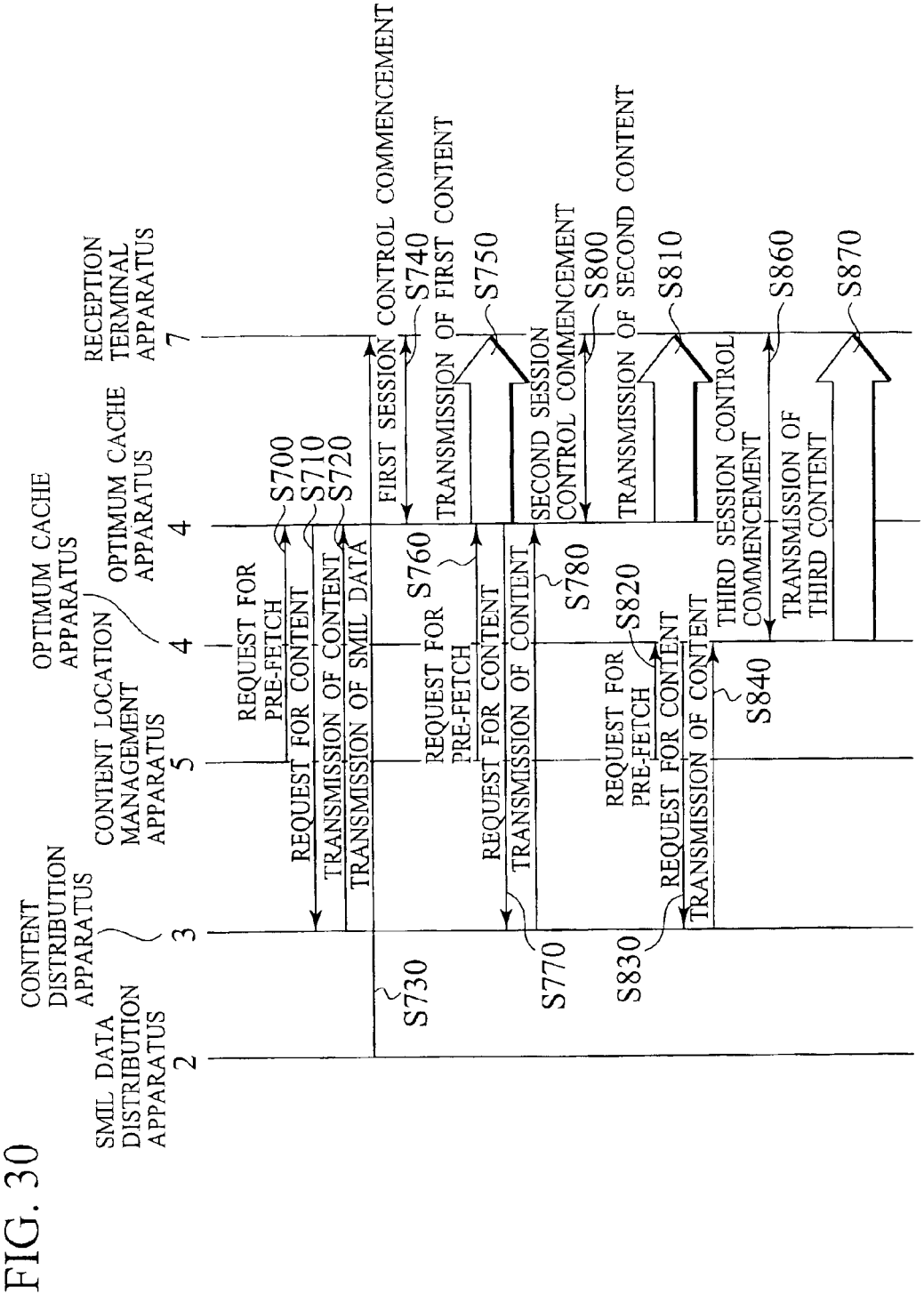
FIG. 30 is a sequence diagram illustrating content distribution processing by the content distribution system according to the fourth embodiment.

FIG. 30 is a diagram showing a sequence for describing pre-fetch request processing according to the first modified example. Here, as presented in the third embodiment, it is assumed that one item of content is divided into three sections of divided content. Furthermore, it is assumed that each section of divided content is stored in a specified content distribution apparatus 3. It is assumed that the optimum cache determination unit 5e then determines each optimum cache apparatus that stores one or a plurality of sections of divided content.

In this case, the processing of steps S10 through S30 of FIG. 28 is executed before the processing of step S700, and the processing of steps S500 through S520 is executed thereafter. Furthermore, in the first modified example, before the processing of step S700, the conversion processing of SMIL data (S540) and the transmission processing for the converted SMIL data (S550) are executed.

In step S700, the content location management apparatus 5 transmits to a specified cache apparatus a pre-fetch request for a divided content (hereafter, in this modified example, divided content is simply referred to as content) corresponding to first distribution order. In this case, referencing the table (the table that the pre-fetch timing decision unit 5g holds), the control unit 5f of the content location management apparatus 5, pre-fetch timing decision unit transmits a pre-fetch request to the specified cache apparatus 4 based on the pre-fetch time. Furthermore, the control unit 5f transmits to the specified cache apparatus 4 a "distribution commencement time" of content corresponding to first distribution order.

In step S710, the specified cache apparatus 4 transmits a request for a given content to the content distribution apparatus 3 in which the content is stored. In step S720, the control unit of the content distribution apparatus 3 reads the content from the storage unit. The control unit of the content distribution apparatus then transmits the content to the specified cache apparatus 4.

In step S730, the SMIL data distribution apparatus 2 transmits the converted SMIL data to the reception terminal apparatus 7. This converted SMIL data includes "distribution source location information" of a cache apparatus 4 in which a "content corresponding to first distribution order" is expected to be stored; "distribution source location information" of a cache apparatus 4 in which a "content corresponding to second distribution order" is expected to be stored; and "distribution source location information" of a cache apparatus 4 in which a "content corresponding to third distribution order" is expected to be stored.

In step S740, processing for the first session control commencement is executed between the reception terminal apparatus 7 and the cache apparatus 4. In step S750, the cache apparatus 4 transmits the "content corresponding to first distribution order" to the reception terminal apparatus 7. In this case, the control unit 4c of the cache apparatus 4 performs transmission processing based on the "distribution commencement time" of content corresponding to first distribution order.

The processing described above (S760 through S870) is also executed for content corresponding to second distribution order, and content corresponding to third distribution order.

It should be noted that even in the first modified example, the pre-fetch timing decision unit 5g determines a "pre-fetch request time" (pre-fetch request timing). The pre-fetch request time is then determined "so that when the reception terminal apparatus 7 transmits "content distribution request" to an optimum cache apparatus, this optimum cache apparatus has already obtained the requested content".

Figure 31:
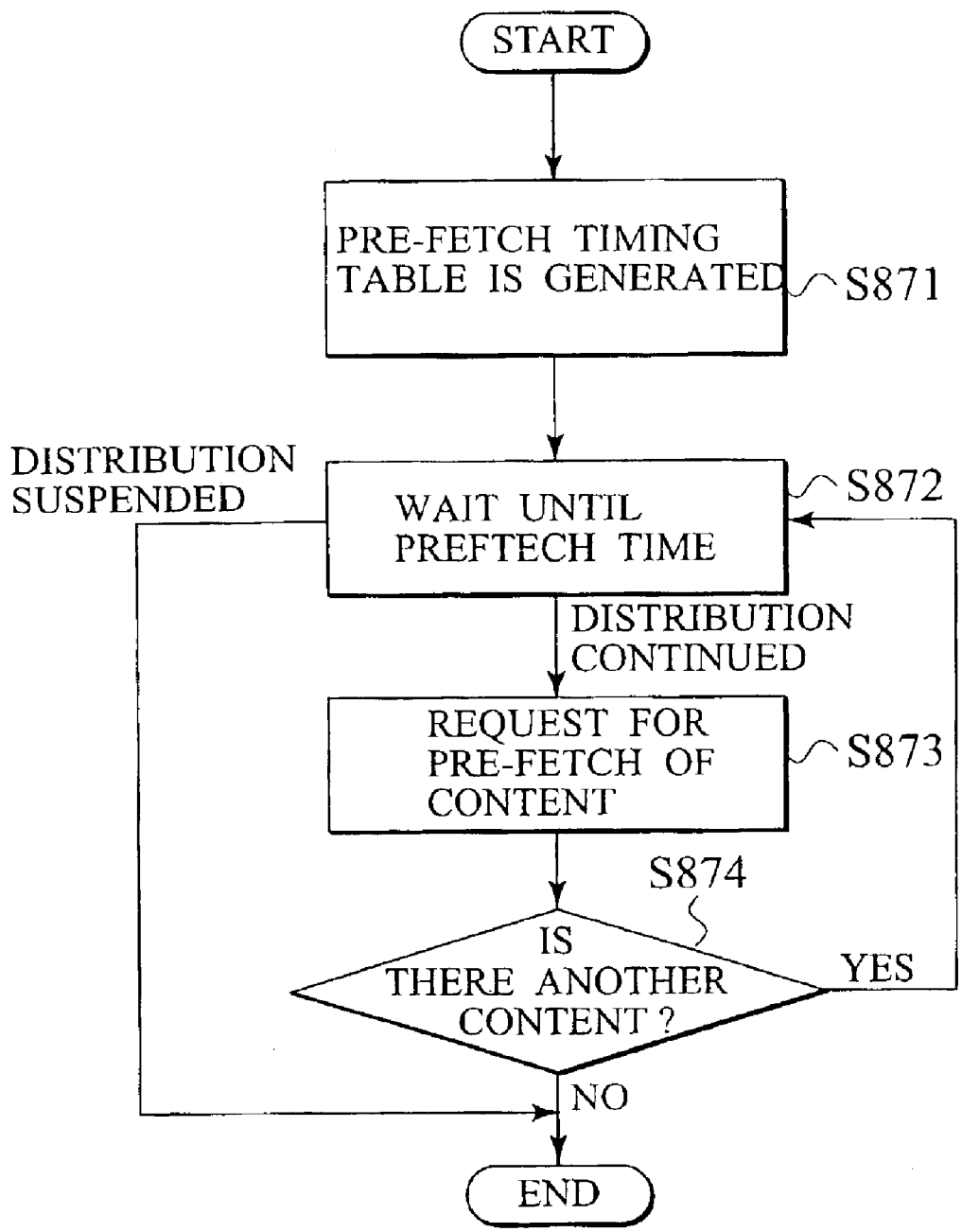
FIG. 31 is a flowchart showing pre-fetch request processing by a pre-fetch request unit according to the fourth embodiment.

FIG. 31 is a flowchart for describing pre-fetch request processing for the content location management apparatus 5. In step S871, the pre-fetch timing decision unit 5g of the content location management apparatus 5 generates the pre-fetch timing table.

In step S872, the content location management apparatus 5 then waits until the pre-fetch time of content corresponding to first distribution order. It should be noted that in the case where, for example, distribution operations are suspended, any pre-fetch request is suspended as well.

In step S873, when it becomes the pre-fetch time, the pre-fetch request unit 5h of the content location management apparatus 5 transmits to a specified cache apparatus 4 a pre-fetch request for the above content by referring to the pre-fetch timing table.

In step S874, referencing the pre-fetch timing table, the control unit 5f determines whether or not a "content corresponding to second distribution order" exists.

If it is determined that there is such content, processing of step S872 through processing of step S874 concerning the content are executed. Processing for S872 through S874 is then repeated until all contents to be distributed are gone.

On the other hand, if it is determined that there is no content corresponding to second distribution order, processing is completed.

In this modified example, in addition to the results of the fourth embodiment, the pre-fetch request unit 5h transmits a pre-fetch request to a cache apparatus 4 just before the content is distributed to the reception terminal apparatus 7. Thus, in the case where the reception terminal apparatus 7 suspended the distribution operation of content, the cache apparatus 4 no longer needs to store the content that the reception terminal apparatus 7 would receive. "The content that the reception terminal apparatus 7 would receive" means "content expected to be distributed to the reception terminal apparatus 7 if the reception terminal apparatus 7 did not suspend the distribution operation".

Thus, memory resources of the storage unit 4b in the cache apparatus 4, which is linked to the network, are no longer wastefully used. As a result, a more effective use of network resources is possible.

(Second Modified Example of the Fourth Embodiment)

In the first modified example of the fourth embodiment, the content location management apparatus 5 transmits a pre-fetch request to a cache apparatus 4. However, the processing may be performed as described below. Namely, the content location management apparatus 5 may transmit a pre-fetch request to the cache apparatus 4 through the SMIL data distribution apparatus 2. Furthermore, each cache apparatus 4 may have the function of the content location management apparatus 5 of the fourth embodiment. In addition, each cache apparatus 4 may independently transmit to a content distribution apparatus 3 a request for content distribution.

Fifth Embodiment

Moving of the reception terminal apparatus 7 is not considered in the above-mentioned first through fourth embodiments. However, in the case where the reception terminal apparatus 7 is, for example, a portable terminal apparatus or mobile phone, the reception terminal apparatus 7 may move while receiving content. In such case, for example, since "proximity level between the reception terminal apparatus 7 and cache apparatus 4" varies, there may be a case that the reception terminal apparatus 7 is unable to smoothly receive content. As a result, for example, "screen image quality on a display of the reception terminal apparatus 7" may be reduced.

In this embodiment, the optimum cache determination unit 5e can determine a "second optimum cache apparatus" even if content distribution is suspended due to the motion of reception terminal apparatus 7. The second optimum cache apparatus is a different apparatus from the already determined optimum cache apparatus. In addition, the reception terminal apparatus 7 is able to obtain content from the second optimum cache apparatus.

(Configuration)

Figure 32:
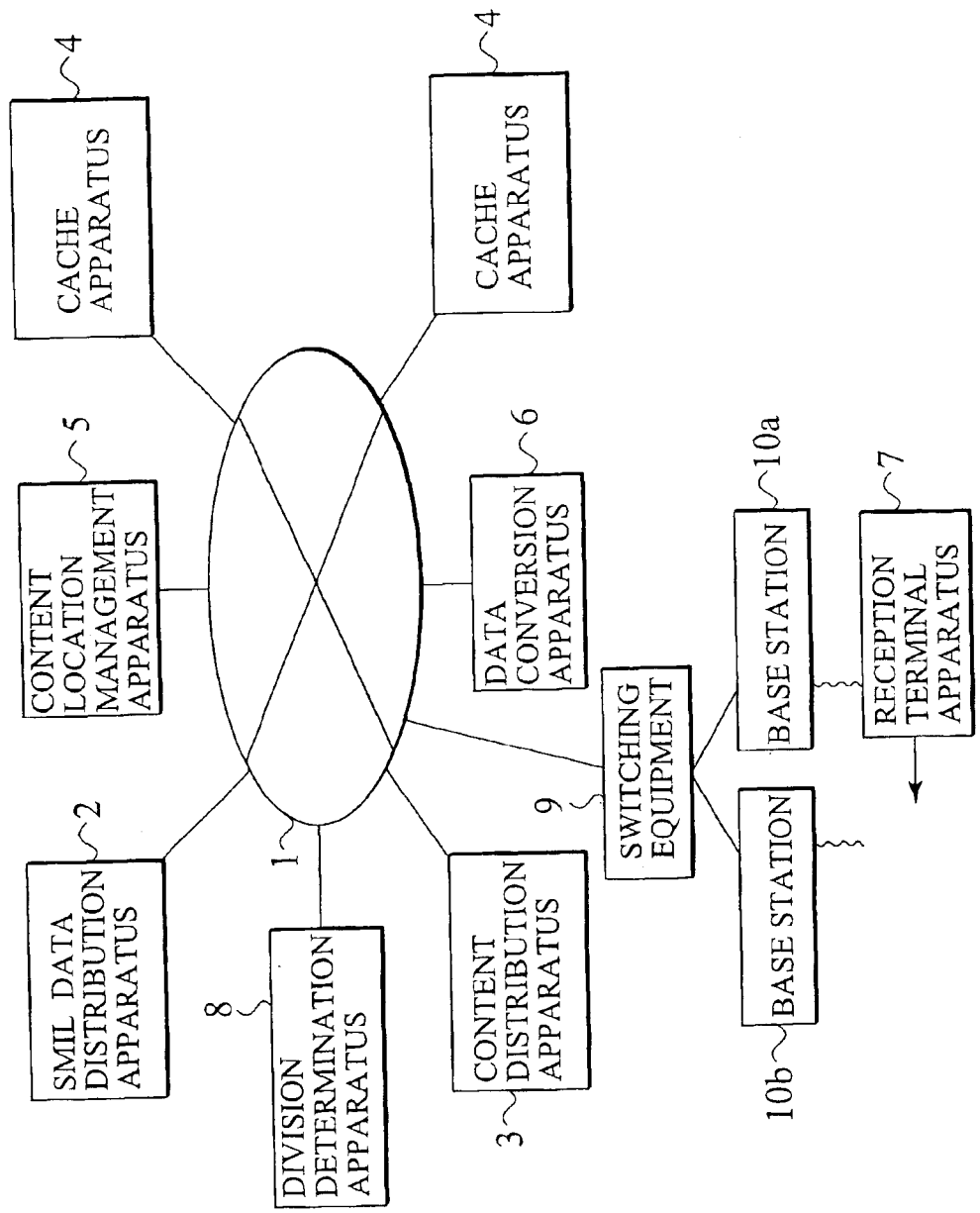
FIG. 32 is a diagram illustrating the configuration of a content distribution system according to a fifth embodiment.

FIG. 32 is a diagram illustrating the configuration of a content distribution system according to the fifth embodiment. In the fifth embodiment, the same reference numerals are given to the configuration identical to that of the content distribution system of the fourth embodiment, whereby description thereof is omitted. Concerning each of the configurations shown in FIG. 32, matters points differing from the configuration of the content distribution system of the fourth embodiment are the following.

In the content distribution system of the fifth embodiment, a switching equipment 9 is linked to the network 1. A plurality of base stations 10a, 10b, which perform wireless communication with each reception terminal apparatus 7, are linked to the switching equipment 9.

If a reception terminal apparatus 7 has moved a predetermined distance, the switching equipment 9 switches over a base station which performs wireless communication with the reception terminal apparatus 7. Furthermore, if data is transmitted from the reception terminal apparatus 7, the switching equipment 9 performs routing based on the location information of a destination apparatus included in the data. Furthermore, the switching equipment 9 manages location information (such as, IP address) of each reception terminal apparatus 7, which carries out communication with each base station 10a, 10b.

In the case where the "base station with which the reception terminal apparatus 7 carries out communication" changes due to the reception terminal apparatus 7 moving a predetermined distance, the switching equipment 9 alters a location information of the reception terminal apparatus 7. The switching equipment 9 then transmits the altered location information to the reception terminal apparatus 7 via a base station.

Figure 33:
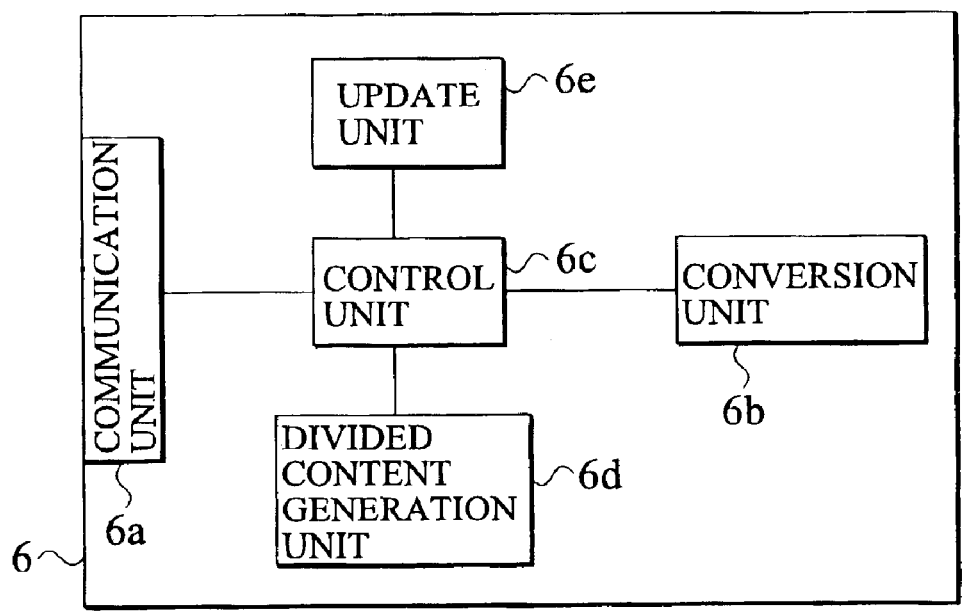
FIG. 33 is a diagram illustrating the configuration of data conversion apparatus according to the fifth embodiment.

Furthermore, the data conversion apparatus 6 includes an update unit 6e in addition to the configuration of the fourth embodiment. FIG. 33 is a diagram illustrating the configuration of the data conversion apparatus 6 of the present embodiment. The update unit 6e performs updating of the converted SMIL data, which has been transmitted from the reception terminal apparatus 7. Referencing the location information table (or the location information of a second optimum cache apparatus), the update unit 6e updates "distribution source location information" of a optimum cache apparatus, which is included in the converted SMIL data, into "distribution source location information" of a "second optimum cache apparatus".

It should be noted that the update unit 6e may also update the "distribution source location information" of a content distribution apparatus 3, which is included in the SMIL data that is stored in the storage unit 2b, into "distribution source location information" of a second optimum cache apparatus.
(Processing)

Figure 34:
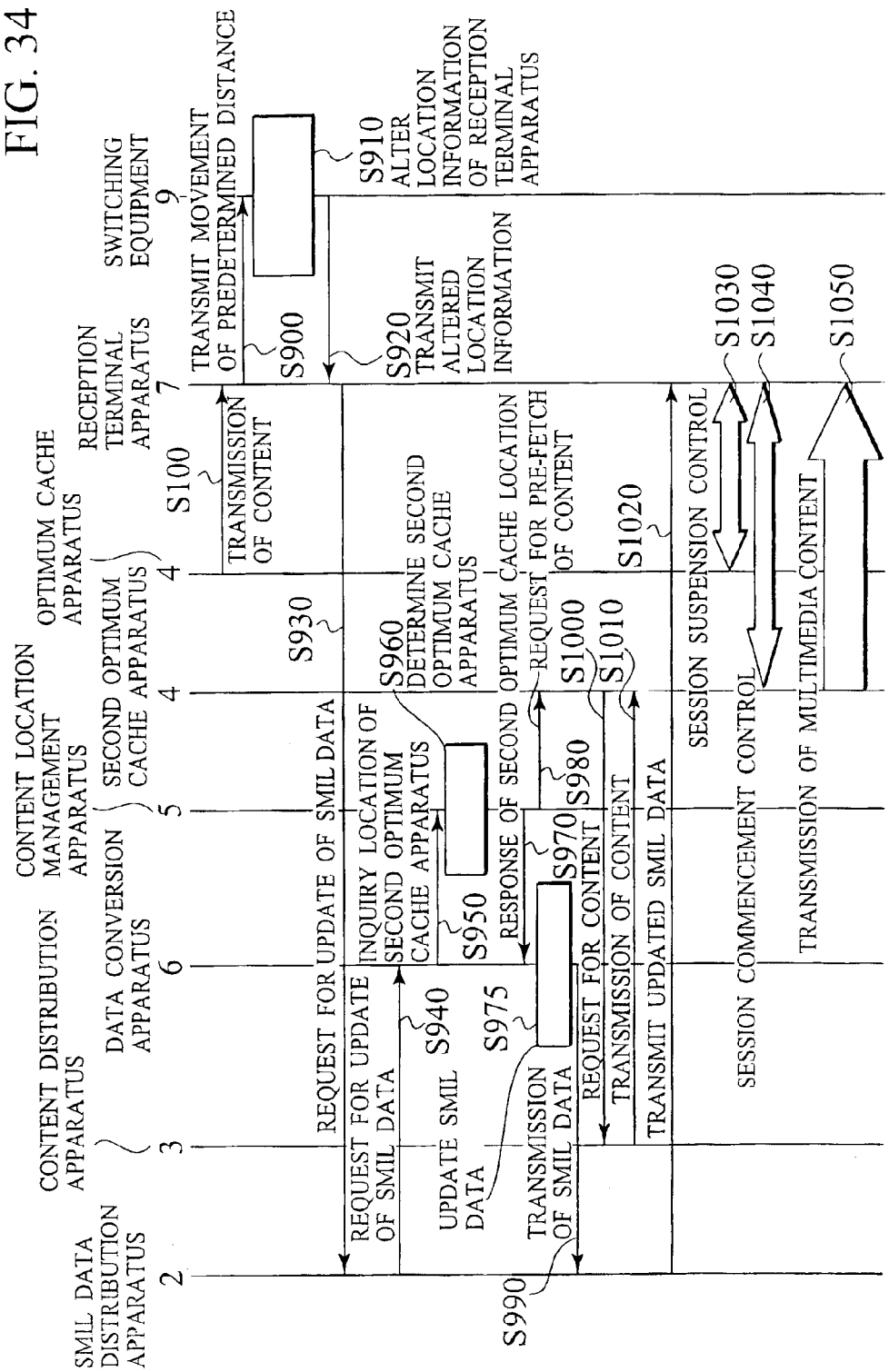
FIG. 34 is a sequence diagram illustrating content distribution processing by the content distribution system according to the fifth embodiment.

FIG. 34 is a sequence diagram for describing a content distribution method, which uses the content distribution system having the configuration described above. It should be note that in processing shown in FIG. 34, the same reference numerals are given for processing identical to that shown in FIG. 12, whereby description thereof is omitted.

The processing of step S100 of FIG. 12 is executed. In step S100, a reception terminal apparatus 7 receives the predetermined content from a specified cache apparatus 4 via a base station and the switching equipment 9. The reception terminal apparatus 7 then moves a predetermined distance (S900). The switching equipment 9 then alters a location information of the reception terminal apparatus 7 (S910). The switching equipment 9 then transmits the altered location information to the reception terminal apparatus 7 (S920).

The processing for steps S900 to S920 is as follows. In step S900, in the case where it is detected that, for example, a detection unit(not shown) of the reception terminal apparatus 7 detects that the reception terminal apparatus 7 has moved a predetermined distance, the control unit 7a of the reception terminal apparatus 7 transmits information indicating a movement of the predetermined distance to the switching equipment 9 via the communication unit 7a. The "movement of the predetermined distance" means, for example, a movement whereby there is a high probability that the reception terminal apparatus 7 will switch base station with which the reception terminal apparatus 7 carries out communication.

It should be noted that the switching equipment 9 may manage the geographic information of each reception terminal apparatus 7. In addition, the switching equipment 9 may detect a movement of the predetermined distance.

In step S910, the switching equipment 9, to which information indicating the movement of the predetermined distance is transmitted, alters the location information (such as, IP address) of the reception terminal apparatus 7. In step S920, the switching equipment 9 transmits the altered location information to the reception terminal apparatus 7 via the base station. It should be noted that the method of movement performed by the reception terminal apparatus 7, the method of detecting movement, and method of altering location information are not particularly limited in any way.

In step S930, the reception terminal apparatus 7 transmits to the SMIL data distribution apparatus 2 a request for updating an SMIL data. In this case, the altered location information of the reception terminal apparatus 7 is transmitted to the SMIL data distribution apparatus 2. In step S940, the SMIL data distribution apparatus 2 transmits the "request for updating the SMIL data" to the data conversion apparatus 6. In this case, the control unit 2c of the SMIL data distribution apparatus 2 reads the SMIL data concerning the above-mentioned content from the storage unit 2b. The "altered location information of the reception terminal apparatus 7" and the SMIL data are then transmitted to the data conversion apparatus 6.

In step S950, the data conversion apparatus 6 transmits to the content location management apparatus 5 a request for a location information (or a distribution source location information) of a "second optimum cache apparatus".

This second optimum cache apparatus is a different cache apparatus 4 from the already determined optimum cache apparatus. In step S960, the optimum cache determination unit 5e determines once again a cache apparatus 4 that is close to the reception terminal apparatus 7. In this case, the altered location information of the reception terminal apparatus 7 is transmitted to the optimum cache determination apparatus 5e.

The optimum cache determination unit 5e then determines a "second optimum cache apparatus" by referring to the altered location information of the reception terminal apparatus 7 and the proximity table. It should be noted that the optimum cache determination unit 5e may also determine the second optimum cache apparatus based on the load conditions of each of the cache apparatus 4.

In step S970, a location information of the second optimum cache apparatus is transmitted to the data conversion apparatus 6. In step S975, the update unit 6e updates a "distribution source location information" of the content distribution apparatus 3, which is included in the converted SMIL data, into a "distribution source location information" of the second optimum cache apparatus.

It should be noted that if the "location information of the second optimum cache apparatus 4" is represented by using an IP address, and the "distribution source location information included in the SMIL data" is represented by using an URL, the IP address is converted into an URL by a specified apparatus.

Furthermore, the update unit 6e may perform update processing in steps S930 through S975 as described below. Namely, in step S930, the reception terminal apparatus 7 transmits to the data conversion apparatus 6 "a request for updating SMIL data" and "the converted SMIL data". Instead of performing processing of step S940, the update unit 6e may perform the following processing in step S975 after steps S950 through S970. Referencing the location information of the second optimum cache apparatus, the update unit 6e may update a "distribution source location information" of the optimum cache apparatus, which is included in the converted SMIL data, into a "distribution source location information" of the second optimum cache apparatus.

It should be noted that in the case where pre-fetch request processing is not executed, referencing the "content location information table", the update unit 6e may update a "distribution source location information" of the optimum cache apparatus, which is included in converted SMIL data, into a "distribution source location information" of the second optimum cache apparatus in which the content (such as requested content) is stored. Furthermore, the SMIL data distribution apparatus 2 may store the converted SMIL data. In addition, the update unit 6e may update the converted SMIL data.

The processing of steps S980, S990 (same processing as S550), S1000 (content request processing), and S1010

(content transmission processing) are then executed. In this case, processing of step S980 is executed in the case where the above-mentioned content is not stored in the second optimum cache apparatus.

It should be noted that the processing from step S960 to S1010 may be executed as described below. The optimum cache determination unit 5e reads the "content location information table" via the control unit 5f,and determines whether or not the "content that the reception terminal apparatus 7 has received" is stored in the above-mentioned second optimum cache apparatus. In the case where it is determined that the above-mentioned content is stored in the second optimum cache apparatus, processing of steps S970 (same processing as S520), S975 (same processing as S540), and S990 are executed. Processing then proceeds to step S1020.

In this case, referencing the "content location information table" or the location information of the second optimum cache apparatus, the update unit 6e updates a "distribution source location information" of the content distribution apparatus 3, which is included in the SMIL data, into a "distribution source location information" of the second optimum cache apparatus.

On the other hand, if it is determined that the above-mentioned content is not stored in the second optimum cache apparatus, the optimum cache determination unit 5e instructs the pre-fetch request unit 5h to transmit "a pre-fetch request" to the second optimum cache apparatus. Processing from step S970 up to step S1010 (from S520 to S570) are then executed. In this case, if the above-mentioned content is stored in the second optimum cache apparatus through the pre-fetch request processing, the control unit (rewrite unit) 5f of the content location management apparatus 5 rewrites the "content location information table" in the storage unit 5b.

Furthermore, even if the above-mentioned content is not stored in the second optimum cache apparatus, in step S975, referencing the rewritten content location information table, the update unit 6e may update a "distribution source location information" of the content distribution apparatus 3, which is included in the above-mentioned SMIL data, into a "distribution source location information" of the second optimum cache apparatus.

In step S1020, the updated SMIL data, which is obtained by updating the SMIL data, is transmitted from the SMIL data distribution apparatus 2 to the reception terminal apparatus 7. Processing for controlling session suspension between the reception terminal apparatus 7 and the cache apparatus which is communicating with the apparatus 7, is executed in step S1030. In this case, the control unit 7 of the reception terminal apparatus 7 generates a "suspension time information", which indicates a time period from the "distribution commencement time" to the suspension time, and holds the "suspension time information.

In step S1040, based on the distribution source location information of the second optimum cache apparatus, the reception terminal apparatus 7 accesses the second optimum cache apparatus and performs control processing for session commencement. In step S1050, based on the "distribution commencement time information", the second optimum cache apparatus transmits to the reception terminal apparatus 7 a content identified by "content identification information".

Based on the stored suspension time information, the control unit 7d of the reception terminal apparatus 7 then instructs the replay unit 7b to replay the transmitted content starting from a suspended portion of the transmitted content. The replay unit 7b executes the above-mentioned the instruction.

Therefore, the reception terminal apparatus 7 receives the updated SMIL data after the reception terminal apparatus 7 suspends the receipt of requested content from the optimum cache apparatus. Based on the updated SMIL data, the reception terminal apparatus 7 receives the requested content from the second optimum cache apparatus.

The replay processing is performed by this replay unit 7b in the manner as described below, for example. Based on a RTSP command, the replay unit 7b obtains a data that includes the suspension time. This suspension time denotes a time that is represented based on time of "content distribution commencement". The replay unit 7b can then replay a content starting from the suspension time based on the above-mentioned data.

Furthermore, when the data that includes the suspension time is transmitted to the second optimum cache apparatus 4, the communication unit 4a of the second optimum cache apparatus 4 is able to transmit a content starting from the suspension time.

It should be noted that if the reception terminal apparatus 7 switches the communicating party from the optimum cache apparatus to the second optimum cache apparatus, the optimum cache apparatus transmits to the reception terminal apparatus 7 an RTSP command, which includes a "REDIRECT method". This allows the reception terminal apparatus 7 to switch the communicating party from the optimum cache apparatus to the second optimum cache apparatus.

Furthermore, the location information of each apparatus in a network (such as, the Internet) in which the SMIL data distribution apparatus 2, the cache apparatus 4, and the data conversion apparatus 6 are linked, may be represented by using global IP address. Furthermore, in a wireless network to which the switching equipment 9, base stations, and each reception terminal apparatus 7 are linked, the location information of each apparatus may be represented by using mobile IP address (such as, the address is represented by using a part of the global IP address).

Furthermore, the SMIL data distribution apparatus 2 may detect that the reception terminal apparatus 7 has moved a predetermined distance. The SMIL data distribution apparatus 2 may then transmit a updated SMIL data to the reception terminal apparatus 7 if the movement of predetermined distance is detected. Processing for detecting the movement of the reception terminal apparatus 7 is performed based on information concerning alteration of the IP address of the reception terminal apparatus 7, or a "movement detection signal" from a network management apparatus, for example.

(Operation Results)

There is a case where the reception terminal apparatus 7 cannot receive content from the cache apparatus 4 any longer, due to the reception terminal apparatus 7 having moved a predetermined distance. For this reason, there is a case where the reception terminal apparatus 7 must suspend reception operation of the content. In such cases, according to the fifth embodiment, the optimum cache determination unit 5e determines a "second optimum cache apparatus" that the moved reception terminal apparatus 7 can quickly access. Furthermore, the update unit 6e updates the distribution source location information, which is included in the SMIL data, into the distribution source location information of the second optimum cache apparatus. The updated SMIL data is then transmitted to the reception terminal apparatus 7. As a result, even when the reception terminal apparatus 7 has moved a predetermined distance, it is able to continue to obtain content from a cache apparatus 4(the second optimum cache apparatus) based on the distribution source location information of the second optimum cache apparatus.

(First Modified Example of the Fifth Embodiment)

Figure 35:
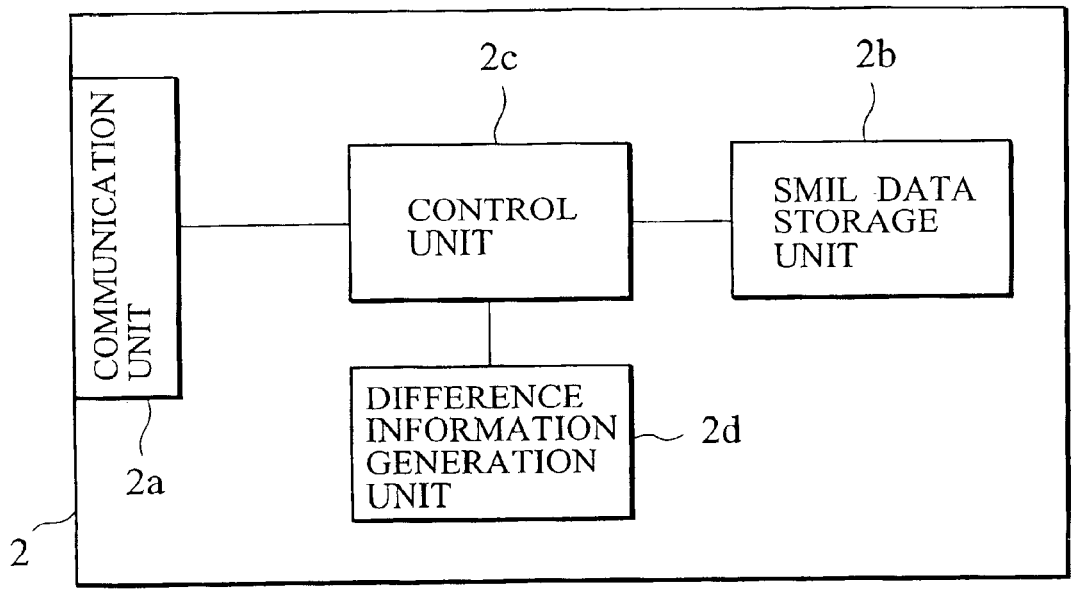
FIG. 35 is a diagram illustrating the configuration of an SMIL data distribution apparatus of a first modified example of the fifth embodiment.

In the content distribution system according a first modified example of the fifth embodiment, the SMIL data distribution apparatus 2 further includes a difference information generation unit 2d. FIG. 35 is a diagram illustrating the configuration of the SMIL data distribution apparatus 2 of the first modified example. The difference information generation unit 2d compares the updated SMIL data, which is SMIL data updated by the update unit 6e, and the converted SMIL data, which is converted by the data conversion apparatus 6. The difference information generation unit 2d then generates a "difference information", which indicates the differences between the updated SMIL data and converted SMIL data.

Figure 36:
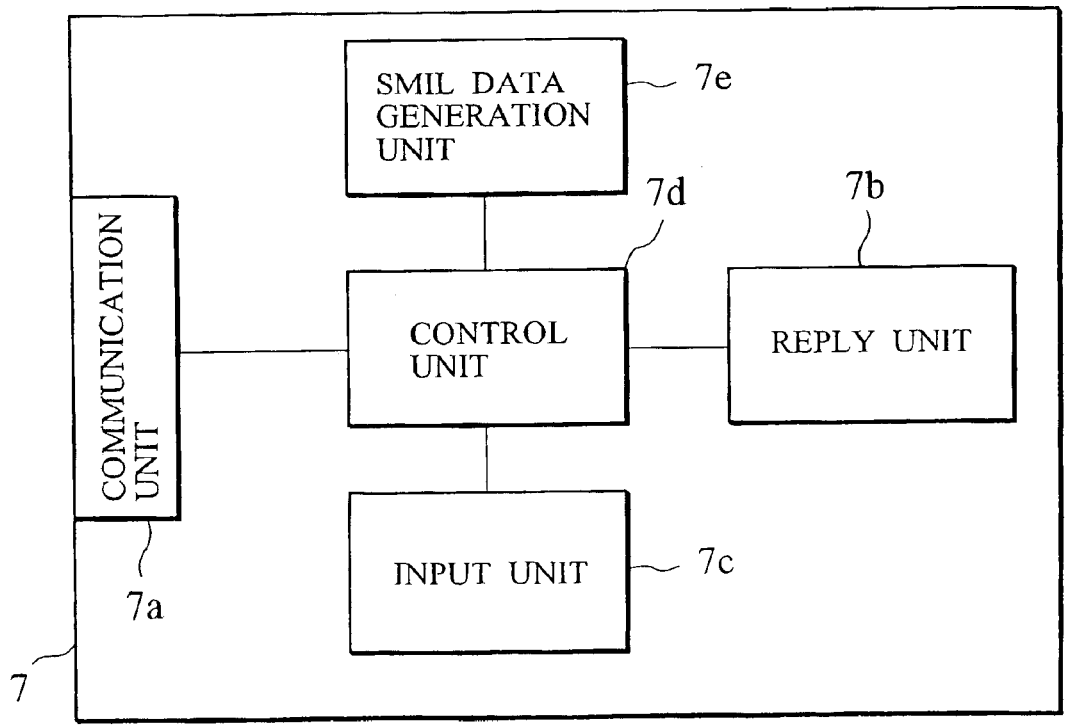
FIG. 36 is a diagram illustrating the configuration of a reception terminal apparatus of the first modified example of the fifth embodiment.

FIG. 36 is a diagram illustrating the configuration of the reception terminal apparatus 7 of the first modified example. The reception terminal apparatus 7 includes an SMIL data generation unit 7e, which generates a "new SMIL data" based on a "converted SMIL data held in the control unit 7d" and the "difference information".

Figure 37:
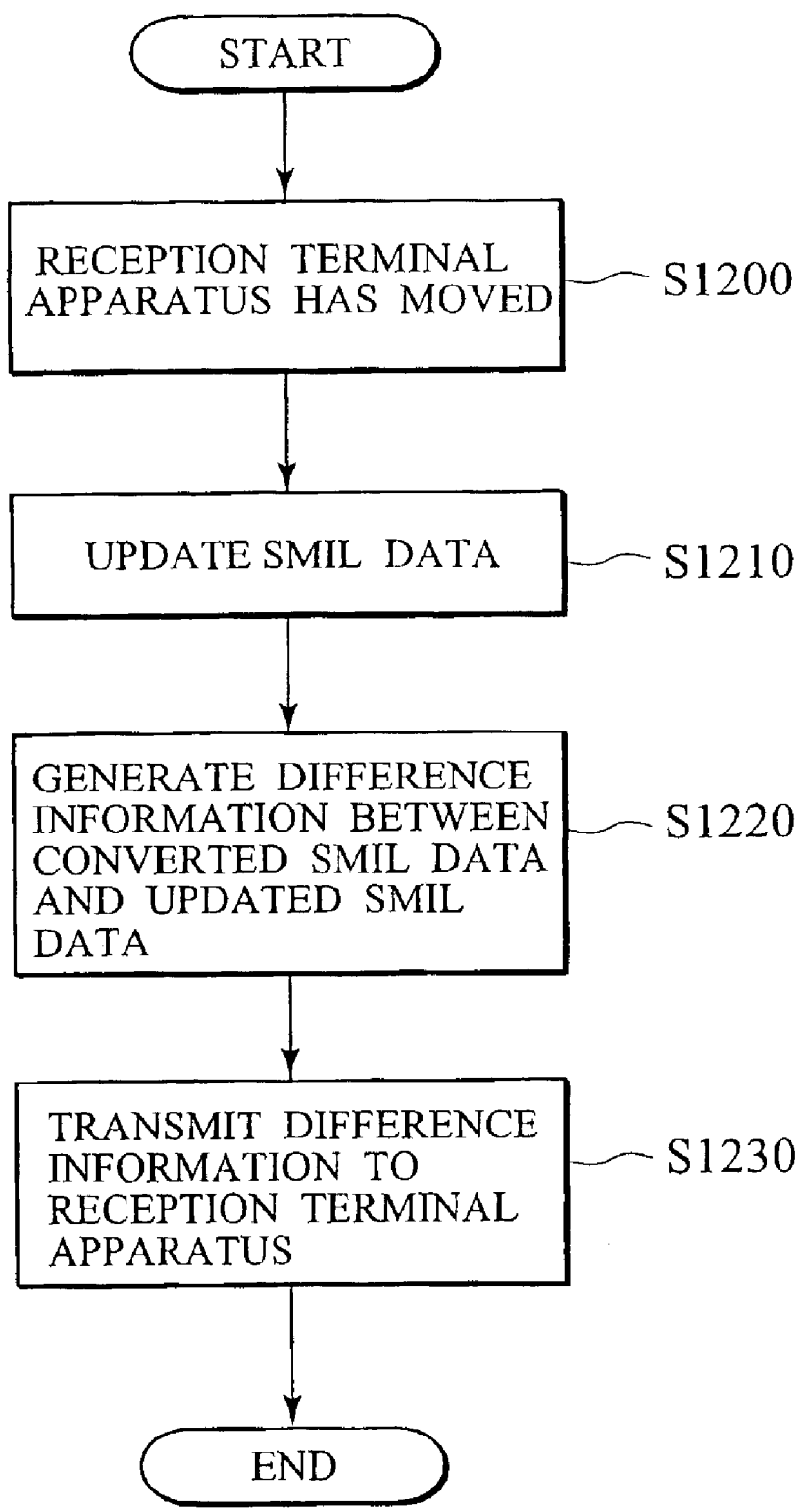
FIG. 37 is a flowchart showing processing concerning difference information of the first modified example of the fifth embodiment.

FIG. 37 is a flowchart showing the generation processing performed by the difference information generation unit 2d, and the generation processing (method) performed by the SMIL data generation unit 7e. A description corresponding to the sequence diagram shown in FIG. 34 is as follows.

In step S1200, if the reception terminal apparatus 7 has moved a predetermined distance, the altered location information of the reception terminal apparatus 7 is transmitted to the reception terminal apparatus 7 (processing for S900, S910, and S920).

After processing of steps S930 to S970 are then executed, updating of the SMIL data is performed in step S1210. This processing is the same as processing of step S975. After processing of step S990 (transmission of an updated SMIL data) is executed, in step S1220, the difference information generation unit 2d compares the updated SMIL data and the converted SMIL data, and generates "difference information" based on the comparison results. It should be noted that the converted SMIL data may be transmitted from the reception terminal apparatus 7 to the SMIL data distribution apparatus 2. Furthermore, it may be stored in the SMIL data distribution apparatus 2.

In step S1230, the difference information is transmitted to the reception terminal apparatus 7 via the control unit 2c of the SMIL data distribution apparatus 2. The SMIL data generation unit 7e of the reception terminal apparatus 7 generates a "new SMIL data" based on the converted SMIL data held by the control unit 7d and the difference information. Processing subsequent to step S1030 is then executed.

It should be noted that "XSLT" is used for the generation processing for the difference information, for example. Furthermore, for example, "SOAP" is used for the update processing for an SMIL data. For example, as shown in FIG. 38, a SOAP message may also be used in the update processing for an SMIL data. FIG. 38 shows that the URL surrounded by <oldSrc> and </oldSrc> is replaced by the next displayed URL, which is surrounded by <newSrc> and </newSrc>.

This SOAP message indicates that "rtsp://cashe-souchi-407/content-A-2.mp4" is updated into "rtsp://cashe-souchi-408/content-A-2.mp4", and "rtsp://cashe-souchi-407/content-V-2.mp4" is updated into "rtsp://cashe-souchi-408/content-V-2.mp4".

Furthermore, the pre-update SMIL data, which the update unit 6e uses for update processing, may be a "converted SMIL data" held by the reception terminal apparatus 7, or may be an SMIL data stored in the storage unit of the SMIL data distribution apparatus 2.

In the case where the pre-update SMIL data is an SMIL data that is stored in the storage unit of the SMIL data distribution apparatus 2, the above-mentioned SMIL data needs to be transmitted to the reception terminal apparatus 7.

According to the first modified example, it is recommended that the SMIL data distribution apparatus 2 transmits to the reception terminal apparatus 7 only the difference information rather than the updated SMIL data. Thus, since the "reduction of amount of information to be transmitted to the reception terminal apparatus 7" is possible, network congestion may be prevented.

(Second Modified Example of the Fifth Embodiment)

The fifth embodiment is applicable in the case where a "portion of content stored in the optimum cache apparatus" is deleted while the reception terminal apparatus 7 is receiving the content from the optimum cache apparatus. In the same way, the fifth embodiment is also applicable in the case where modifications are made to the content stored in the optimum cache apparatus while the reception terminal apparatus 7 is receiving the content from the optimum cache apparatus.

In this case, after the reception terminal apparatus 7 has transmitted an update request for an SMIL data, the processing subsequent to step S940 are executed.

Furthermore, for example, the fifth embodiment is applicable in the case where the above-mentioned content is stored in a more optimum cache apparatus while the reception terminal apparatus 7 is receiving the content from an optimum cache apparatus. In this case, for example, the reception terminal apparatus 7 receives that information "indicating that the above-mentioned content is stored in a more optimum cache apparatus" from the network management apparatus. After the reception terminal apparatus 7 has transmitted an update request for an SMIL data, the processing subsequent to step S940 are executed.

Sixth Embodiment

In the first through fifth embodiments, a description is given using SMIL data as an example of "multimedia content description data". In the present embodiment, a description is given using electronic mail data as the multimedia content description data. In addition, each content is distributed to an unspecified number of reception terminal apparatus 7 in the content distribution system of the first through fifth embodiments. However, each content is distributed to a specified number of reception terminal apparatus 7 in the content distribution system of the present embodiment.

Figure 39:
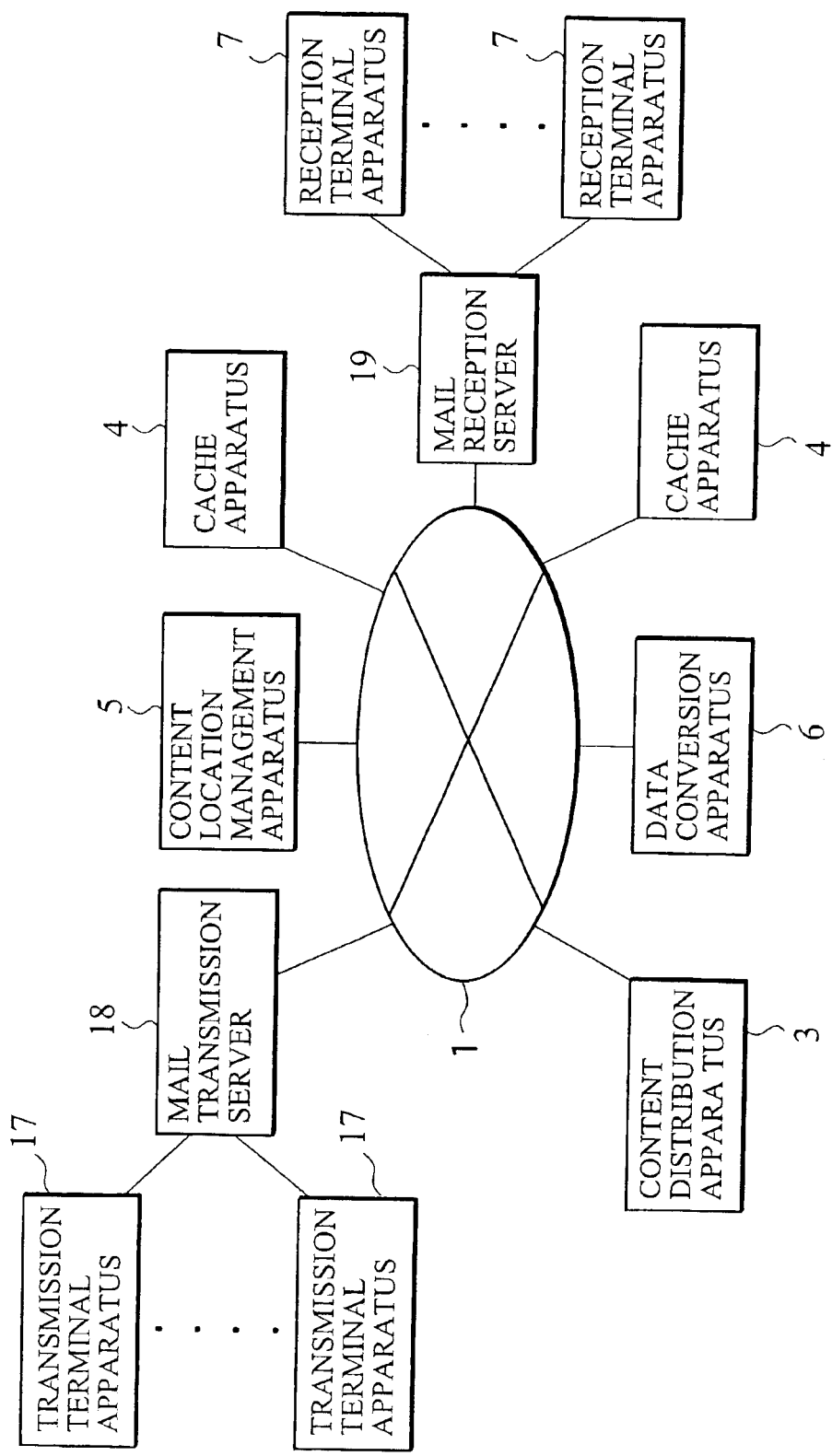
FIG. 39 is a diagram illustrating the configuration of a content distribution system according to a sixth embodiment.

FIG. 39 is a diagram illustrating the configuration of a content distribution system of the sixth embodiment. In the content distribution system of the sixth embodiment, the same reference numerals are given to the same configuration as that of the content distribution system illustrated in FIG. 1, whereby the description thereof is omitted.

The content distribution system of the sixth embodiment, does not include the SMIL data distribution apparatus 2. In addition, the content distribution system includes a plurality of transmission terminal apparatus 17; a mail transmission server 18, which carries out transmission of electronic mail data with the above-mentioned plurality of transmission terminal apparatus 17; a plurality of reception terminal apparatus 7; and a mail reception server 19, which carries out transmission of electronic mail data with the above-mentioned plurality of reception terminal apparatus 7.

It should be noted that the content distribution system may include a plurality of mail transmission servers 18, and may include a plurality of mail reception servers 19.

The plurality of transmission terminal apparatus 17 may carry out communication with the mail transmission server 18 through the network, for example. In the same way, the plurality of reception terminal apparatus 7 may carry out communication with the mail reception server 19 through the network, for example.

A user inputs information concerning generation of electronic mail data to an input unit (not shown) of the transmission terminal apparatus 17. The transmission terminal apparatus 17 generates electronic mail data based on the information inputted by a user. The electronic mail data includes a "distribution source location information" (such as, URL), which is location information of a content distribution apparatus 3 in which a specified content is stored. Furthermore, the electronic mail data includes a "destination location information" (such as, mail address) which indicates the location information of "reception terminal apparatus 7 to which the electronic mail data is transmitted". Furthermore, the electronic mail data includes a transmission source location information (such as, mail address) which indicates the location information of "transmission terminal apparatus 17 which transmits the electronic mail data to a reception terminal apparatus 7". The transmission terminal apparatus 17 transmits the generated electronic mail data to the mail transmission server 18.

The mail transmission server 18 obtains the electronic mail data transmitted from the transmission terminal apparatus 17. The mail transmission server 18 then transmits the electronic mail data to a specified mail reception server 19 based on "destination location information" included in the electronic mail data. The mail reception server 19 is a mail reception server 19 which manages the location information of a reception terminal apparatus 7 corresponding to "destination location information".

The mail reception server 19 includes a communication unit (not shown), a control unit (not shown), and a storage unit (not shown). The communication unit receives the electronic mail data transmitted from the mail transmission server 18. Furthermore, in the case where a "request for electronic mail data transmission" is transmitted from a reception terminal apparatus 7, the communication unit receives the request.

The control unit (description data obtaining unit) of the reception server 19 obtains the electronic mail data transmitted from the communication unit. In other words, the control unit obtains description data from a transmission terminal apparatus 17, which includes a distribution source location information of a content distribution apparatus 3 (content distribution apparatus in which specified content is stored). The control unit stores the electronic mail data in the storage unit. Furthermore, when the control unit obtains the above request, the control unit accesses the storage unit In the case where "electronic mail data directed to the reception terminal apparatus 7 which transmits the above request" is stored in the storage unit, the control unit then obtains the above-mentioned electronic mail data from the storage unit. The control unit then transmits the electronic mail data to the data conversion apparatus 6 via the communication unit. The control unit then obtains "a converted electronic mail data" from the data conversion apparatus 6 via the communication unit. The control unit then transmits the converted electronic mail data to the reception terminal apparatus 7.

Based on the request for electronic mail data which is inputted to the input unit 7c, the control unit 7d of the reception terminal apparatus 7 transmits the above request to the mail reception server 19 via the communication unit 7a. Furthermore, the control unit 7d obtains via the communication unit 7a electronic mail data, which is transmitted from the mail reception server 19. In this case, for example, the control unit 7d of the reception terminal apparatus 7 executes a mail program to read the electronic mail data. Based on the execution result, the control unit 7d identifies information concerning URL in electronic mail data.

It should be noted that the configurations and functions of the cache apparatus 4, content location management apparatus 5, and data conversion apparatus 6 of this embodiment are the same as in the description of the above-mentioned first embodiment. However, in the description of the functions of each apparatus in the first embodiment, term "SMIL data" must be substituted by term "electronic mail data". Furthermore, the functions of the reception terminal apparatus 7 other than those in the above description are the same as the functions of the reception terminal apparatus 7 of the first embodiment.

Furthermore, as with the SMIL data, the electronic mail data may contain information identifying a content, content time information, synchronization time information, and layout information, for example.

Furthermore, as with the first through fifth embodiments, the electronic mail data includes a distribution source location information (such as an URL) of the content distribution apparatus 3. A distribution source location information (such as an URL) of a cache apparatus 4 is included in a converted electronic mail data. Furthermore, conversion between a mail address and an URL is executed through the above-mentioned DNS, for example.

(Content Distribution Method)

Figure 40:
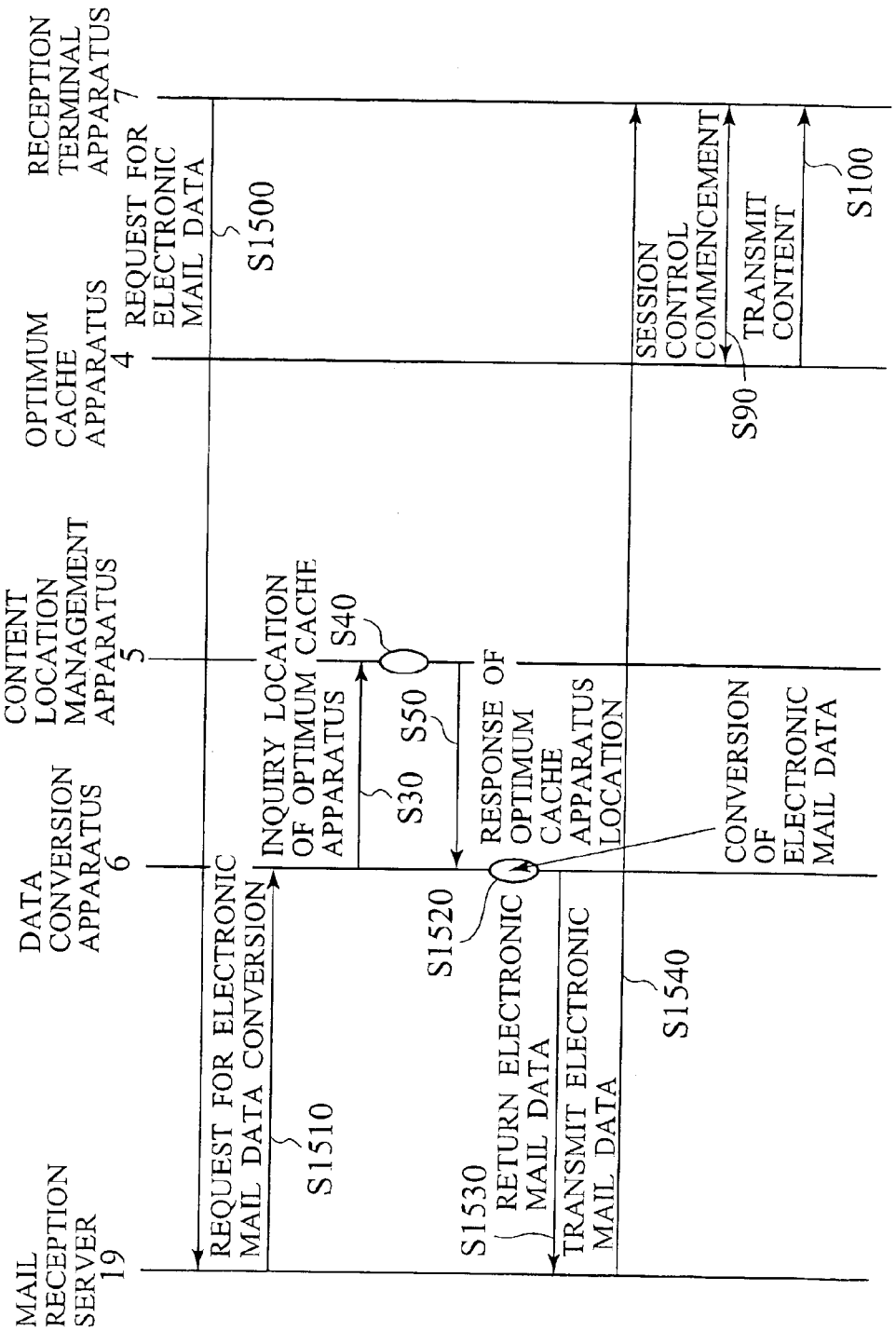
FIG. 40 is a sequence diagram for describing a content distribution method of the sixth embodiment.

The processing for proximity table generation and the processing for proximity table storage indicated in FIG. 11 are also executed in this embodiment. FIG. 40 is a sequence diagram for describing a content distribution method, which uses the content distribution system having the configuration described above. It should be noted that in FIG. 40, the same reference numerals are given to the same processing as that indicated in FIG. 4, whereby the description thereof is simplified. Furthermore, the description of similar processing to that indicated in FIG. 4 is also simplified.

As described above, it is assumed that the electronic mail data directed to a reception terminal apparatus 7 is stored in the storage unit of the mail reception server 19. The control unit 7d of the reception terminal apparatus 7 then transmits a request for transmitting the electronic mail data, to the control unit of the mail reception server 19 via the communication unit 7a (S1500). The control unit of the mail reception server 19 obtains from the storage unit the electronic mail data directed to the above-mentioned reception terminal apparatus. FIG. 41 is a diagram illustrating an example of the above-mentioned electronic mail data. The control unit of the mail reception server 19 then transmits to the data conversion apparatus 6 via the communication unit the electronic mail data and a location information (such as, a mail address) of the above-mentioned reception terminal apparatus 7 (S1510). In this processing for S1510, "URL 1" shown in FIG. 41 is transmitted to the data conversion apparatus 6, for example.

Inquiry processing (S30), determination processing (S40), and response processing (S50) are then executed. The specific description of these processing is the same as in the first embodiment.

For example, in the case where a "URL 2" of an optimum cache apparatus 4, storing the predetermined content, is transmitted from the content location management apparatus 5, the conversion unit 6b of the data conversion apparatus 6 converts the "URL 1 that is included in the electronic mail data" into the "URL 2". The converted electronic mail data is then transmitted to the mail reception server 19. FIG. 42 is a diagram showing an example of converted electronic mail data.

The conversion unit 6b of the data conversion apparatus 6 then performs a conversion of the electronic mail data (S1520). A specific description of this conversion processing corresponds to the description of the case where term "SMIL data" in the description of S60 is substituted by term "electronic mail data". The converted electronic mail data is then transmitted to the control unit of the mail reception server 19 (S1530). Based on the location information of the reception terminal apparatus 7, the control unit of the mail reception server 19 transmits to the control unit 7d of the reception terminal apparatus 7 via the communication unit 15 the converted electronic mail data, which is electronic mail data converted by the conversion unit 6b (S1540).

The processing for commencing session control (S90) and processing for transmitting content from the optimum cache apparatus to the reception terminal apparatus 7 (S100) are then executed. The specific description of these processing is the same as in the first embodiment. It should be noted that session control protocol may be not only "RTSP", but may also "HTTP".

It should be noted that in S100, if the optimum cache apparatus does not store the predetermined content, the optimum cache apparatus 4 obtains the predetermined content from a content distribution apparatus 3, storing the predetermined content. The optimum cache apparatus 4 then transmits the above-mentioned content to the reception terminal apparatus 7.

Furthermore, the content distribution system of this embodiment may apply to the i-shot service. In this case, the transmission terminal apparatus 17 is a mobile phone, for example. In addition, "moving image content" and/or "still image content" are communicated between each apparatus. The electronic mail data is then transmitted from a mobile phone to the mail transmission server 18. Furthermore, the mobile phone transmit a content to the content distribution apparatus 3. One or a plurality of cache apparatus 4 obtain content from the content distribution apparatus 3 in which the content is stored, and temporarily store the content.

(Operation Results)

According to this embodiment, the control unit (description data obtaining unit) of the mail reception server 19 obtains from a transmission terminal apparatus 17 electronic mail data, which includes a location information of a content distribution apparatus 3 in which a predetermined content is stored. Referencing the location information table, the conversion unit 6b then converts the location information of the content distribution apparatus 3, which is included in the electronic mail data, into a location information of a specified cache apparatus 4. The control unit 7d of a reception terminal apparatus 7 then obtains converted electronic mail data, which is electronic mail data converted by the conversion unit 6b. Based on the converted electronic mail data, the control unit 7d of the reception terminal apparatus 7 then obtains the predetermined content from the above-mentioned cache apparatus 4.

This allows the reception terminal apparatus 7 to access cache apparatus 4 other than cache apparatus 4 registered in the reception terminal apparatus 7. Furthermore, the reception terminal apparatus 7 can access cache apparatus 4 that are apparatus other than the "content distribution apparatus 3 corresponding to a distribution source location information included in the electronic mail data". Therefore, the reception terminal apparatus is able to adequately utilize each cache apparatus 4 linked to the network. As a result, effectively utilizing network resources is realized in the content distribution system of this embodiment.

Furthermore, in the case where the cache apparatus 4 to which the reception terminal apparatus 7 can quickly access is linked to the network, and the above-mentioned cache apparatus 4 is not registered in the reception terminal apparatus 7, the reception terminal apparatus 7 can obtain the converted electronic mail data that includes the location information of the above-mentioned cache apparatus 4. Thus, "the access time necessary for the reception terminal apparatus 7 to obtain content" is shortened. As a result, in the content distribution system of this embodiment, network congestion is prevented, as well as content distribution quality being substantially improved.

(1) Even in the present embodiment, the optimum cache determination unit 5e may have the functions according to the second embodiment and the functions of the first and second modified examples of the second embodiment.

(2) The content distribution system of this embodiment, may include the division determination apparatus 8 presented in the third embodiment. In addition, the cache apparatus 4 of present embodiment may have the function of the cache apparatus 4 of the third embodiment, and the data conversion apparatus 6 of present embodiment may have the function of the data conversion apparatus 6 of the third embodiment.

Furthermore, "a distribution source location information of the content distribution apparatus 3 in which a plurality of sections of divided content are stored" may be included in electronic mail data. It should be noted that the divided content generation unit 6d generates the plurality of sections of divided content by executing the division of a predetermined content.

The control unit (description data obtaining unit) of the mail reception server 19 then obtains from a transmission terminal apparatus 17 electronic mail data, which includes a "distribution source location information" of the content distribution apparatus 3 in which the plurality of sections of divided content are stored.

Furthermore, referencing the division location information table, the conversion unit 6b converts a distribution source location information of a content distribution apparatus 3, which is included in an SMIL data, into a distribution source location information of a specified cache apparatus 4. The control unit 7d of the reception terminal apparatus 7 obtains the electronic mail data (converted description data), which is converted by the conversion unit 6b. Furthermore, the control unit 7d of the reception terminal apparatus 7 obtains each section of divided content from one or a plurality of cache apparatus 4 based on the converted electronic mail data.

In this case, processing as described below is executed by the content distribution system. Processing for S200 in FIG. 21 is not executed. A user who holds a predetermined content inputs a "registration request for the predetermined content" to an input unit of the server apparatus of the user.

The registration request and an "instruction to determine whether or not division of the predetermined content is necessary" are transmitted to the division determination apparatus 8. In this case, the amount of data of the predetermined content is also transmitted to the data conversion apparatus 6.

Processing of S220 to S250 and S270 are then executed. However, the "processing which indicates requesting for conversion of an SMIL data" is not executed in step S240. Furthermore, the processing which indicates conversion of an SMIL data" is not executed in step S250.

It should be noted that in step S270, the content distribution apparatus 3 storing each section of divided content is not particularly limited in any way. Furthermore, in the description of (distribution processing for divided content) (1), which is described in explanation of the content distribution method of the third embodiment, the term "SMIL data" is substituted by term "electronic mail data".

Furthermore, the optimum cache determination apparatus of present embodiment may have the determination function (2), which is described in the explanation of the content distribution method of the third embodiment. Furthermore, based on the electronic mail data, the control unit of the mail reception server 19 reads a plurality of "divided content time information", and transmits "each item of content time information" and the "location information of the reception terminal apparatus 7" to the content location management apparatus 5. The optimum cache determination unit 5e may have function (3) that is described in explanation of the content distribution method of the third embodiment.

Furthermore, "processing (4) described in explanation of the content distribution method of the third embodiment" is modified as follows. The processing for S1500 and S1510 is executed instead of the processing from S300 to S310. The processing from step S320 to S390 are then executed. The specific description of these processing is the same as in the third embodiment. However, in the processing for S390, the conversion of electronic mail data is executed instead of conversion of SMIL data. Subsequently, processing for S1530, S1540, and processing from S420 to S450 is executed.

(3) Furthermore, the content location management apparatus 5 of present embodiment may have the function of the content location management apparatus 5 of the fourth embodiment. The following modifications are executed to the processing indicated in FIG. 28. The processing for S1510 and S1520 is executed instead of the processing for S10 and S20. The processing for S30 and processing from S500 to S540 is then executed. However, in S540, the conversion of electronic mail data is executed instead of the conversion of SMIL data. Furthermore, the processing for S1530 is executed instead of the processing for S550, and the processing for S1540 is executed instead of the processing for S580.

Furthermore, the pre-fetch timing decision unit 5g may have the function of the first modified example of the fourth embodiment. In FIG. 30, the processing for S1500 and S1510 and the processing from S500 to S520 is executed before the processing for S700. Furthermore, the processing for S540 and S1530 is executed before the processing for S700. In FIG. 30, the processing for S1540 is executed instead of the processing for S730. Furthermore, the content location management apparatus 5 may transmit a pre-fetch request to the cache apparatus 4 via the mail reception server 19.

(4) The mail reception server 19 of present embodiment may have the function of the switching equipment 9 of the fifth embodiment. In addition, the mail reception server 19 may be linked to the reception terminal apparatus 7 via a base station.

In explanation of fifth embodiment, the switching equipment of the fifth embodiment is substituted by a mail reception server 19. In explanation of fifth embodiment, SMIL data is substituted by electronic mail data. The mail reception server 19 may detect a movement of a predetermined distance which is performed by a reception terminal apparatus 7, and may also transmit an updated electronic mail data to the reception terminal apparatus 7.

In processing indicated in FIG. 34, the processing for S100 and the processing from S900 to S920 is executed. In S930, a request for updating electronic mail data is transmitted to the mail reception server 19. A specific description is as described in the fifth embodiment. In S940, the mail reception server 19 transmits a request for updating the electronic mail data to the data conversion apparatus 6. Update of the electronic mail data is then performed in S975, transmission of the updated electronic mail data is executed in S990, and a second optimum cache apparatus transmits the updated electronic mail data to a reception terminal apparatus 7 in S1020. Based on the updated electronic mail data, the reception terminal apparatus 7 then receives a content from a second optimum cache apparatus 4.

Furthermore, the mail reception server 19 may also have the difference information generation unit 2d according to the first modified example of the fifth embodiment. The reception terminal apparatus 7 may also have the function described in the first modified example of the fifth embodiment. The reception terminal apparatus 7 have function for generating a new electronic mail data based on a converted electronic mail data and the difference information held by the control unit 7d. In FIG. 37, update processing for electronic mail data is executed in S1210. In S1220, the difference information is generated. The difference information indicates a difference between the updated electronic mail data and the converted electronic mail data. In S1230, the difference information is transmitted to the reception terminal apparatus 7. The reception terminal apparatus 7 generates a new electronic mail data based on the "converted electronic mail data held by the reception terminal apparatus 7" and the difference information. Furthermore, the reception terminal apparatus 7 may also have the function described in the second modified example of the fifth embodiment. In this case, the reception terminal apparatus 7 transmits a request for updating the electronic mail data. The processing subsequent to step S940 is then executed.

It should be noted that the content distribution system of the sixth embodiment may be configured not have the mail reception server 19, the data conversion apparatus 6, and the content location management apparatus 5. Instead, the content distribution system may have one item of content distribution server apparatus that is equipped with the functions of the mail reception server 19, the data conversion apparatus 6, and the content location management apparatus 5.

Furthermore, the content distribution system of the sixth embodiment may be configured not to have the mail reception server 19, the data conversion apparatus 6, the content location management apparatus 5, and the division determination apparatus 8. Instead, the content distribution system may have one item of content distribution apparatus that is equipped with the functions of the mail reception server 19, the data conversion apparatus 6, the content location management apparatus 5, and the division determination apparatus 8.

(First Modified Example of the Sixth Embodiment)

A modified example of the content distribution system of the sixth embodiment is as described below. The electronic mail data of this modified example includes a plurality of destination location information.

Furthermore, the mail transmission server 18 of this modified example includes a communication unit (not shown) and a control unit (not shown). The control unit of the mail transmission server 18 then obtains electronic mail data transmitted from a transmission terminal apparatus 17. The control unit of the mail transmission server 18 then determines whether or not the number of "destination location information" included in the electronic mail data is more than a predetermined number.

If it is determined that the number of "destination location information" is more than a predetermined number, the control unit transmits to the "data conversion apparatus" 6 via the communication unit the electronic mail data and "a plurality of location information of reception terminal apparatus 7". The plurality of location information is included in the electronic mail data. On the other hand, when the control unit determines that the number of "destination location information" is less than the predetermined number, the control unit transmits the electronic mail data to the mail reception server 19 via the communication unit.

It should be noted that the "number of destination location information" serves as a guideline indicating how many people read the electronic mail data. Furthermore, the number of destination location information serves as a guideline indicating how often a "apparatus storing a content (such as moving image content) included in the electronic mail data" is accessed by each apparatus.

Furthermore, the control unit of the mail reception server 19 of this modified example does not transmit to the data conversion apparatus 6 "the electronic mail data" and "the plurality of location information of reception terminal apparatus 7". In this present modified example, the configurations and functions other than those described above are the same as the configurations and functions of the sixth embodiment.

(Content Distribution Method)

Figure 43:
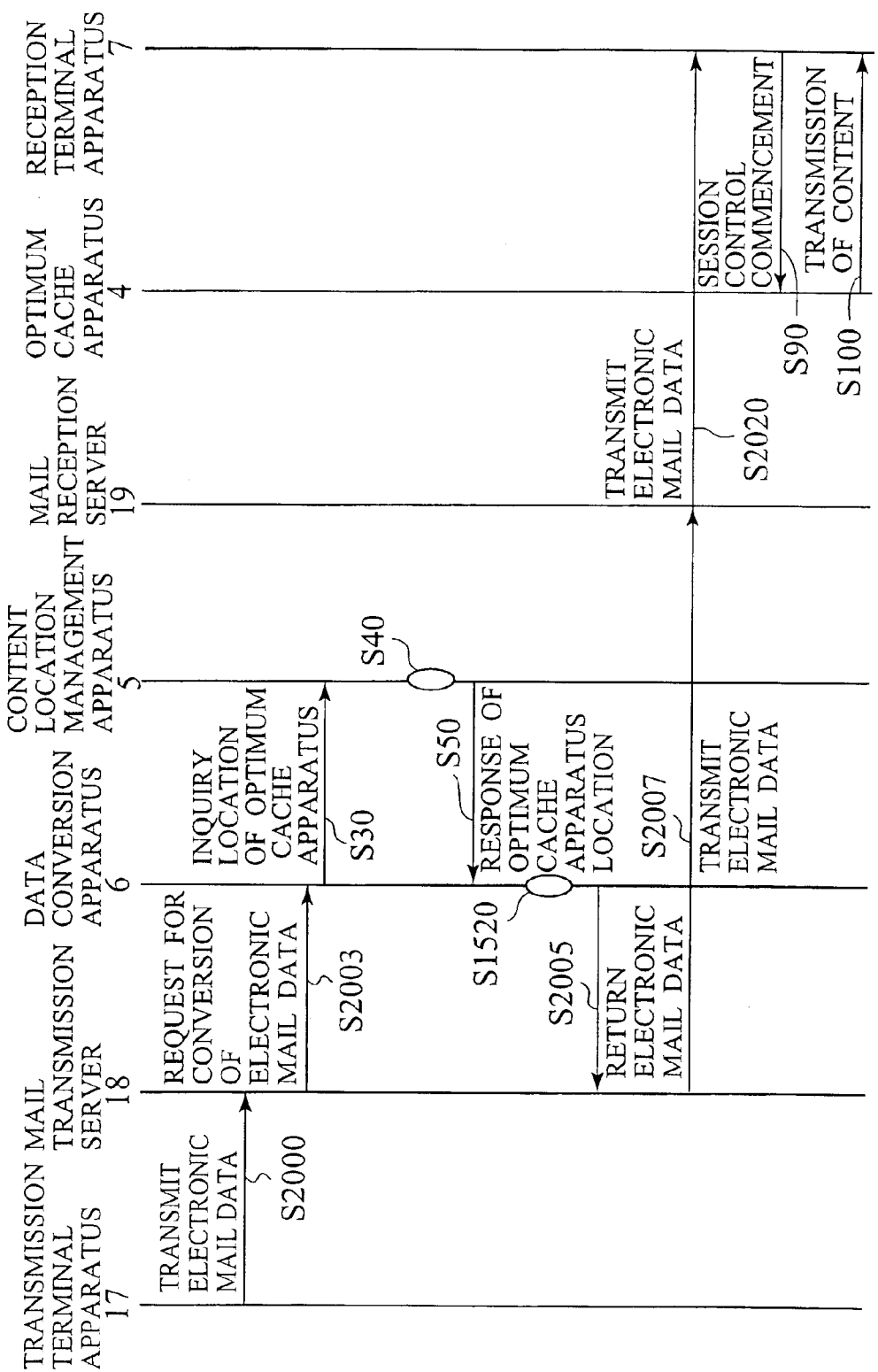
FIG. 43 is a sequence diagram for describing a content distribution method of a first modified example of the sixth embodiment.

Description of the same processing as each of the processing in the content distribution method of the sixth embodiment is omitted. FIG. 43 is a sequence diagram describing a content distribution method using the content distribution system that includes the configuration described above. It should be noted that in FIG. 43, the same reference numerals are given to the same processing as that indicated in FIG. 40, whereby the description thereof is omitted. Furthermore, the description of similar processing to that indicated in FIG. 40 is also simplified.

The transmission terminal apparatus 17 transmits an electric mail data to a mail transmission server 18 (S2000). The control unit of the mail transmission server 18 determines whether or not a number of "destination location information" included in the transmitted electronic mail data is more than a predetermined number.

When it is determined that the number of "destination location information" is more than the predetermined number, the control unit transmits a request for conversion of the electronic mail data via the communication unit (S2003). In this case, the control unit transmits to the data conversion apparatus 6 the electronic mail data and "a plurality of location information of reception terminal apparatus 7"

Processing then proceeds to the processing for S30. On the other hand, if the control unit determines that the number of "destination location information" is less than the predetermined number, the electronic mail data is not transmitted to the data conversion apparatus 6. Processing then proceeds to the processing of step S2007.

The processing from S30 to S50 is then executed. These processing are executed for the location information of each reception terminal apparatus 7. In step S50, for example, "list information" indicating a list of location information of each optimum cache apparatus 4 (the location information which is associated with each reception terminal apparatus 7, respectively) is transmitted to the data conversion apparatus 6. The conversion unit 6b of the data conversion apparatus 6 then performs the conversion of the electronic mail data (S1520). A specific description of this processing is as described below. The list information is transmitted to the conversion unit 6b. The conversion unit 6b obtains a plurality of location information of reception terminal apparatus 7. In this case, the plurality of location information is included in the electronic mail data. The conversion unit 6b refers to the list information, and then performs the following conversion processing. The conversion unit 6b converts a distribution source location information of the content distribution apparatus 3, which is included in the electronic mail data, into a distribution source location information of an optimum cache apparatus 4. In this case, the "distribution source location information of an optimum cache apparatus 4" is associated with location information of reception terminal apparatus 7.

A processing for transmitting the converted electronic mail data (S2005) is then executed. The converted electronic mail data is transmitted to the control unit of the mail transmission server 18.

The control unit of the mail transmission server 18 determines mail reception server 19 corresponding to location information of each reception transmission apparatus 7. The location information of each reception transmission apparatus 7 is included in the converted electronic mail data. The control unit of the mail transmission server 18 then transmits the converted electronic mail data to the mail reception server 19 via the communication unit (S2007). Furthermore, when it is determined that the number of "destination location information" is less than the predetermined number, the electronic mail data is transmitted to the mail reception server 19.

Furthermore, the control unit of the mail reception server 19 obtains a request for transmitting electronic mail data. The request is transmitted from the reception terminal apparatus 7. The electronic mail data and/or the converted electronic mail data is transmitted to the control unit.

The control unit then obtains the destination location information, which is included in the "electronic mail data or the converted electronic mail data". Hereafter, the "electronic mail data or the converted electronic mail data" is referred to as "transmitted electronic mail data and the like". When the location information of the reception terminal apparatus 7 corresponding to the request is not included in the "transmitted electronic mail data and the like", the control unit stores "the transmitted electronic mail, data and the like" in the storage unit.

On the other hand, when the location information of the reception terminal apparatus 7 corresponding to the request is included in the "transmitted electronic mail data and the like", the control unit transmits the "transmitted electronic mail data and the like" to the reception terminal apparatus 7 (S2020).

The processing for S90 and S100 is then executed. In this case, the reception terminal apparatus 7 performs processing for commencing session control with an optimum cache apparatus 4. Furthermore, the reception terminal apparatus 7 obtains a predetermined content from the optimum cache apparatus 4.

It should be noted that in the processing for S2003, the control unit of the mail transmission server 18 may transmit to the data conversion apparatus 6, the "destination location information of mail reception server 19" instead of the "destination location information of a reception terminal apparatus 7". In step S40, for example, the optimum cache determination unit 5e may also determine the cache apparatus 4 that is close to the mail reception server 19 as an optimum cache apparatus 4.

Furthermore, the processing (1) through (4) described in the sixth embodiment are similarly applied in this present modified example. In this case, each process performed by each unit have to be carried out as described below. The mail transmission server 18 carries out processing which indicates a request for the conversion of electronic mail data. The mail reception server 19 does not carry out the processing which indicates a request for the conversion of electronic mail data.

When the "number of destination location information included in electronic mail data" is more than a predetermined number, the electronic mail data is converted by the conversion unit 6b.

Furthermore, electronic mail data contains a plurality of destination location information. For example, a destination location information is an information indicating location information of reception terminal apparatus 7. "Processing concerning the location information of the reception terminal apparatus 7" is executed for each reception terminal apparatus 7.

Furthermore, the content distribution system of this modified example may be configured not to have the mail transmission server 18, the data conversion apparatus 6, and the content location management apparatus 5. Instead, the content distribution system may be configured to have one item of content distribution server apparatus that has the function of the mail transmission server 18, the function of the data conversion apparatus 6, and the function of the content location management apparatus 5.

Furthermore, the content distribution system of the sixth embodiment may be configured not to have the mail transmission server 18, the data conversion apparatus 6, the content location management apparatus 5, and the division determination apparatus 8, but instead have one item of content distribution server apparatus. The content distribution server apparatus has the function of the mail transmission server 18, the function of the data conversion apparatus 6, the function of the content location management apparatus 5, and the function of the division determination apparatus 8.

According to this modified example, the control unit of the mail transmission server 18 obtains a number of "destination location information" included in the electronic mail data. When the "number of destination location information included in the electronic mail data" is more than the predetermined number, the control unit of the mail transmission server 18 transmits the electronic mail data to the data conversion apparatus 6.

Here, if conversion processing for the "electronic mail data having a small number of destination location information" and conversion processing for "the electronic mail data having a large number of destination location information" are executed, the following disadvantages is generated. In other words, since exchange of data among each apparatus (such as, the data conversion apparatus 6, the content location management apparatus 5 and the mail transmission server 18) increases, the congestion of network lines is generated.

On the other hand, in order to effectively use network resources and improve content distribution quality, it is preferable that frequency converted from a "location information of the content distribution apparatus 3" into "a location information of an optimum cache apparatus 4" is high.

Accordingly, if the conversion unit 6b performs the processing for converting electronic mail data having a large number (such as, more than a predetermined number) of destination location information, but does not perform the processing for converting electronic mail data having a small number (such as, less than a predetermined number) of destination location information, the following results are generated.

Network resources can be effectively used and content distribution quality can be improved. Since exchange of data among each apparatus (such as, the data conversion apparatus 6, the content location management apparatus 5 and the mail transmission server 18) decreases, the congestion of network lines is reduced.

It should be noted that the "a predetermined number" is determined based on the processing abilities of the data conversion apparatus 6, content location management apparatus 5, and the processing abilities of the network, for example.

Various modifications will become possible for those skilled in the art after receiving the teachings of the present disclosure without departing from the scope thereof.

What is claimed is:

1. A content distribution system, comprising:

at least one distribution apparatus configured to store content;

a plurality of cache server apparatus configured to obtain content from the distribution apparatus, and to store the content temporarily;

a location information data storage unit configured to store location information data, which indicates the location information of each cache server apparatus;

a description data storage unit configured to store at least one item of description data, which includes the location information of the distribution apparatus;

a converter configured to convert the location information of a distribution apparatus storing a requested content requested by a user which is included in the description data, into the location information of a specified cache server apparatus, by referring to the location information data; and a reception terminal apparatus configured to obtain converted description data, which is the description data converted by the converter, and to receive the requested content from the specified cache server apparatus based on the converted description data.

2. The content distribution system according to claim 1, further comprising a cache server apparatus that has already stored the requested content; wherein said location information data storage unit stores content location information data, in which information specifying each content and location information of cache server apparatus, correspond with each other; and said converter converts the location information of the distribution apparatus storing the requested content, which is included in the description data, into location information of a cache server apparatus that has already stored the requested content, by referring to the content location information data.

3. The content distribution system according to claim 1, further comprising:

an optimum cache determination unit configured to determine a cache server apparatus closest to the reception terminal apparatus among each cache server apparatus that stores the requested content, as an optimum cache server apparatus;

wherein
said converter converts the location information of the distribution apparatus storing the requested content, which is included in the description data, into location information of the optimum cache server apparatus, and said reception terminal apparatus obtains the converted description data, and receives the requested content from the optimum cache server apparatus based on the converted description data.

4. The content distribution system according to claim 3, wherein
in the case where the reception terminal apparatus has moved a predetermined distance, the optimum cache determination unit determines a cache server apparatus close to the reception terminal apparatus which has moved, as a second optimum cache server apparatus and comprises:

a pre-fetch request unit configured to transmit to the second optimum cache server apparatus a pre-fetch request, which indicates a command that the second optimum cache server apparatus obtain the requested content from the distribution apparatus storing the requested content, in the case where the requested content is not stored in the second optimum cache server apparatus; and an update unit configured to update the location information of the optimum cache server apparatus, which is included in the converted description data, into location information of the second optimum cache server apparatus, by referring to the location information data; and said reception terminal apparatus suspends receipt of the requested content from the optimum cache server apparatus, and obtains the updated description data, which includes the location information updated by the update unit, and receives the requested content from the second optimum cache server apparatus based on the updated description data.

5. The content distribution system according to claim 4, further comprising:
a difference information generation unit configured to generate difference information which indicates differences between the converted description data and the updated description data;

wherein
said reception terminal apparatus suspends receipt of the requested content from the optimum cache server apparatus, and obtains the difference information, and receives the requested content from the second optimum cache server apparatus based on the difference information and the converted description data.

6. The content distribution system according to claim 3, wherein
in the case where there are modifications to the requested content, which is stored in said optimum cache server apparatus while the reception terminal apparatus is receiving the requested content, said optimum cache determination unit determines a second optimum cache server apparatus which is other than said optimum cache server apparatus from among the cache server apparatus close to the reception terminal apparatus and comprises:

a pre-fetch request unit configured to transmit to the second optimum cache server apparatus a pre-fetch request, which indicates a command that the second optimum cache server apparatus obtain the requested content from the distribution apparatus storing the requested content, in the case where the requested content is not stored in the second optimum cache server apparatus; and an update unit configured to update the location information of the optimum cache server apparatus, which is included in the converted description data, into location information of the second optimum cache server apparatus, by referring to the location information data; and said reception terminal apparatus suspends receipt of the requested content from the optimum cache server apparatus, and obtains the updated description data, which includes the location information updated by the update unit, and receives the requested content from the second optimum cache server apparatus based on the updated description data.

7. The content distribution system according to claim 1, further comprising:
a load condition calculation unit configured to calculate a load condition of each cache server apparatus; and an optimum cache determination unit configured to determine a cache server apparatus corresponding to the lightest load condition as an optimum cache server apparatus;

wherein
said converter converts the location information of the distribution apparatus storing the requested content, which is included in the description data, into a location information of the optimum cache server apparatus, and said reception terminal apparatus obtains the converted description data, and receives the requested content from the optimum cache server apparatus based on the converted description data.

8. The content distribution system according to claim 1, further comprising:
a pre-fetch request unit configured to transmit to a specified cache server apparatus a pre-fetch request, which indicates a command that the specified cache server apparatus obtain the requested content from the distribution apparatus storing the requested content, in the case where the requested content is not stored in the specified cache server apparatus;

wherein
said converter converts the location information of the distribution apparatus storing the requested content, which is included in the description data, into a location information of the specified cache server apparatus, by referring to the location information data, and said reception terminal apparatus obtains the converted description data, and receives the requested content from the specified cache server apparatus based on the converted description data.

9. The content distribution system according to claim 8, wherein the pre-fetch request unit transmits the pre-fetch request to the specified cache server apparatus before the reception terminal apparatus transmits a request for distribution of the requested content to the specified cache server apparatus.

10. The content distribution system according to claim 8, wherein the pre-fetch request unit transmits the pre-fetch request to the specified cache server apparatus just before a distribution of the requested content to the reception terminal apparatus begins.

11. A content distribution system, comprising:
- at least one distribution apparatus configured to store content;
- a plurality of cache server apparatus configured to obtain content from the distribution apparatus, and to store the content temporarily;
- a location information data storage unit configured to store location information data, which indicates the location information of each cache server apparatus;
- a description data obtaining unit configured to obtain from a transmission terminal apparatus, description data, which includes the location information of a distribution apparatus storing a predetermined content;
- a converter configured to convert the location information of the distribution apparatus, which is included in the description data, into a location information of a specified cache server apparatus, by referring to the location information data; and
- a reception terminal apparatus configured to obtain converted description data, which is the description data converted by the converter, and to receive the predetermined content from the specified cache server apparatus based on the converted description data.

12. A content distribution system, comprising:
- a division determination unit configured to determine to perform the division of content in the case where the amount of data of the content exceeds a predetermined amount;
- a divided content generation unit configured to generate a plurality of sections of divided content, by executing the division of the content, in the case where it has been determined by the division determination unit to perform division;
- a first converter configured to convert description data which includes information concerning content, into description data which includes information concerning divided content, in the case where the content has been divided into the plurality of sections of divided content; and
- a reception terminal apparatus configured to obtain the converted description data, which is the description data converted by the first converter, and to receive the sections of divided content from at least one apparatus storing the sections of divided content based on the converted description data.

13. The content distribution system according to claim 12, further comprising:
- at least one cache server apparatus configured to store the divided content;
- wherein the reception terminal apparatus obtains the converted description data, and receives sections of divided content from at least one cache server apparatus storing the sections of divided content based on the converted description data.

14. The content distribution system according to claim 12, further comprising:
- a distribution apparatus configured to store a plurality of sections of divided content;
- at least one cache server apparatus configured to obtain at least one section of divided content from the distribution apparatus, and to store the divided content temporarily;
- a location information data storage unit configured to store location information data, which indicates the location information of each cache server apparatus;
- a description data storage unit configured to store at least one item of description data, which includes the location information of the distribution apparatus; and
- a second converter configured to convert the location information of a distribution apparatus storing a plurality of sections of requested divided content requested by a user, which is included in the description data, into the location information of at least one specified cache server apparatus, by referring to the location information data;
- wherein
- said reception terminal apparatus obtains the converted description data, which is description data converted by the second converter, and receives each section of requested divided content from the specified cache server apparatus based on the converted description data.

15. The content distribution system according to claim 14, further comprising:
- an optimum cache determination unit configured to determine at least one cache server apparatus that is able to store at least one section of requested divided content, as an optimum cache server apparatus, based on available area amount for each cache server apparatus, in the case where it has been determined by the division determination unit to divide the requested content into the plurality of sections of requested divided content; and
- a condition for division decision unit configured to decide a condition for division, which is a condition for dividing the requested content into a plurality of sections of requested divided content;
- wherein
- said distribution apparatus further stores content,
- said divided content generation unit generates a plurality of sections of requested divided content by executing the division of the requested content, in accordance with the condition for division,
- said second converter converts the location information of a distribution apparatus storing the requested content, which is included in the description data, into the location information of at least one optimum cache server apparatus, by referring to the location information data, and
- said reception terminal apparatus obtains converted description data, which is description data converted by the second converter, and receives each section of requested divided content from the optimum cache server apparatus based on the converted description data.

16. The content distribution system according to claim 15, wherein the condition for division decision unit determines a length of each section of divided content, which is generated by the divided content generation unit, based on an order of distribution to the reception terminal apparatus.

17. The content distribution system according to claim 14, wherein the divided content generation unit executes the division of the requested content so that each section of requested divided content is consecutive.

18. A content distribution system, comprising:
- a division determination unit configured to determine to perform the division of content in the case where the amount of data of the content exceeds a predetermined amount;
- a divided content generation unit configured to generate a plurality of sections of divided content, by executing the division of the content, in the case where it has been determined by the division determination unit to perform division;

a distribution apparatus configured to store the plurality of sections of divided content;

at least one cache server apparatus configured to obtain at least one section of divided content from the distribution apparatus, and to store the section of divided content temporarily;

a location information data storage unit configured to store location information data, which indicates the location information of each cache server apparatus;

a description data obtaining unit configured to obtain from a transmission terminal apparatus, description data, which includes the location information of a distribution apparatus storing the plurality of sections of divided content;

a converter configured to convert the location information of the distribution apparatus, which is included in the description data, into location information of at least one specified cache server apparatus, by referring to the location information data; and a reception terminal apparatus configured to obtain converted description data, which is description data converted by the converter, and to receive each section of divided content from the specified cache server apparatus based on the converted description data.

19. A description data distribution apparatus configured to manage at least one item of description data that includes location information of an apparatus, comprising:

an obtaining unit configured to obtain description data converted by a data converter from the data converter that converts the location information of a distribution apparatus storing a requested content requested by a user, which is included in the description data, into the location information of a specified cache server apparatus, by referring to location information data which indicates the location information of each cache server apparatus storing content temporarily; and a transmitter configured to transmit the description data converted by the data converter to a reception terminal apparatus.

20. A description data distribution apparatus configured to transmit to a reception terminal apparatus, storing description data that includes location information of an apparatus storing content requested by a user, information concerning the description data, comprising:

an update unit configured to update the location information of the apparatus, which is included in the description data, into the location information of a specified cache server apparatus, by referring to location information data which indicates location information of each cache server; and a transmitter configured to transmit to the reception terminal apparatus the description data that is updated by the update unit.

21. A description data distribution apparatus configured to transmit to a reception terminal apparatus, storing description data that includes location information of an apparatus storing content requested by a user, information concerning the description data, comprising:

an update unit configured to update the location information of the apparatus, which is included in the description data, into the location information of a specified cache server apparatus, by referring to location information data which indicates location information of each cache server;

a difference information generation unit configured to generate difference information which indicates differences between said description data and the updated description data which is description data updated by the update unit, a transmitter configured to transmit the difference information to the reception terminal apparatus.

22. A content location management apparatus configured to transmit the location information of a specified apparatus to a converter which converts description data that includes the location information of a distribution apparatus storing a requested content requested by a user, comprising:

an optimum cache determination unit configured to determine an optimum cache server apparatus, which is a cache server apparatus that is optimum for a reception terminal apparatus to access, based on at least one item of information from among information indicating the degree of closeness to the reception terminal apparatus; information indicating available area amount for cache server apparatus; information that indicates the degree of a load condition of cache server apparatus; and information indicating whether or not the requested content has already been stored; and a transmitter configured to transmit the location information of the optimum cache server apparatus to the converter.

23. A content location management apparatus, comprising:

a transmitter configured to transmit to a specified cache server apparatus a pre-fetch request, which indicates a command that the specified cache server apparatus obtain a requested content requested by a user from the distribution apparatus storing the requested content, in the case where the requested content is not stored in the specified cache server apparatus.

24. The content location management apparatus according to claim 23, wherein the transmitter transmits the pre-fetch request to the specified cache server apparatus before the reception terminal apparatus transmits a request for distribution of the requested content to the specified cache server apparatus.

25. The content location management apparatus according to claim 23, wherein the transmitter transmits the pre-fetch request to the specified cache server apparatus just before the distribution of the requested content to the reception terminal apparatus begins.

26. A content location management apparatus, comprising:

an optimum cache determination unit configured to determine a cache server apparatus close to the reception terminal apparatus which has moved, as an optimum cache server apparatus in the case where the reception terminal apparatus has moved a predetermined distance, a transmitter configured to transmit to the optimum cache server apparatus a pre-fetch request, which indicates a command that the optimum cache server apparatus obtain a requested content requested by a user from the distribution apparatus storing the requested content, in the case where the requested content is not stored in the optimum cache server apparatus.

27. A content location management apparatus, comprising:

an optimum cache determination unit configured to determine an optimum cache server apparatus which is a cache server apparatus close to a reception terminal apparatus, in the case where there are modifications to a requested content requested by a user, which is stored in a specified cache server apparatus while the reception terminal apparatus is receiving the requested content; and a transmitter configured to transmit to the optimum cache server apparatus a pre-fetch request, which indicates a command that the optimum cache server apparatus obtain the requested content from the distribution apparatus storing the requested content, in the case where the requested content is not stored in the optimum cache server apparatus.

28. A data conversion apparatus configured to convert description data that includes location information of an apparatus, and to transmit the converted description data to a description data management unit which manages at least one item of description data, comprising:

a converter configured to convert the location information of a distribution apparatus storing a requested content requested by a user, which is included in the description data, into the location information of a specified cache server apparatus, by referring to location information data which indicates location information of each cache server apparatus storing content temporarily; and a transmitter configured to transmit to the description data management unit the description data that includes the location information converted by the converter.

29. The data conversion apparatus according to claim 28, wherein the converter converts the location information of the distribution apparatus storing the requested content, which is included in the description data, into the location information of a cache server apparatus that has already stored the requested content, by referring to the content location information data, in which information specifying each content and location information of cache server apparatus, correspond with each other.

30. A data conversion apparatus configured to convert description data that includes the location information of an apparatus, and to transmit the converted description data to a distribution unit, which distributes description data to a reception terminal apparatus, comprising:

an obtaining unit configured to obtain from a transmission terminal apparatus, description data, which includes the location information of a distribution apparatus storing a predetermined content;

a converter configured to convert the location information of the distribution apparatus which is included in the description data, into the location information of a specified cache server apparatus, by referring to location information data which indicates the location information of each cache server apparatus storing content temporarily; and a transmitter configured to transmit to the distribution unit the description data that includes the location information converted by the converter.

31. A data conversion apparatus configured to convert the description data that includes location information of an apparatus, and transmit the converted description data to a description data management unit, which manages at least one item of description data, in the case where it has been determined by a division determination unit, to perform division of a predetermined content if amount of data of the content has exceeded a predetermined amount, and comprises:

a divided content generation unit configured to generate a plurality of sections of divided content by executing the division of the predetermined content, in the case where it has been determined by the division determination unit to perform division of the predetermined content;

a converter configured to convert description data that includes information concerning the predetermined content, into description data that includes information concerning the divided content; and a transmitter configured to transmit to the description data management unit the description data converted by the converter.

32. A data conversion apparatus configured to convert description data that includes location information of an apparatus, and transmit the converted description data to a description data management unit, which manages at least one item of description data, in the case where it has been determined by a division determination unit, to perform the division of a predetermined content if amount of data of the content has exceeded a predetermined amount, and comprises:

a divided content generation unit configured to generate a plurality of sections of divided content by executing the division of the predetermined content, in the case where it has been determined by the division determination unit to perform the division of the predetermined content;

a converter configured to convert the location information of a distribution apparatus storing a plurality of sections of requested divided content requested by a user which is included in description data, into location information of at least one specified cache server apparatus, by referring to location information data which indicates location information of each cache server apparatus storing at least one section of divided content temporarily; and a transmitter configured to transmit to the description data management unit the description data that includes the location information converted by the converter.

33. The data conversion apparatus according to claim 32, further comprising:

a first obtaining unit configured to obtain the location information of at least one optimum cache server apparatus, in the case where the optimum cache server apparatus that is a cache server apparatus which can store at least one section of divided content, is determined, based on available area amount for each cache server apparatus; and a second obtaining unit configured to obtain a condition for division, which is condition for dividing the requested content into a plurality of sections of requested divided content;

wherein said divided content generation unit generates a plurality of sections of requested divided content by executing the division of the requested content, in accordance with the condition for division, said converter converts the location information of a distribution apparatus storing the requested content, which is included in description data, into the location information of at least one optimum cache server apparatus, by referring to the location information data.

34. The data conversion apparatus according to claim 33, wherein the condition for division is a condition concerning length of divided content, which is decided based on an order of distribution to a reception terminal apparatus.

35. The data conversion apparatus according to claim 33, wherein the divided content generation unit executes the division of the requested content so that each section of requested divided content is consecutive.

36. A data conversion apparatus configured to convert description data that includes the location information of an apparatus, and transmit the converted description data to a distribution unit, which distributes description data to a reception terminal apparatus, in the case where it has been determined by a division determination unit, to perform the division of a predetermined content if amount of data of the content has exceeded a predetermined amount, and comprises:
- a divided content generation unit configured to generate a plurality of sections of divided content, by executing the division of the predetermined content, in the case where it has been determined by the division determination unit to perform the division of the predetermined content;
- an obtaining unit configured to obtain from a transmission terminal apparatus, the description data, which includes location information of a distribution apparatus storing the plurality of sections of divided content;
- a converter configured to convert location information of the distribution apparatus, which is included in the description data, into the location information of at least one specified cache server apparatus, by referring to location information data which indicates the location information of each cache server apparatus storing at least one section of divided content temporarily; and
- a transmitter configured to transmit to the distribution unit the description data that includes the location information converted by the converter.

37. A reception terminal apparatus configured to receive a requested content which is content requested by a user, and description data that includes location information of apparatus through a network comprising at least one distribution apparatus, storing the content, and a plurality of cache server apparatus, which obtain the content from the distribution apparatus and store the content temporarily, comprising:
- a transmitter configured to transmit a request for description data, which includes the location information of a distribution apparatus storing the requested content; and
- a receiver configured to receive the converted description data, in which location information of the distribution apparatus is converted into location information of a specified cache server apparatus;
- wherein the receiver receives the requested content from the specified cache server apparatus in the case where the transmitter has transmitted a request for the requested content to the specified cache server apparatus based on the converted description data.

38. The reception terminal apparatus according to claim 37, wherein
- in the case where the reception terminal apparatus has moved a predetermined distance, the transmitter transmits a request for updating the converted description data,
- in the case where the location information of the cache server apparatus, which is included in the converted description data, has been updated into the location information of a second cache server apparatus, the receiver receives the updated description data, indicating the description data in which the location information of the cache server apparatus has been updated into the location information of the second cache server apparatus, and suspends receiving the requested content from the cache server apparatus, and
- in the case where the transmitter has transmitted a request for the requested content based on the updated description data, the receiver receives the requested content transmitted from the second cache server apparatus.

39. The reception terminal apparatus according to claim 38, further comprising:
- a description data generation unit configured to generate new description data, based on the converted description data and difference information indicating differences between the converted description data and the updated description data, in the case where the difference information has been received by the receiver, instead of the updated description data;
- wherein the transmitter transmits a request for the requested content to the second cache server apparatus based on the new description data.

40. A content distribution method, comprising the steps of:
- storing content in at least one distribution apparatus;
- having a plurality of cache server apparatus obtain the content from the distribution apparatus;
- having the plurality of cache server apparatus store the obtained content;
- storing location information data, which indicates the location information of each cache server apparatus, in location information data storage unit;
- storing at least one item of description data, which includes location information of the distribution apparatus, in a description data storage unit;
- converting the location information of a distribution apparatus storing requested content requested by a user, which is included in description data, into the location information of a specified cache server apparatus by referring to the location information data;
- having a reception terminal apparatus obtain the converted description data, which is description data that has been converted;
- having the reception terminal apparatus receive the requested content from the specified cache server apparatus based on the converted description data.

41. The content distribution method according to claim 40, further comprising the steps of:
- storing in the location information data storage unit, content location information data, in which information specifying each content and location information of cache server apparatus, correspond with each other; and
- converting the location information of the distribution apparatus storing the requested content, which is included in the description data, into location information of a cache server apparatus that has already stored the requested content, by referring to the content location information data.

42. The content distribution method according to claim 40, further comprising the steps of:
- determining a cache server apparatus closest to the reception terminal apparatus from among each cache server apparatus storing the requested content, as an optimum cache server apparatus;
- converting the location information of the distribution apparatus storing the requested content, which is included in the description data, into location information of the optimum cache server apparatus;
having said reception terminal apparatus obtain the converted description data;
having said reception terminal apparatus receive the requested content from the optimum cache server apparatus based on the converted description data.

43. The content distribution method according to claim 42, further comprising the steps of:
determining a cache server apparatus close to the reception terminal apparatus which has moved, as a second optimum cache server apparatus, in the case where the reception terminal apparatus has moved a predetermined distance;
transmitting to the second optimum cache server apparatus a pre-fetch request, which indicates a command that the second optimum cache server apparatus obtain the requested content from the distribution apparatus storing the requested content, in the case where the requested content is not stored in the second optimum cache server apparatus;
updating the location information of the optimum cache server apparatus, which is included in the converted description data, into location information of the second optimum cache server apparatus, by referring to the location information data;
having said reception terminal apparatus suspend receipt of the requested content from the optimum cache server apparatus
having reception terminal apparatus obtain the updated description data, which includes the location information updated;
having reception terminal apparatus receive the requested content from the second optimum cache server apparatus based on the updated description data.

44. The content distribution method according to claim 43, further comprising the steps of:
generating difference information which indicates differences between the converted description data and the updated description data;
having said reception terminal apparatus suspend reception of the requested content from the optimum cache server apparatus;
having said reception terminal apparatus obtain the difference information;
having said reception terminal apparatus receive the requested content from the second optimum cache server apparatus based on the difference information and the converted description data.

45. The content distribution method according to claim 42, further comprising the steps of:
determining a second optimum cache server apparatus which is other than said optimum cache server apparatus from among the cache server apparatus close to the reception terminal apparatus, in the case where there are modifications to the requested content, which is stored in said optimum cache server apparatus while the reception terminal apparatus is receiving the requested content;
transmitting to the second optimum cache server apparatus a pre-fetch request, which indicates a command that the second optimum cache server apparatus obtain the requested content from the distribution apparatus storing the requested content, in the case where the requested content is not stored in the second optimum cache server apparatus;
updating the location information of the optimum cache server apparatus, which is included in the converted description data, into location information of the second optimum cache server apparatus, by referring to the location information data;
having said reception terminal apparatus suspend receipt of the requested content from the optimum cache server apparatus,
having said reception terminal apparatus obtain the updated description data, which includes the location information updated,
having said reception terminal apparatus receive the requested content from the second optimum cache server apparatus based on the updated description data.

46. The content distribution method according to claim 40, further comprising the steps of:
calculating load condition of each cache server apparatus;
determining a cache server apparatus corresponding to the lightest load condition as an optimum cache server apparatus;
converting the location information of the distribution apparatus storing the requested content, which is included in the description data, into location information of the optimum cache server apparatus, and
having said reception terminal apparatus obtain the converted description data;
having said reception terminal apparatus receive the requested content from the optimum cache server apparatus based on the converted description data.

47. The content distribution method according to claim 40, further comprising the steps of:
transmitting to a specified cache server apparatus a pre-fetch request, which indicates a command that the specified cache server apparatus obtain the requested content from the distribution apparatus storing the requested content, in the case where the requested content is not stored in the specified cache server apparatus;
converting the location information of the distribution apparatus storing the requested content, which is included in the description data, into location information of the specified cache server apparatus, by referring to the location information data; and
having said reception terminal apparatus obtain the converted description data;
having said reception terminal apparatus receive the requested content from the specified cache server apparatus based on the converted description data.

48. The content distribution method according to claim 47, wherein the transmitting step includes the step of transmitting the pre-fetch request to the specified cache server apparatus before the reception terminal apparatus transmits a request for distribution of the requested content to the specified cache server apparatus.

49. The content distribution method according to claim 47, wherein the transmitting step includes the step of transmitting the pre-fetch request to the specified cache server apparatus just before a distribution of the requested content to the reception terminal apparatus begins.

50. A content distribution method, comprising the steps of:
storing content in at least one distribution apparatus;
having a plurality of cache server apparatus obtain the content from the distribution apparatus;
having the plurality of cache server apparatus store the obtained content;

storing location information data, which indicates location information of each cache server apparatus, in a location information data storage unit;

obtaining from a transmission terminal apparatus, description data, which includes location information of a distribution apparatus storing a predetermined content;

converting the location information of the distribution apparatus, which is included in the description data, into the location information of a specified cache server apparatus, by referring to the location information data; and having a reception terminal apparatus obtain converted description data, which is description data converted by the converting step;

having the reception terminal apparatus receive the predetermined content from the specified cache server apparatus based on the converted description data.

51. A content distribution method, comprising:

a step of determining to perform the division of content in the case where the amount of data of the content exceeds a predetermined amount;

a first step of generating a plurality of sections of divided content, by executing the division of the content, in the case where it has been determined by the determining step to perform division;

a step of converting description data which includes information concerning content, into description data which includes information concerning divided content, in the case where the content has been divided into the plurality of sections of divided content;

a step of obtaining the converted description data, which is the description data converted by the converting step;

a step of receiving the sections of divided content from at least one apparatus storing the sections of divided content based on the converted description data.

52. The content distribution method according to claim 51, further comprising the steps of:

storing the divided content in at least one cache server apparatus;

obtaining the converted description data;

receiving the sections of divided content from at least one cache server apparatus storing the sections of divided content based on the converted description data.

53. The content distribution method according to claim 51, further comprising the steps of:

storing the plurality of sections of divided content in a distribution apparatus;

having at least one cache server apparatus obtain at least one section of divided content from the distribution apparatus;

having the cache server apparatus store the divided content temporarily;

storing location information data, which indicates location information of each cache server apparatus, in location information data storage unit;

storing at least one item of description data, which includes the location information of the distribution apparatus, in the description data storage unit;

converting the location information of a distribution apparatus storing a plurality of sections of requested divided content requested by a user, which is included in description data, into the location information of at least one specified cache server apparatus, by referring to the location information data;

having said reception terminal apparatus obtain the converted description data, which is description data converted by the converting step;

having said reception terminal apparatus receive each section of requested divided content from the specified cache server apparatus based on the converted description data.

54. The content distribution method according to claim 53, further comprising:

a step of determining at least one cache server apparatus that is able to store at least one section of requested divided content, as an optimum cache server apparatus, based on available area amount for each cache server apparatus, in the case where it has been determined to divide the requested content into the plurality of sections of requested divided content;

a step of deciding a condition for division, which is a condition for dividing the requested content into a plurality of sections of requested divided content;

a step of storing content in said distribution apparatus;

a second step of generating a plurality of sections of requested divided content by executing the division of the requested content, in accordance with the condition for division, a second step of converting the location information of a distribution apparatus storing the requested content, which is included in description data, into location information of at least one optimum cache server apparatus, by referring to the location information data;

a step of having said reception terminal apparatus obtain converted description data, which is description data converted by the second step of converting;

a step of having said reception terminal apparatus receive each section of requested divided content from the optimum cache server apparatus based on the converted description data.

55. The content distribution method according to claim 54, wherein the deciding step includes the step of determining a length of each section of divided content, based on an order of distributing to the reception terminal apparatus.

56. The content distribution method according to claim 54, wherein the first generation step includes the step of executing the division of the requested content so that each section of requested divided content is consecutive.

57. The content distribution method according to claim 51, wherein the first generation step includes the step of executing the division of the requested content so that each section of requested divided content is consecutive.

58. A content distribution method, comprising the steps of:

determining to perform the division of content in the case where the amount of data of the content exceeds a predetermined amount;

generating a plurality of sections of divided content, by executing the division of the content, in the case where it has been determined to perform division;

storing the plurality of sections of divided content in a distribution apparatus;

having at least one cache server apparatus obtain at least one section of divided content from the distribution apparatus;

having the cache server apparatus store the divided content temporarily;

storing in a location information data storage unit, location information data, which indicates location information of each cache server apparatus;

obtaining from a transmission terminal apparatus, description data, which includes location information of a distribution apparatus storing the plurality of sections of divided content;

converting the location information of the distribution apparatus, which is included in the description data, into location information of at least one specified cache server apparatus, by referring to the location information data; and having a reception terminal apparatus obtain converted description data, which is description data converted by the converting step;

having the reception terminal apparatus receive each section of divided content from the specified cache server apparatus based on the converted description data.

* * * * *